US010655065B2

(12) United States Patent
Matsukuma et al.

(10) Patent No.: US 10,655,065 B2
(45) Date of Patent: *May 19, 2020

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Maiko Matsukuma, Ichihara (JP); Masayuki Saito, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 15/665,446

(22) Filed: Aug. 1, 2017

(65) Prior Publication Data
US 2018/0030349 A1 Feb. 1, 2018

(30) Foreign Application Priority Data

Aug. 1, 2016 (JP) ................................. 2016-151121
Aug. 2, 2016 (JP) ................................. 2016-151814

(51) Int. Cl.
C09K 19/12 (2006.01)
C09K 19/34 (2006.01)
C09K 19/30 (2006.01)
C09K 19/20 (2006.01)
C09K 19/14 (2006.01)
G02F 1/137 (2006.01)
G02F 1/1368 (2006.01)

(52) U.S. Cl.
CPC .......... C09K 19/3402 (2013.01); C09K 19/12 (2013.01); C09K 19/126 (2013.01); C09K 19/14 (2013.01); C09K 19/2007 (2013.01); C09K 19/3003 (2013.01); C09K 19/3066 (2013.01); C09K 19/3098 (2013.01); G02F 1/137 (2013.01); C09K 2019/122 (2013.01); C09K 2019/301 (2013.01); C09K 2019/3004 (2013.01); C09K 2019/3015 (2013.01); C09K 2019/3016 (2013.01); C09K 2019/3019 (2013.01); C09K 2019/3022 (2013.01); C09K 2019/3025 (2013.01); C09K 2019/3071 (2013.01); C09K 2019/3077 (2013.01); C09K 2019/3078 (2013.01); C09K 2019/3083 (2013.01); C09K 2019/3422 (2013.01); C09K 2019/3425 (2013.01); G02F 1/1368 (2013.01); G02F 2001/13706 (2013.01)

(58) Field of Classification Search
CPC .................................. C09K 19/20; C09K 19/34
See application file for complete search history.

(56) References Cited

U.S. PATENT DOCUMENTS

| 6,162,372 A | 12/2000 | Tomi et al. | |
|---|---|---|---|
| 6,174,458 B1* | 1/2001 | Koga | C07C 17/12 |
| | | | 252/299.6 |
| 6,197,217 B1* | 3/2001 | Kondo | C07C 25/18 |
| | | | 252/299.61 |
| 6,372,153 B1 | 4/2002 | Tamura et al. | |
| 2002/0066887 A1 | 6/2002 | Yanai et al. | |
| 2004/0089844 A1 | 5/2004 | Saito | |
| 2011/0180756 A1 | 7/2011 | Goto et al. | |
| 2014/0034876 A1* | 2/2014 | Gotoh | C09K 19/20 |
| | | | 252/299.61 |
| 2014/0145113 A1* | 5/2014 | Yano | C09K 19/04 |
| | | | 252/299.61 |
| 2015/0376502 A1 | 12/2015 | Tanaka et al. | |
| 2018/0022999 A1* | 1/2018 | Ookawa | C07D 319/06 |
| | | | 349/33 |

FOREIGN PATENT DOCUMENTS

| CN | 103351878 A * | 10/2013 | |
|---|---|---|---|
| DE | 102013011923 A1 * | 1/2014 | C09K 19/20 |
| JP | H04-018089 | 1/1992 | |
| JP | H0968701 | 3/1997 | |
| JP | H0977692 | 3/1997 | |
| JP | H1180064 | 3/1999 | |
| JP | 2000-087039 | 3/2000 | |
| JP | 2000109843 | 4/2000 | |
| JP | 2001042793 | 2/2001 | |
| JP | 2001288470 | 10/2001 | |
| JP | 2004149691 | 5/2004 | |
| JP | 2006-008928 | 1/2006 | |
| JP | 2006-070080 | 3/2006 | |

(Continued)

OTHER PUBLICATIONS

"Office Action of Japan Counterpart Application," with English translation thereof, dated Nov. 19, 2019, p. 1-p. 9.

(Continued)

Primary Examiner — Chanceity N Robinson
(74) Attorney, Agent, or Firm — JCIPRNET

(57) ABSTRACT

A liquid crystal compound comprising a specific compound having a positive dielectric anisotropy as the first component, and a specific compound having a low viscosity as a second component. Further, the liquid crystal compound may contain a specific compound having a positive dielectric anisotropy as the third component, a specific compound having a maximum temperature or a low viscosity as the fourth component, or a specific compound having a negative dielectric anisotropy as the fifth component.

18 Claims, No Drawings

(56) References Cited

FOREIGN PATENT DOCUMENTS

| | | | |
|---|---|---|---|
| JP | 2006070080 A | * | 3/2006 |
| JP | 2007-091796 | | 4/2007 |
| JP | 2008-038018 | | 2/2008 |
| JP | 2011153202 | | 8/2011 |
| WO | 9611897 | | 4/1996 |
| WO | 2010067661 | | 6/2010 |
| WO | 2014125911 | | 8/2014 |

OTHER PUBLICATIONS

"Action of Japan Counterpart Application," with English translation thereof, dated Dec. 3, 2019, p. 1-p. 9.

* cited by examiner

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2016-151121, filed on Aug. 1, 2016, and Japan application serial no. 2016-151814, filed on Aug. 2, 2016. The entirety of each of the above-mentioned patent applications is hereby incorporated by reference herein and made a part of this specification.

BACKGROUND OF THE INVENTION

Field of the Invention

The present invention is related to liquid crystal compositions, liquid crystal display devices including the composition as well as other related uses. Particularly, the invention relates to a liquid crystal composition having positive dielectric anisotropy and an AM (active matrix) device which includes the composition and having an operating mode of TN, OCB, IPS, FFS or FPA.

Description of the Related Art

In liquid crystal display devices, classifications based on an operating mode for liquid crystal molecules includes various modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). Classifications based on a driving mode in the device includes PM (passive matrix) and AM (active matrix). The PM is classified into types such as static and multiplex, and the AM is classified into types such as TFT (thin film transistor) and MIM (metal-insulator-metal). The TFT can be further classified into types such as amorphous silicon and polycrystal silicon. Polycrystal silicon can then be classified into a high temperature type or a low temperature type depending on the production process. Various classifications based on a light source in the device include reflection types utilizing natural light, transmission types utilizing a backlight and semi-transmission types utilizing both natural light and a backlight.

The liquid crystal display device includes a liquid crystal composition having a nematic phase. This composition has suitable characteristics. An AM device having good characteristics can be obtained by improving the characteristics of the composition. Table 1 below summarizes the relationship between these characteristics. The characteristics of the composition will be further explained based on a commercially available AM device. The temperature range in a nematic phase relates to the temperature range in which the device can be used. A desirable maximum temperature in the nematic phase is approximately 70° C. or higher and a desirable minimum temperature in the nematic phase is approximately −10° C. or lower. The viscosity of the composition relates to the response time of the device. A short response time is desirable for activities such as showing moving images on the device. A shorter response time, preferably as short as one millisecond, is favored. Thus, a lower viscosity of the composition is desirable. Moreover, a lower viscosity at a lower temperature is more desirable. Also, the elastic constant of the composition is related to the contrast ratio of the device. Thus, in order to increase the contrast ration of the device, a large elastic constant for the composition is desirable.

TABLE 1

Characteristics of Compositions and AM devices

| No. | Characteristics of Compositions | Characteristics of AM devices |
|---|---|---|
| 1 | Nematic phase has a broad temperature range | Device has a broad temperature range for operation |
| 2 | Low viscosity | Short response time |
| 3 | Suitable optical anisotropy | Large contrast ratio |
| 4 | Large positive or negative dielectric anisotropy | Low threshold voltage, low power consumption, and large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

The optical anisotropy of the composition relates to the contrast ratio of the device. Depending on the mode of the device, either a large optical anisotropy or a small optical anisotropy, i.e. a suitable optical anisotropy, is necessary. The product ($\Delta n \times d$) of the optical anisotropy ($\Delta n$) of the composition and the cell gap (d) of the device is designed so as to maximize the contrast ratio. A suitable value for the product depends on which type of operating mode is used. For operating modes such as TN, a suitable value is approximately 0.45 micrometer. In this case, a composition having a large optical anisotropy is desirable for a device having a small cell gap. A large dielectric anisotropy of the composition contributes to a low threshold voltage, to low power consumption and to a large contrast ratio with respect to the device. Thus, a large dielectric anisotropy is desirable. A large specific resistance of the composition contributes to a large voltage holding ratio and a large contrast ratio of the device. Thus, a composition having a large specific resistance not only at room temperature but also at a temperature close to the maximum temperature in the nematic phase is preferable in the initial stage. After long-term use, the composition preferably should have a large specific resistance not only at room temperature but also at a temperature close to the maximum temperature in the nematic phase. The stability of the composition when exposed to ultraviolet light and heat relates to the service life of the LCD device. The device has a long service life when the composition's stability to ultraviolet light and heat is high. These types of characteristics are desirable for an AM device used as a liquid crystal projector such as in a liquid crystal television.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is also used for a PSA (polymer sustained alignment) type AM device. An example of the liquid crystal composition having positive dielectric anisotropy is disclosed in Patent Document 1.

BACKGROUND ART DOCUMENT

Patent Documents

[Patent Document 1]
  Japanese Unexamined Patent Publication No. 4(1992)-18089
[Patent Document 2]
  Japanese Unexamined Patent Publication No. 2000-87039
[Patent Document 3]
  Japanese Unexamined Patent Publication No. 2006-8928
[Patent Document 4]
  Japanese Unexamined Patent Publication No. 2006-70080
[Patent Document 5]
  Japanese Unexamined Patent Publication No. 2007-91796
[Patent Document 6]
  WO1996/11897
[Patent Document 7]
  Japanese Unexamined Patent Publication No. 2008-38018
[Patent Document 8]
  WO2010/67661

BRIEF SUMMARY OF THE INVENTION

The invention provides a liquid crystal composition which contains at least one suitable characteristic such as a high maximum temperature in a nematic phase, a low minimum temperature in a nematic phase, a low viscosity, a suitable optical anisotropy, a large dielectric anisotropy, a large dielectric anisotropy in the minor axis direction of the liquid crystal molecules, a large specific resistance, a high stability to ultraviolet light, a high stability to heat and a large elastic constant. The invention also provides a liquid crystal composition that is suitably balanced between at least two of the characteristics. The invention further provides a liquid crystal display device containing the composition. The invention additionally provides an AM device that has characteristics such as a short response time, a large voltage holding ratio, a low threshold voltage, a large contrast ratio, a long service life.

The present invention is related to a liquid crystal composition comprising:

at least one compound that is selected from compounds represented by formula (1A) as a first component; and at least one compound that is selected from the compounds represented by formula (2) as a second component, wherein the liquid crystal composition has a nematic phase.

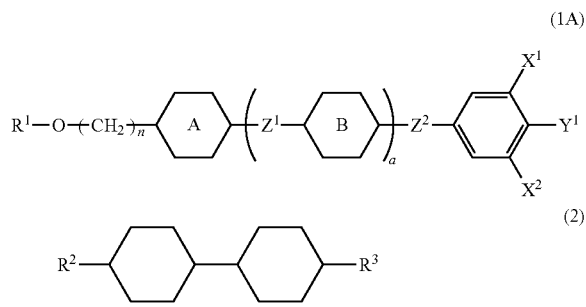

Where in formulas (1A) and (2) $R^1$ is an alkyl having a carbon number from 1 to 12 or an alkenyl having a carbon number from 2 to 12, and in these groups at least one —$CH_2$— may be substituted by —O—; $R^2$ and $R^3$ are each an alkyl having a carbon number from 1 to 12, an alkoxy having a carbon number from 1 to 12, an alkenyl having a carbon number from 2 to 12, an alkyl having a carbon number from 1 to 12 in which at least one hydrogen may be substituted by fluorine or chlorine, or an alkenyl having a carbon number from 2 to 12 in which at least one hydrogen may be substituted by fluorine or chlorine; ring A is 1,4-cyclohexylene 1,4-cyclohexenylene, tetrahydropyran-2,5-diyl, or 1,3-dioxane-2,5-diyl; ring B is an independent 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ and $Z^2$ are each a single bond, ethylene, methyleneoxy, carbonyloxy, or difluoromethyleneoxy; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; a has a value of 0, 1, 2, or 3; n has a value of 0, 1, 2, or 3.

One of the advantages of this invention is to provide a liquid crystal composition that satisfies at least one of the suitable characteristics such as having a high maximum temperature in the nematic phase, a low minimum temperature in the nematic phase, a low viscosity, a suitable optical anisotropy, a large dielectric anisotropy, a large dielectric anisotropy in the minor axis direction of the liquid crystal molecule, a large specific resistance, a high stability with regard to ultraviolet light, a high stability with regard to heat and a large elastic constant. Another advantage is to provide a liquid crystal composition that is suitably balanced between at least two of the characteristics. A further advantage is to provide a liquid crystal display device containing the composition. An additional advantage is to provide an AM device that has characteristics such as a short response time, a large voltage holding ratio, a low threshold voltage, a large contrast ratio, and a long service life.

DETAILED DESCRIPTION OF THE INVENTION

The usage of the terms in the specification and claims of the present application is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, or a compound which does not have liquid crystal phases but being mixed with a composition for the purpose of adjusting the characteristics such as the temperature range in a nematic phase, the viscosity and the dielectric anisotropy. The compound has a six-membered ring such as 1,4-cyclohexylene or 1,4-phenylene with a rod-like molecular structure. "Polymerizable compound" is a compound which is added to a composition in order to form a polymer. Thus, a liquid crystal compound having alkenyl is not polymerizable in that sense.

A liquid crystal composition is prepared by mixing a plurality of liquid crystal compounds. One or more additives such as an optically active compound, an antioxidant, an ultraviolet light absorber, a coloring matter, an antifoaming agent, a polymerizable compound, a polymerization initiator, a polymerization inhibitor, and a polar compound can be added to this liquid crystal composition as required. The content ratio of a liquid crystal compound (content) is expressed as a percentage by weight (wt %) based on the weight of the liquid crystal composition, even if some additive are added in the liquid crystal composition. The content ratio of the additive is expressed as a percentage by weight (wt %) based on the weight of the liquid crystal composition not including additives. That is, the content ratio of the liquid crystal compound and the content ratio of the additive are calculated based on the total weight of the liquid crystal compound. Weight parts per million (ppm) may sometimes be used. As an exception to this general rule, the content ratio of the polymerization initiator or polymerization inhibitor are expressed on the basis of the weight of the polymerizable compound.

"The maximum limit of the temperature range in the nematic phase" is sometimes abbreviated as "the maximum temperature." "The minimum limit of the temperature range in the nematic phase" is sometimes abbreviated to "the minimum temperature." "High resistivity" means that a composition has a large specific resistance not only at room temperature but also at a temperature close to the maximum temperature in the nematic phase at the initial stage, and after the composition has been used for a long time, the composition not only at room temperature but also at the maximum temperature in the nematic phase still has a large specific resistance. "A large voltage holding ratio" means that a device has a large voltage holding ratio at a temperature close to the maximum temperature in the nematic phase as well as at room temperature in the initial stages, and that the device has a large voltage holding ratio at a temperature close to the maximum temperature in the nematic phase as well as at room temperature, after the device has been used for a long time. For both compositions and devices, the characteristics may be examined before and after a time-dependent change test (including an accelerated deterioration test). The expression "increased dielectric anisotropy" means that the dielectric anisotropy value increases positively when the composition has positive dielectric anisotropy, and that this value decreases when the composition has a negative dielectric anisotropy.

The compounds represented by formula (1) may sometimes be abbreviated to "compound (1)". At least one compound selected from compounds represented by formula (1) may sometimes be abbreviated to "compound (1)." The expression "compound (1)" may refer to one compound, a mixture of two compounds, or a mixture of three or more compounds, which are represented by formula (1). The above rules may also apply to a compound represented by another formula. The expression "at least one 'A'" means that the number of 'A's used is arbitrary. The expression "at least one 'A' may be substituted by 'B'" means that the position of 'A' is arbitrary regardless of how many 'A's are present. This rule also applies to the expression "at least one 'A' is substituted by 'B'".

The expression "at least one —CH$_2$— may be substituted by —O—" and the like may also be used in this application. In this case, —CH$_2$—CH$_2$—CH$_2$— may be substituted by —O—CH$_2$—O— or any substitution form in which the —CH$_2$— is replaced with an —O— which is not adjacent to another —O—. However, there is no case in which two adjacent —CH$_2$— are replaced with —O—, because then —O—O—CH$_2$-(peroxide) will be generated. In other words, this expression can refer to both when only "one —CH$_2$— may be substituted by —O—" and when "at least two nonadjacent —CH$_2$— may be substituted by —O—". This rule applies not only to the substitution of —CH$_2$— to —O— but also to the substitution of —CH$_2$— to a divalent substituent such as —CH=CH— or —COO—.

The symbol for the terminal group R$^1$ is used for a plurality of compounds in the chemical formulas of component compounds. For these compounds, two groups represented by two arbitrary "R$^1$"s may be the same or different. In one case, for example, the R$^1$ of compound (1-1) is ethyl and the R$^1$ of compound (1-2) is also ethyl. In a different example, the R$^1$ of compound (1-1) is ethyl but the R$^1$ of compound (1-2) is propyl. This same rule also applies to symbols for other terminal groups. In formula (1), when "a" is 2, there are two ring Bs present. In this compound, the two groups represented by the two ring Bs may be the same or different. This same rule applies to any arbitrary two ring Bs, when "a" is greater than 2. The same rule also applies for symbols such as Z$^3$ and ring C.

2-Fluoro-1,4-phenylene refers to the two divalent groups described below. Fluorine may face left (L) or face right (R) in the chemical formula. The same rule also applies to an asymmetric divalent group formed from a ring by removing two hydrogens, such as with tetrahydropyran-2,5-diyl. The same rule also applies to the bonding groups of a divalent such as carbonyloxy (—COO— and —OCO—).

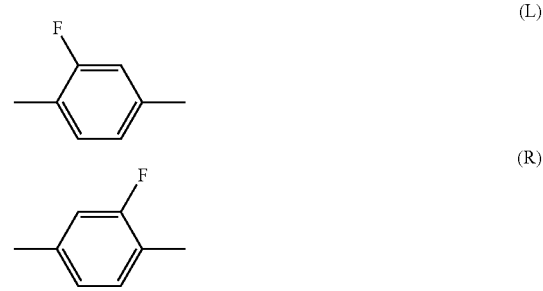

The alkyl of the liquid crystal compound may be linear or branched and does not contain cyclic alkyl. Linear alkyl is preferred over branched alkyl. The same is also true for terminal groups such as alkoxy, alkenyl and the like. For the configuration of 1,4-cyclohexylene, trans is preferable to cis in order to increase the maximum temperature.

The subject matter of the present application includes the following aspects.

Aspect 1. A liquid crystal composition comprising:
at least one compound that is selected from compounds represented by formula (1A) as a first component; and
at least one compound that is selected from the compounds represented by formula (2) as a second component,
and the liquid crystal composition has a nematic phase.

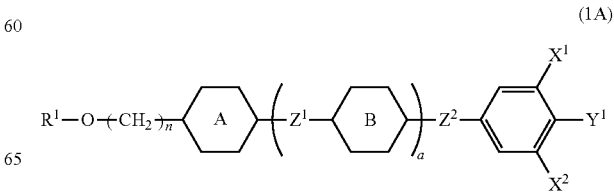

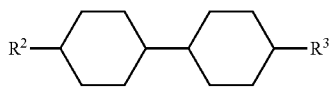

(2)

Where in formulas (1A) and (2), $R^1$ is an alkyl having a carbon number from 1 to 12 or an alkenyl having a carbon number from 2 to 12, and in these groups at least one —$CH_2$— may be substituted by —O—; $R^2$ and $R^3$ are each an alkyl having a carbon number from 1 to 12, an alkoxy having a carbon number from 1 to 12, an alkenyl having a carbon number from 2 to 12, an alkyl having a carbon number from 1 to 12 in which at least one hydrogen may be substituted by fluorine or chlorine, or an alkenyl having a carbon number from 2 to 12 in which at least one hydrogen may be substituted by fluorine or chlorine; ring A is 1,4-cyclohexylene, 1,4-cyclohexenylene, tetrahydropyran-2,5-diyl, or 1,3-dioxane-2,5-diyl; ring B is 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, or tetrahydropyran-2,5-diyl; $Z^1$ and $Z^2$ are each a single bond, ethylene, methyleneoxy, carbonyloxy, or difluoromethyleneoxy; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; a has a value of 0, 1, 2, or 3; n has a value of 0, 1, 2, or 3.

Aspect 2. A liquid crystal composition as defined in Aspect 1, wherein the first component is at least one compound selected from compounds represented by formula (1); and the second component is at least one compound selected from compounds represented by formula (2), and the liquid crystal composition has a nematic phase.

(1)

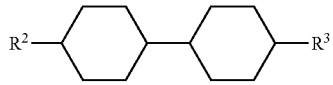

(2)

Where in formulas (1) and (2) $R^1$ is an alkyl having a carbon number from 1 to 12 or an alkenyl having a carbon number from 2 to 12, and in these group at least one —$CH_2$— may be substituted by —O—; $R^2$ and $R^3$ each are an alkyl having a carbon number from 1 to 12, an alkoxy having a carbon number from 1 to 12, an alkenyl having a carbon number from 2 to 12, an alkyl having a carbon number from 1 to 12 in which at least one hydrogen can be substituted by fluorine or chlorine, or an alkenyl having a carbon number from 2 to 12 in which at least one hydrogen can be substituted by fluorine or chlorine; ring A is tetrahydropyran-2,5-diyl or 1,3-dioxane-2,5-diyl; ring B is an independent 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ and $Z^2$ are each a single bond, ethylene, methyleneoxy, carbonyloxy, or difluoromethyleneoxy, and at least one of either $Z^1$ or $Z^2$ is difluoromethyleneoxy; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; a has a value of 0, 1, 2, or 3; n has a value of 0, 1, 2, or 3.

Aspect 3. A liquid crystal composition as defined in Aspect 2, wherein the first component is at least one compound selected from the group of compounds represented by formulas (1-1) to (1-9).

-continued

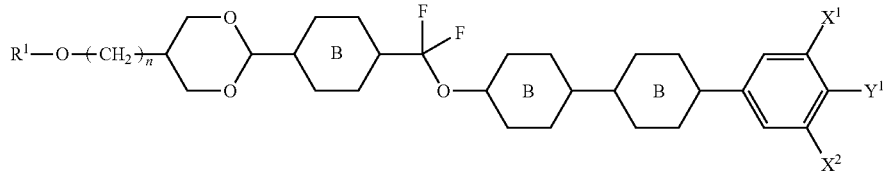
(1-4)

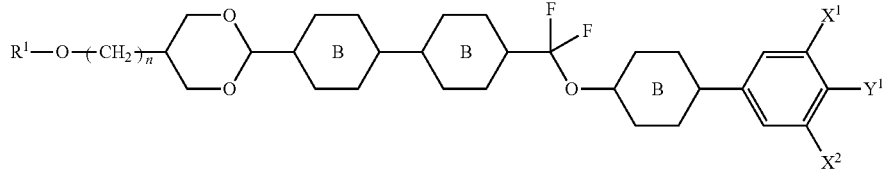
(1-5)

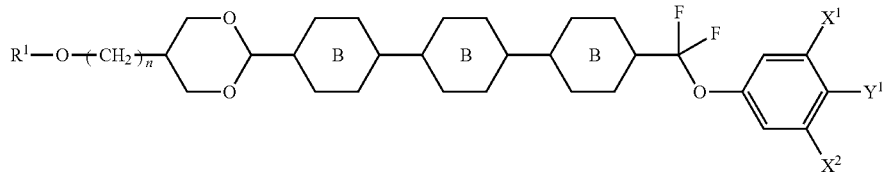
(1-6)

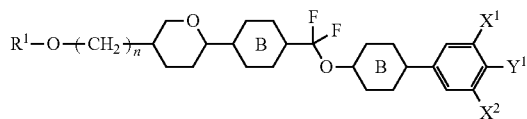
(1-7)

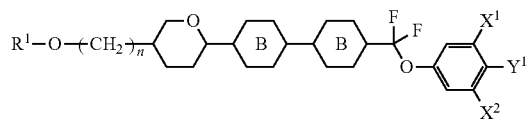
(1-8)

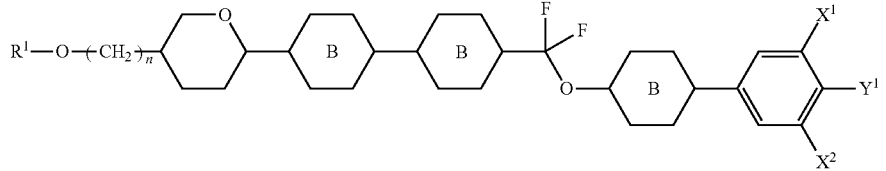
(1-9)

Where in formulas (1-1) to (1-9) R¹ is an alkyl having a carbon number from 1 to 12 or an alkenyl having a carbon number from 2 to 12, in these groups at least one —CH₂— may be substituted by —O—; ring B is an independent 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; X¹ and X² are each either hydrogen or fluorine; Y¹ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; n has a value of 0, 1, 2, or 3.

Aspect 4. A liquid crystal composition as defined in Aspect 2, wherein the first component is at least one compound selected from the group of compounds represented in formulas (1-1-1) to (1-1-4), formulas (1-2-1) to (1-2-5), formulas (1-3-1) to (1-3-5), formula (1-5-1), formula (1-6-1), formulas (1-7-1) to (1-7-5), formulas (1-8-1) to (1-8-5), and formula (1-9-1).

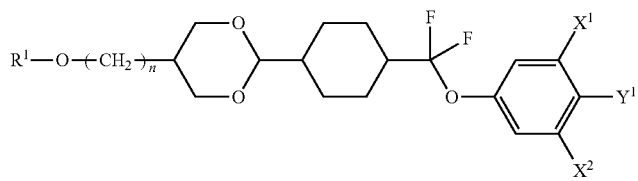
(1-1-1)

-continued
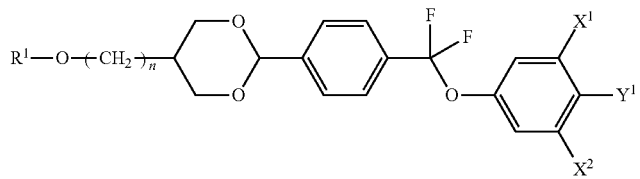 (1-1-2)
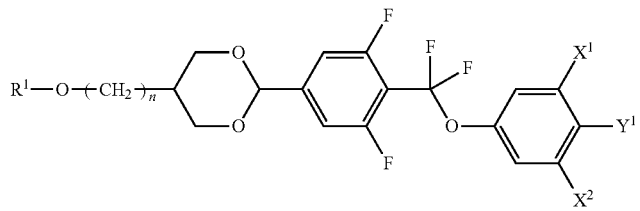 (1-1-3)
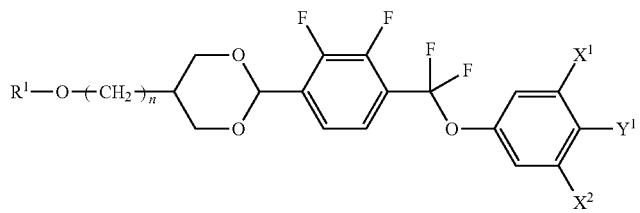 (1-1-4)
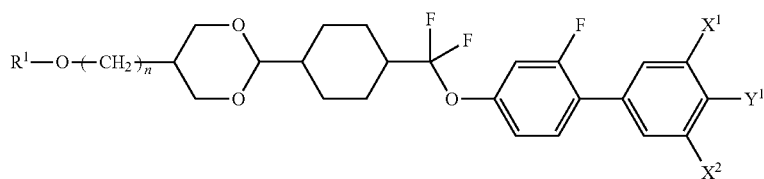 (1-2-1)
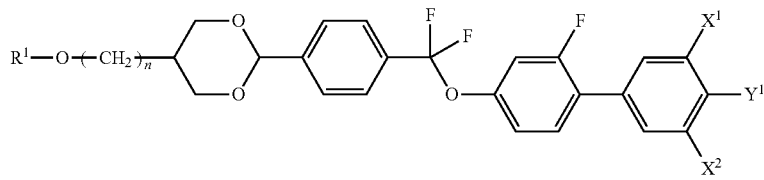 (1-2-2)
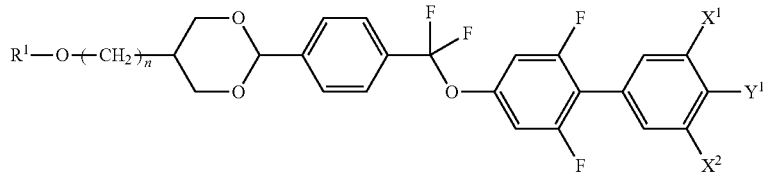 (1-2-3)
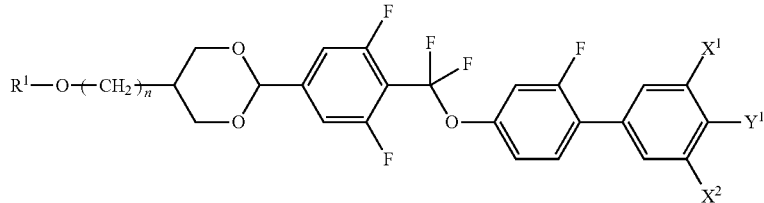 (1-2-4)
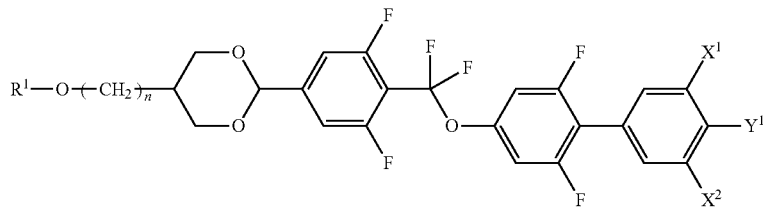 (1-2-5)

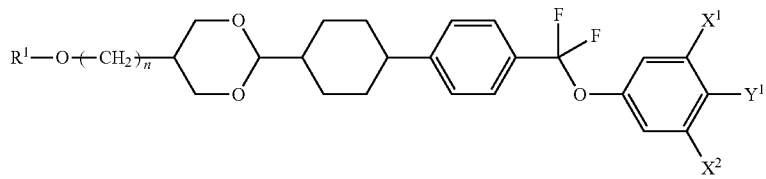
(1-3-1)
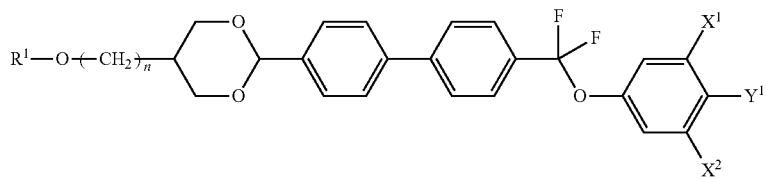
(1-3-2)
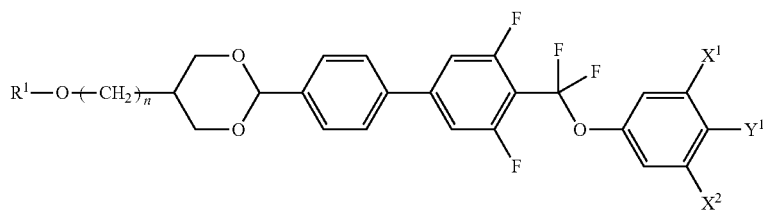
(1-3-3)
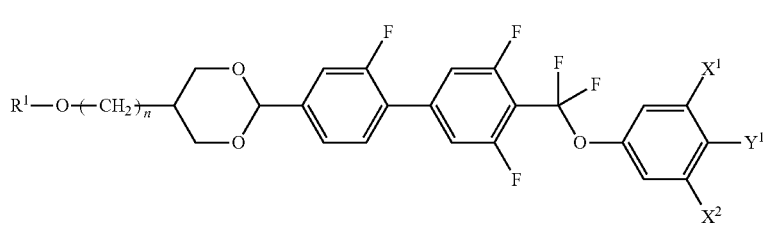
(1-3-4)
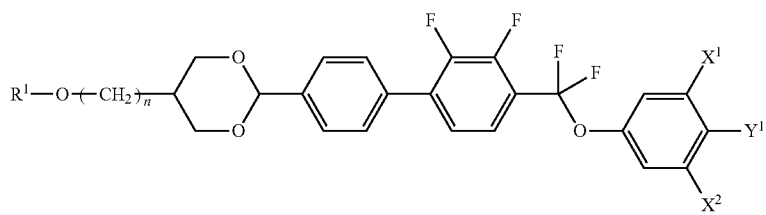
(1-3-5)
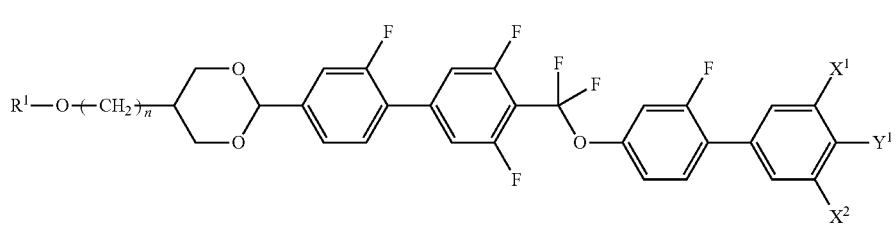
(1-5-1)
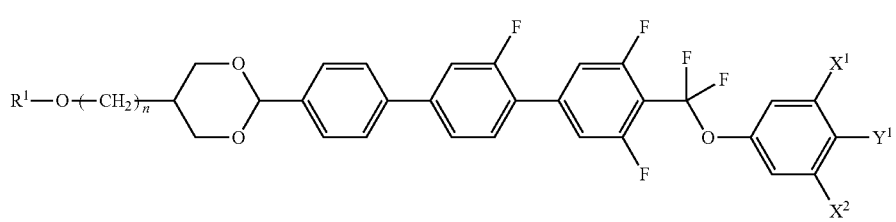
(1-6-1)
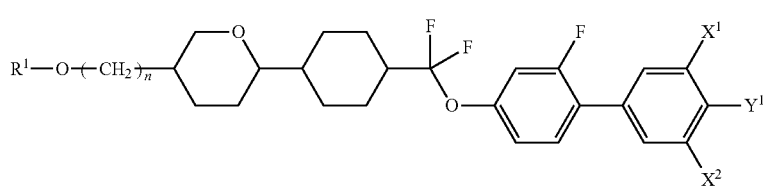
(1-7-1)

-continued
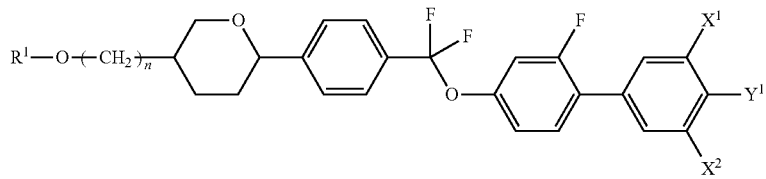
(1-7-2)
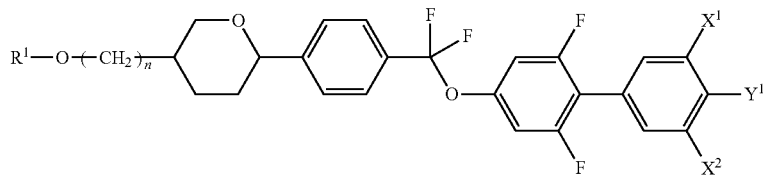
(1-7-3)
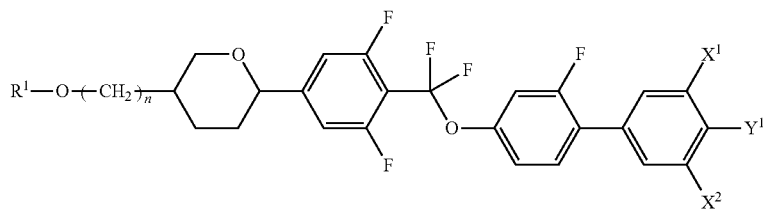
(1-7-4)
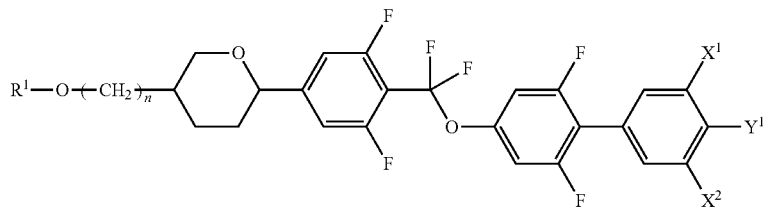
(1-7-5)
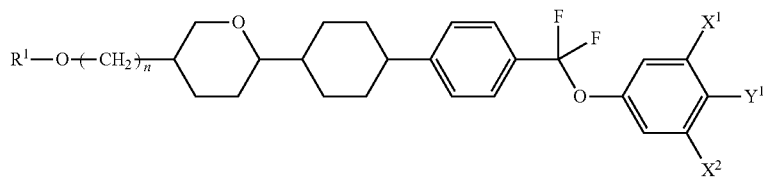
(1-8-1)
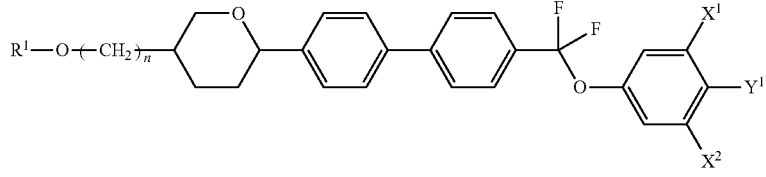
(1-8-2)
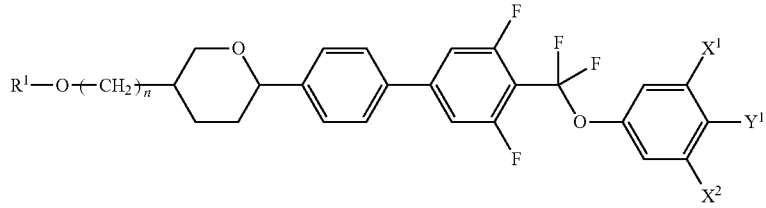
(1-8-3)
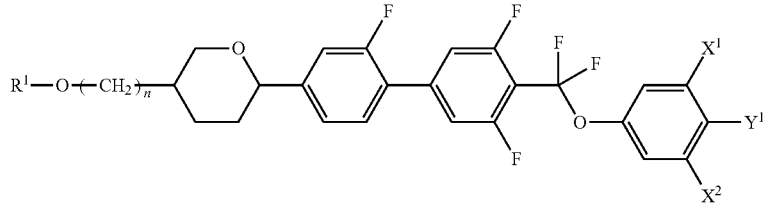
(1-8-4)

(1-8-5)

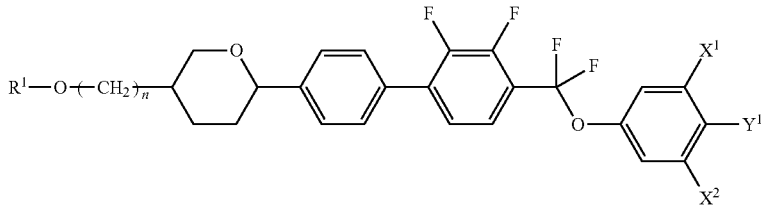

(1-9-1)

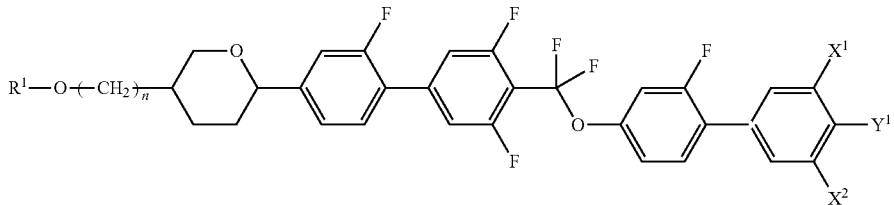

Where in formulas (1-1-1) to (1-1-4), formulas (1-2-1) to (1-2-1), formulas (1-3-1) to (1-3-5), formula (1-5-1), formula (1-6-1), formulas (1-7-1) to (1-7-5), formulas (1-8-1) to (1-8-5), and formula (1-9-1) $R^1$ is an alkyl having a carbon number from 1 to 12 or an alkenyl having a carbon number from 2 to 12, and in these groups at least one —$CH_2$— may be substituted by —O—; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; n has a value of 0, 1, 2, or 3.

Aspect 5. A liquid crystal composition as defined in Aspect 1, wherein the first component is at least one compound selected from compounds represented by formula (1'); and
the second component is at least one compound selected from compounds represented by formula (2), and the liquid crystal composition has a nematic phase.

(1')

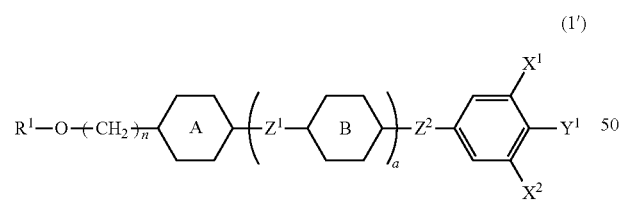

(2)

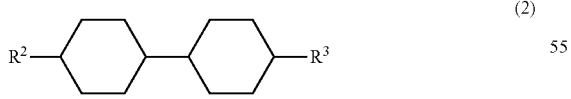

Where in formulas (1') and (2) $R^1$ is an alkyl having a carbon number from 1 to 12 or an alkenyl having a carbon number from 2 to 12, and in these groups at least one —$CH_2$— may be substituted by —O—; $R^2$ and $R^3$ are each an alkyl having a carbon number from 1 to 12, an alkoxy having a carbon number from 1 to 12, an alkenyl having a carbon number from 2 to 12, an alkyl having a carbon number from 1 to 12 in which at least one hydrogen may be substituted by fluorine or chlorine, or an alkenyl having a carbon number from 2 to 12 in which at least one hydrogen may be substituted by fluorine or chlorine; ring A is 1,4-cyclohexylene or 1,4-cyclohexenylene; ring B is 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, or tetrahydropyran-2,5-diyl; $Z^1$ and $Z^2$ are each a single bond, ethylene, methyleneoxy, carbonyloxy, or difluoromethyleneoxy; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; a has a value of 0, 1, 2 or 3; when a has a value of 1 and $Z^2$ is difluoromethyleneoxy, ring B is 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; n has a value of 1, 2, or 3.

Aspect 6. A liquid crystal composition as defined in Aspect 5, wherein the first component is at least one compound selected from the group of compounds represented by formulas (1'-1) to (1'-10).

(1'-1)

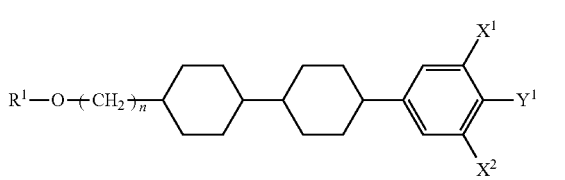

(1'-2)

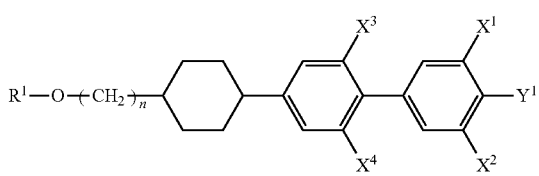

-continued (1'-3)
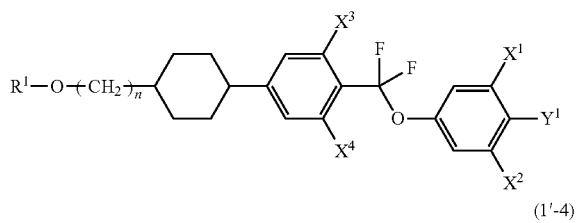

(1'-4)
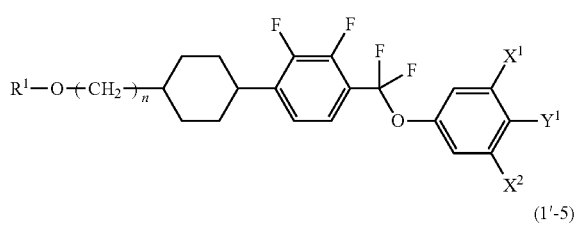

(1'-5)
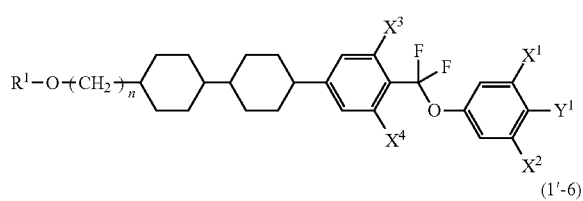

(1'-6)
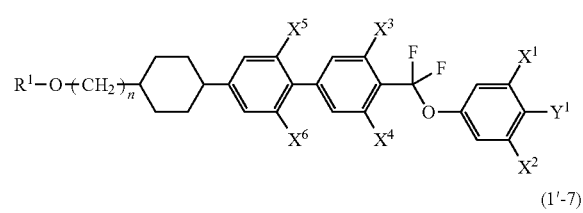

(1'-7)
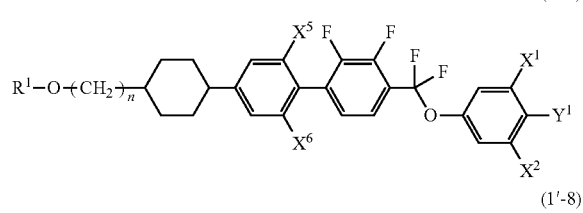

(1'-8)
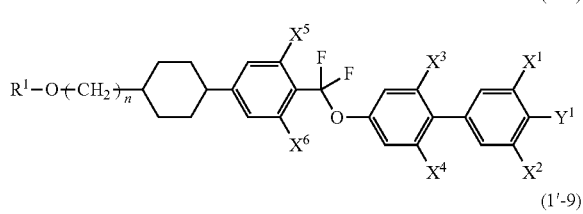

(1'-9)
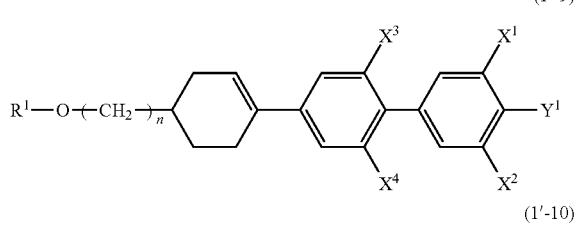

(1'-10)
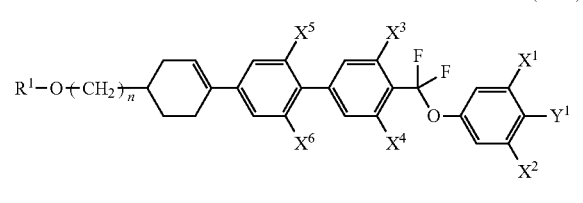

Where in formulas (1'-1) to (1'-10) $R^1$ is an alkyl having a carbon number from 1 to 12 or an alkenyl having a carbon number from 2 to 12, and in these groups at least one —$CH_2$— may be substituted by —O—; $X^1$, $X^2$, $X^3$, $X^4$, $X^5$, and $X^6$ are each either hydrogen or fluorine; $Y^1$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; n has a value of 1, 2, or 3.

Aspect 7. A liquid crystal composition as defined in one of the Aspect 1 to 6, wherein the first component is within the range of 1 wt % to 30 wt %, and the second component is within the range of 5 wt % to 70 wt %.

Aspect 8. A liquid crystal composition as defined in one of Aspect 1 to 7, which contains at least one compound selected from compounds represented by formula (3) as a third component.

(3)
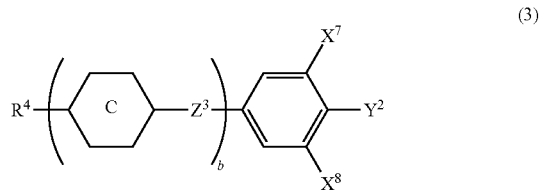

Where in formula (3) $R^4$ is an alkyl having a carbon number from 1 to 12, an alkoxy having a carbon number from 1 to 12, or an alkenyl having a carbon number from 2 to 12; ring C is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, or tetrahydropyran-2,5-diyl; $Z^3$ is a single bond, ethylene, carbonyloxy, or difluoromethyleneoxy; $X^7$ and $X^8$ are each either hydrogen or fluorine; $Y^2$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by chlorine or chlorine, or an alkenyloxy having a carbon number from 2 to 12 in which at least one hydrogen may be substituted by fluorine or chlorine; b has a value of 1, 2, 3, or 4.

Aspect 9. A liquid crystal composition as defined in one of Aspect 1 to 8, which contains at least one compound selected from the group of compounds represented by formulas (3-1) to (3-35) as a third component.

(3-1)
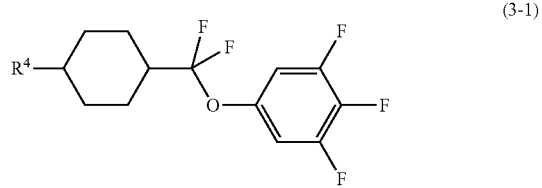

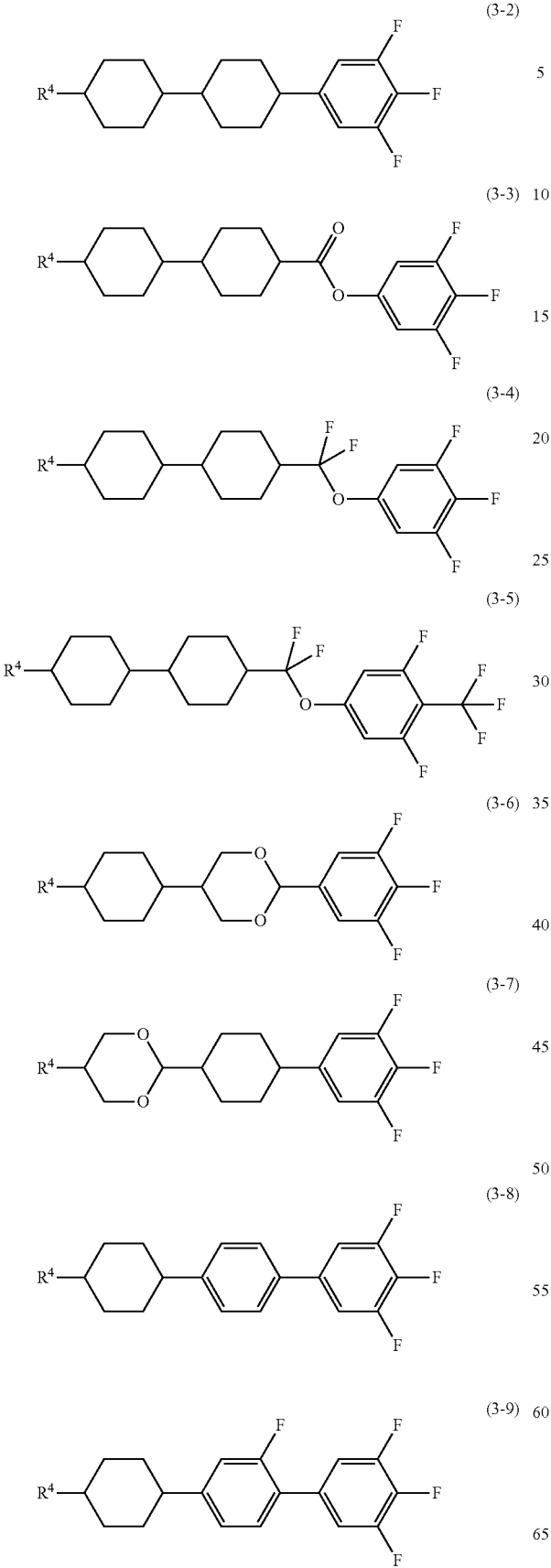
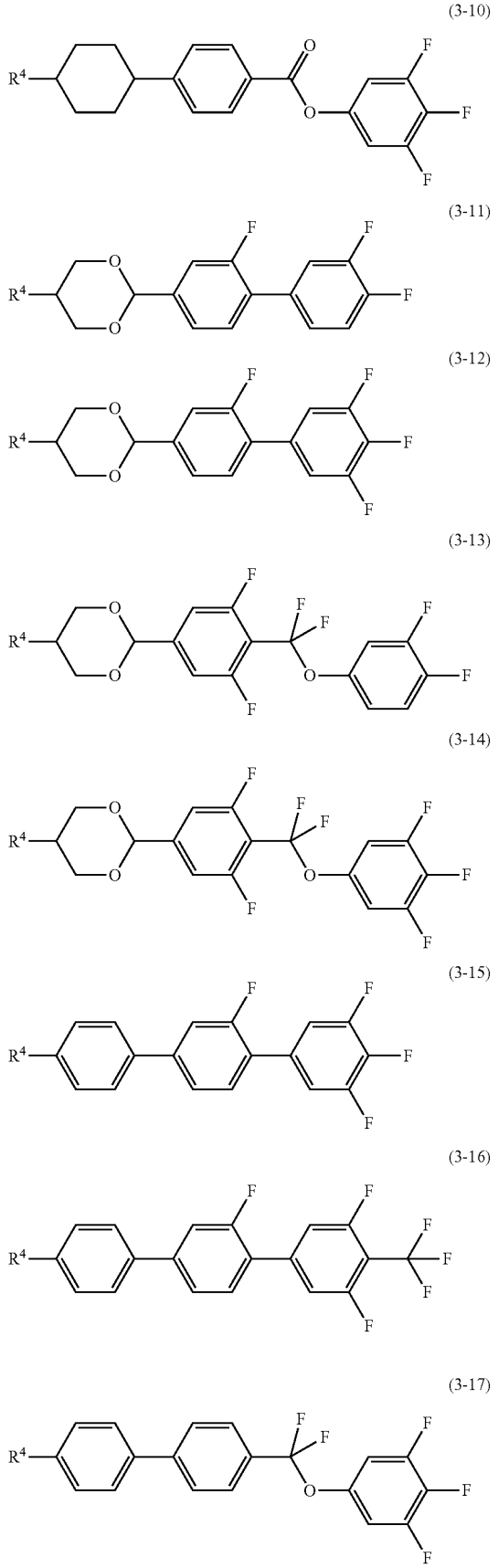

(3-18)
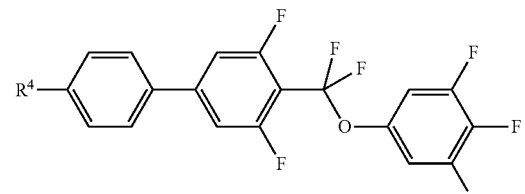
(3-19)
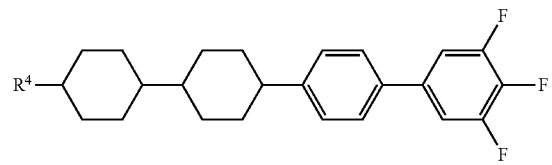
(3-20)
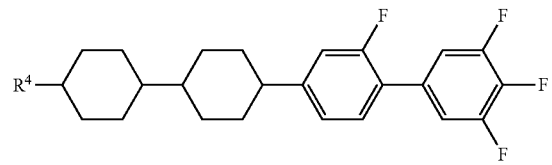
(3-21)
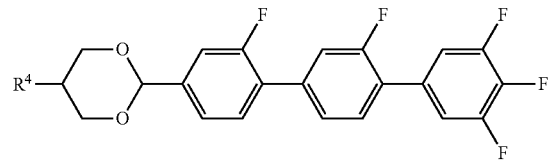
(3-22)
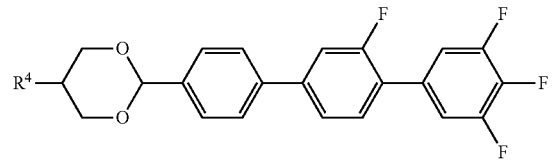
(3-23)
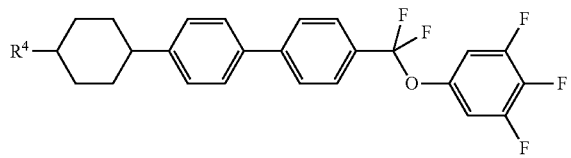
(3-24)
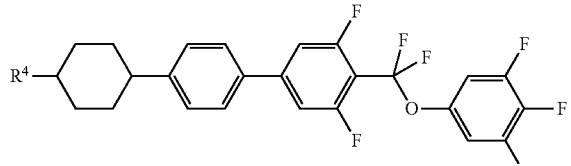
(3-25)
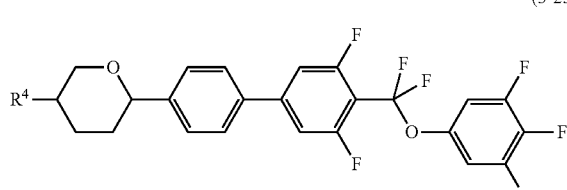
(3-26)
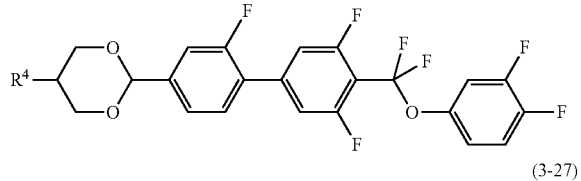
(3-27)
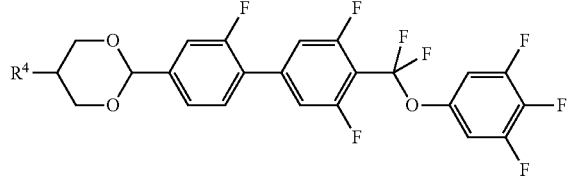
(3-28)
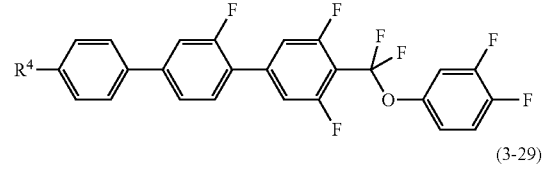
(3-29)
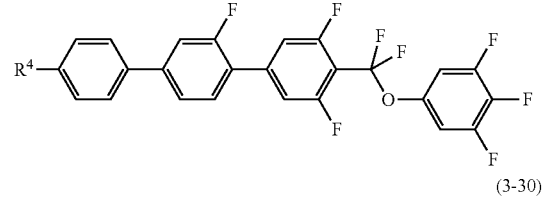
(3-30)
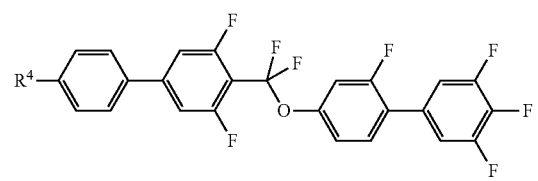
(3-31)
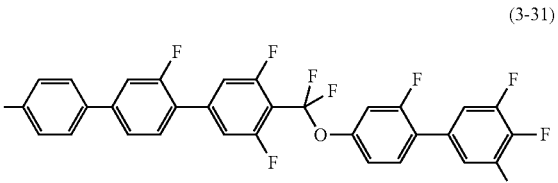
(3-32)
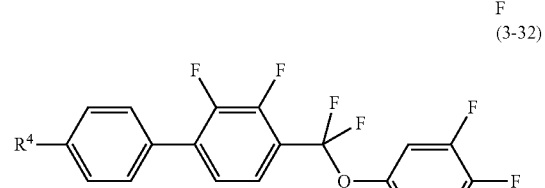
(3-33)
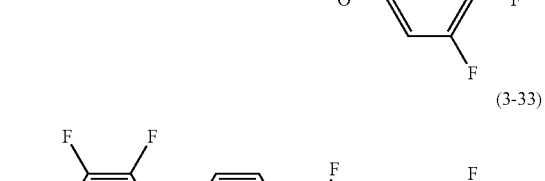

(3-34)

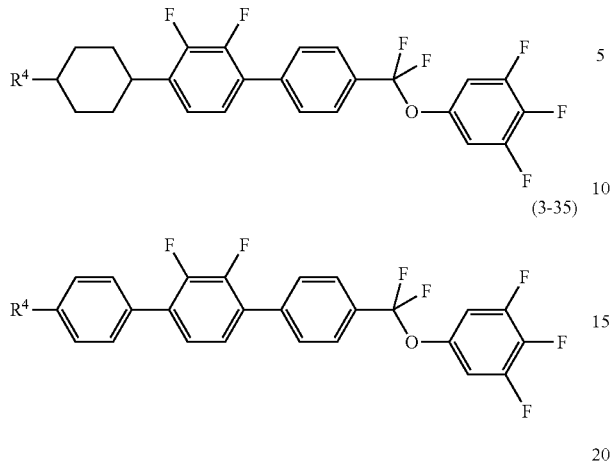

(3-35)

Where in formulas (3-1) to (3-35) $R^1$ is an alkyl having a carbon number from 1 to 12, an alkoxy having a carbon number from 1 to 12, or an alkenyl having a carbon number from 2 to 12.

Aspect 10. A liquid crystal composition as defined in Aspect 8 or Aspect 9, wherein the third component is within the range of 10 wt % to 80 wt %.

Aspect 11. A liquid crystal composition as defined in Aspect 1 to 10, wherein the composition contains at least one compound selected from compounds represented by formula (4) as a fourth component.

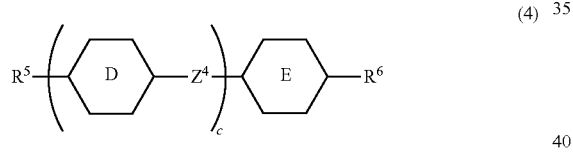

(4)

Where in formula (4) $R^5$ and $R^6$ are each an alkyl having a carbon number from 1 to 12, an alkoxy having a carbon number from 1 to 12, or an alkenyl having a carbon number from 2 to 12, in which at least one hydrogen may be substituted by fluorine or chlorine; ring D and ring E are each 1,4-cyclohexylene, 1,4-phenylene, 2-fluoro-1,4-phenylene, or 2,5-difluoro-1,4-phenylene; $Z^4$ is a single bond, ethylene, or carbonyloxy; c has a value of 1, 2, or 3; when c is 1, ring E is 1,4-phenylene, 2-fluoro-1,4-phenylene, or 2,5-difluoro-, 4-phenylene.

Aspect 12. A liquid crystal composition as defined in Aspect 1 to 11, wherein the composition contains at least one compound selected from the group of compounds represented by formulas (4-1) to (4-12) as a fourth component.

(4-1)

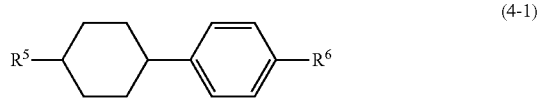

(4-2)

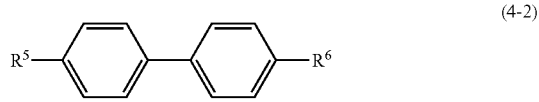

(4-3)

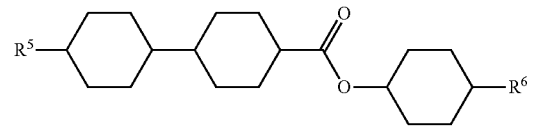

(4-4)

(4-5)

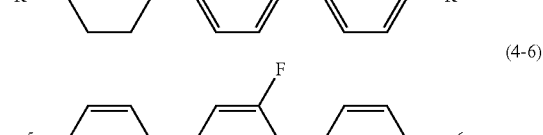

(4-6)

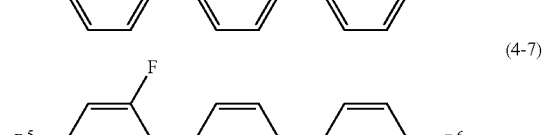

(4-7)

(4-8)

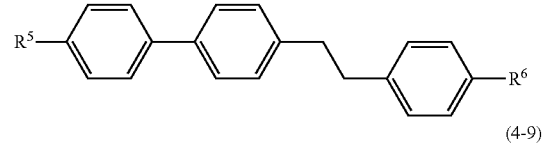

(4-9)

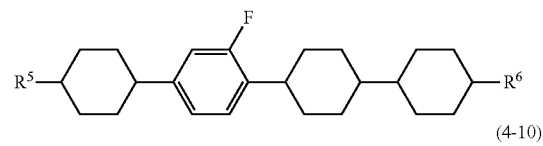

(4-10)

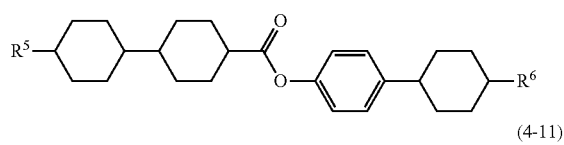

(4-11)

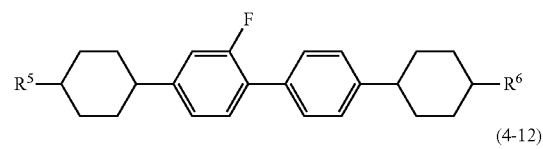

(4-12)

Where in formulas (4-1) to (4-12) $R^5$ and $R^6$ are each an alkyl having a carbon number from 1 to 12, an alkoxy having a carbon number from 1 to 12, an alkenyl having a carbon number from 2 to 12, or an alkenyl having a carbon number from 2 to 12 in which at least one hydrogen may be substituted by fluorine or chlorine.

Aspect 13. A liquid crystal composition as defined in Aspect 11 or 12, wherein the fourth component is within the range of 5 wt % to 60 wt %.

Aspect 14. A liquid crystal composition as defined in Aspect 1 to 13, wherein the composition contains at least one compound selected from compounds represented by formula (5) as a fifth component.

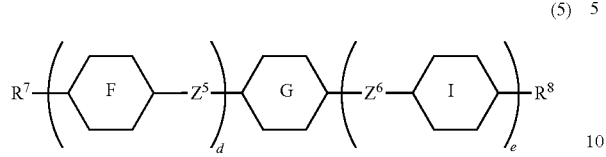
(5)

Where in formula (5) $R^7$ and $R^8$ are each an alkyl having a carbon number from 1 to 12, an alkoxy having a carbon number from 1 to 12, an alkenyl having a carbon number from 2 to 12 or an alkenyloxy having a carbon number from 2 to 12; ring F and ring I are each 1,4-cyclohexylene, 1,4-cyclohexenylene, 1,4-phenylene, 1,4-phenylene in which at least one hydrogen may be substituted by fluorine or chlorine, or tetrahydropyran-2,5-diyl; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl, or 7,8-difluorochroman-2,6-diyl; $Z^5$ and $Z^6$ are each a single bond, ethylene, carbonyloxy, or methyleneoxy; d has a value of 1, 2, or 3, e has a value of 0 or 1, the sum of d and e must have a value of 3 or less.

Aspect 15. A liquid crystal composition as defined in Aspect 1 to 14, which contains at least one compound selected from the group of compounds represented by formulas (5-1) to (5-22) as a fifth component.

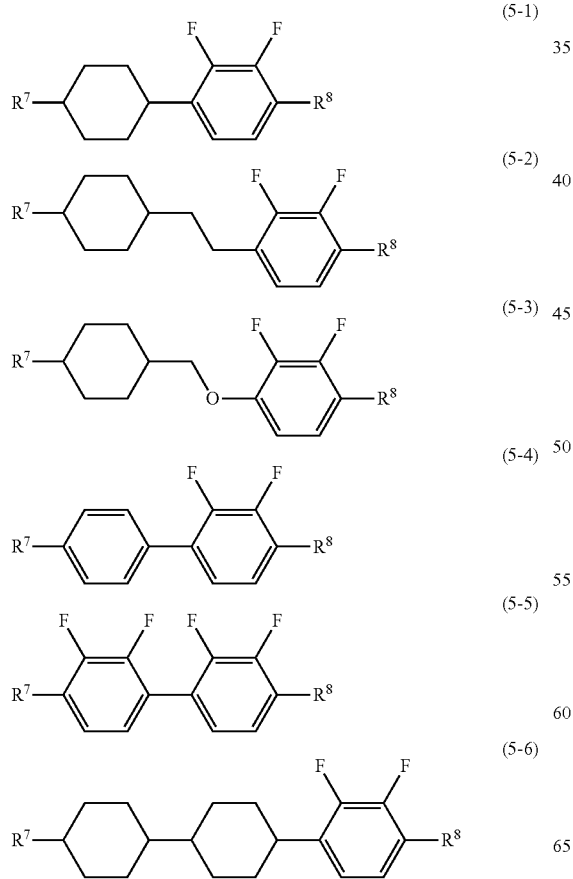

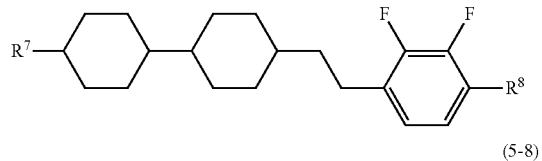
(5-7)

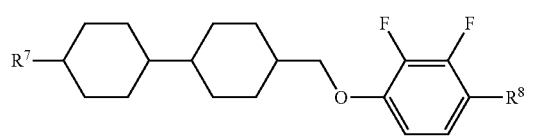
(5-8)

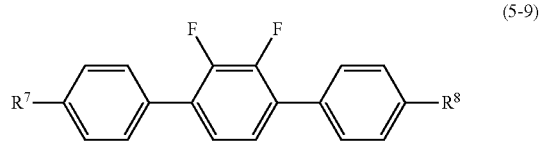
(5-9)

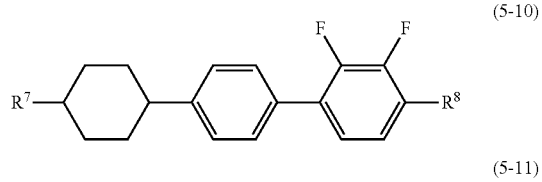
(5-10)

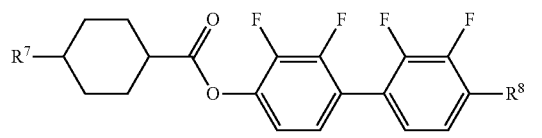
(5-11)

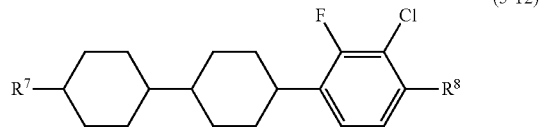
(5-12)

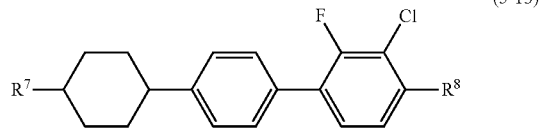
(5-13)

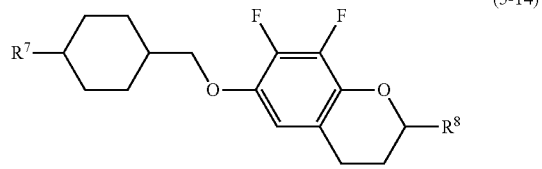
(5-14)

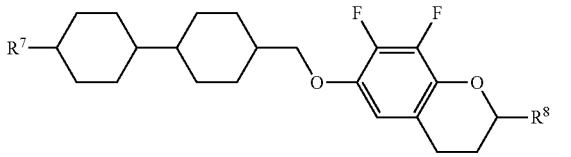
(5-15)

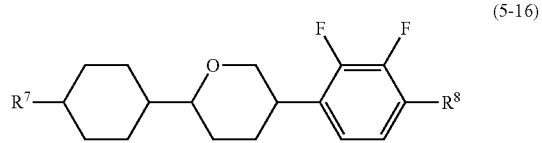
(5-16)

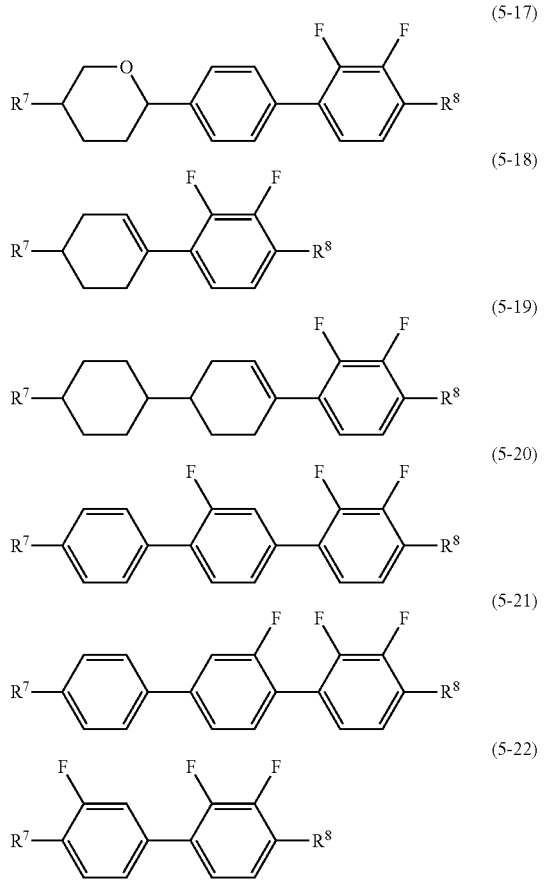

Where in formulas (5-1) to (5-22) $R^7$ and $R^8$ are each an alkyl having a carbon number from 1 to 12, an alkoxy having a carbon number from 1 to 12, an alkenyl having a carbon number from 2 to 12 or an alkenyloxy having a carbon number from 2 to 12.

Aspect 16. A liquid crystal composition as defined in Aspect 14 or 15, wherein the fifth component is within the range of 3 wt % to 30 wt %.

Aspect 17. A liquid crystal composition as defined in one of Aspect 1 to 16, wherein the maximum temperature in the nematic phase is 70° C. or higher, the optical anisotropy (measured at 25° C.) at a wavelength of 589 nm is 0.07 or more, and the dielectric anisotropy (measured at 25° C.) at a frequency of 1 kHz is 2 or more.

Aspect 18. A liquid crystal display device containing the liquid crystal composition as defined in one of Aspect 1 to 17.

Aspect 19. A liquid crystal display device as defined in Aspect 18, wherein the operating mode of the liquid crystal display device is the TN mode, the ECB mode, the OCB mode, the IPS mode, the FFS mode, or the FPA mode, and the driving method of the liquid crystal display device is the active matrix method.

The invention further includes the following Aspects. (a) The various compositions described above further including at least one additive such as an optically active compound, an antioxidant, an ultraviolet light absorber, a coloring matter, an antifoaming agent, a polymerizable compound, a polymerization initiator, a polymerization inhibitor, and a polar compound. (b) The AM device including the various compositions described above. (c) The various compositions described above further including a polymerizable compound, and a PSA (polymer sustained alignment) type AM device including the composition. (d) A PSA (polymer sustained alignment) type AM device, wherein the AM device includes the composition described above and a polymerizable compound in the composition is polymerized. (e) A device including the composition described above and having a mode of PC, TN, STN, ECB, OCB, IPS, VA, FFS or FPA. (f) A transmission-type device including the composition described above. (g) Use of the composition described above, as a composition having a nematic phase. (h) Use of the composition prepared by the addition of an optically active compound to the composition described above, as an optically active composition.

A liquid crystal composition in the liquid crystal display device of the invention will be explained in the following order. Firstly, the constitution of component compounds in the composition will be explained. Secondly, the main characteristics of the component compounds and the main effects of these compounds on the composition will be explained. Thirdly, a combination of the components in the composition, a desirable ratio of the components and the ratio's basis will be explained. Fourthly, a desirable embodiment of the component compounds will be explained. Fifthly, desirable component compounds will be shown. Sixthly, additives that may be added to the composition will be explained. Seventhly, methods for synthesizing the component compounds will be explained. Finally, the use of the composition will be explained.

Firstly, the constitution of component compounds in the composition will be explained. The compositions of the invention are classified into composition A and composition B. Composition A may further include any other liquid crystal compound, an additive or the like, in addition to liquid crystal compounds selected from compound (1), compound (2) and compound (3), compound (4), and compound (5). "Any other liquid crystal compound" is a liquid crystal compound that is different from compound (1), compound (2), compound (3), compound (4), and compound (5). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator, a polymerization inhibitor, and a polar compound.

Composition B consists essentially of a liquid crystal compound selected from compound (1), compound (2), compound (3), compound (4), and compound (5). The term "essentially" means that the composition may include an additive, but does not include any other liquid crystal compound. Composition B has a smaller number of components than composition A. Composition B is preferable to composition A from the perspective of cost reduction. Composition A is preferable to composition B in view of the fact that the suitable characteristics can be further adjusted by mixing the composition with any other liquid crystal compound.

Secondly, the main characteristics of the component compounds and the main effects of these compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S mean a classification based on a qualitative comparison among the component compounds, and 0 (zero) means that the value is zero or nearly zero.

TABLE 2

Characteristics of Compounds

| Characteristics | Compound (1) | Compound (2) | Compound (3) | Compound (4) | Compound (5) |
|---|---|---|---|---|---|
| Maximum Temperature | S-L | S | S-L | S-L | S-L |
| Viscosity | M-L | S | M-L | S-M | M-L |
| Optical Anisotropy | M-L | S | M-L | M-L | M-L |
| Dielectric Anisotropy | L | 0 | S-L | 0 | M-L[1)] |
| Specific Resistance | L | L | L | L | L |

[1)]The value of the dielectric anisotropy is negative, and the symbol expresses the magnitude of the absolute value.

The main effects of the component compounds on the characteristics of the composition upon mixing the component compounds with the composition are as follows. Compound (1) increases the dielectric anisotropy. Compound (2) decreases the viscosity, or decreases the minimum temperature. Compound (3) increases dielectric anisotropy. Compound (4) increases the maximum temperature or decreases the minimum temperature. Compound (5) increases the permittivity in the minor axis direction.

Thirdly, a combination of the components in the composition, a desirable ratio of the components and its basis will be explained. Possible desirable combinations of the components in the composition are: the first and second components; the first, second and third components; the first, second and fourth components; the first, second and fifth components; the first, second, third and fourth components; the first, second, third and fifth components; the first, second, fourth and fifth components; or the first, second, third, fourth and fifth components. One of the preferred combinations is the combination of the first, second, third and fourth components.

A desirable ratio for the first component is approximately 1% by weight or greater for increasing the dielectric anisotropy in the major axis in the liquid crystal molecule and approximately 30% by weight or less for decreasing the minimum temperature. A more desirable ratio is in the range of approximately 1% by weight to approximately 20% by weight. An especially desirable ratio is in the range of approximately 1% by weight to approximately 15% by weight.

A desirable ratio for the second component is approximately 5% by weight or greater for decreasing the viscosity, and approximately 80% by weight or less for increasing the dielectric anisotropy. A more desirable ratio is in the range of approximately 10% by weight to approximately 75% by weight. An especially desirable ratio is in the range of approximately 20% by weight to approximately 70% by weight.

A desirable ratio for the third component is approximately 10% by weight or greater for increasing the dielectric anisotropy, and approximately 80% by weight or less for decreasing the minimum temperature. A more desirable ratio is in the range of approximately 15% by weight to approximately 70% by weight. An especially desirable ratio is in the range of approximately 15% by weight to approximately 60% by weight.

A desirable ratio for the fourth component is approximately 5% or greater by weight for increasing the maximum temperature or decreasing the viscosity, and approximately 60% by weight or less for increasing dielectric anisotropy. A more desirable ratio is in the range of approximately 5% by weight to approximately 50% by weight. An especially desirable ratio is in the range of approximately 10% by weight to approximately 40% by weight.

A desirable ratio for the fifth component is approximately 2% by weight or greater for increasing the anisotropy in the minor axis of the crystal liquid molecules, and approximately 30% by weight or less for decreasing the minimum temperature. A more desirable ratio is in the range of approximately 2% by weight to approximately 20% by weight. An especially desirable ratio is in the range of approximately 2% by weight to approximately 10% by weight.

Fourthly, a desirable embodiment of the component compounds will be explained. In formula (1), formula (2), formula (3), formula (4), and formula (5), $R^1$ is an alkyl having a carbon number from 1 to 12 or alkenyl having a carbon number from 2 to 12, and in these groups one of the —$CH_2$— may be substituted by —O—. A desirable $R^1$ is an alkyl having a carbon number from 2 to 6 for decreasing the viscosity. $R^2$ and $R^3$ are each an alkyl having a carbon number from 1 to 12, an alkoxy having a carbon number from 1 to 12, an alkenyl having a carbon number from 2 to 12, an alkyl having a carbon number from 1 to 12 in which at least one hydrogen may be substituted by fluorine or chlorine, an alkenyl having a carbon number from 2 to 12 in which at least one hydrogen may be substituted by fluorine or chlorine. A desirable $R^2$ or $R^3$ is an alkenyl having a carbon number from 2 to 12 for decreasing the viscosity, and an alkyl having 1 to 12 carbons for increasing the stability with respect to heat and ultraviolet rays. $R^4$ is an alkyl having a carbon number from 1 to 12, an alkoxy having a carbon number from 1 to 12, or an alkenyl having a carbon number from 2 to 12. A desirable $R^4$ is an alkyl having a carbon number from 1 to 12 for increasing the stability with respect to heat and ultraviolet rays. $R^5$ and $R^6$ are each an alkyl having a carbon number from 1 to 12, an alkoxy having a carbon number from 1 to 12, an alkenyl having a carbon number from 2 to 12, or an alkenyl having a carbon number from 2 to 12 in which at least one hydrogen may be substituted by fluorine or chlorine. A desirable $R^5$ or $R^6$ is an alkenyl having a carbon number from 2 to 12 for decreasing the viscosity and an alkenyl having a carbon number from 2 to 12 for increasing the stability with respect to heat and ultraviolet rays. $R^7$ and $R^8$ are each an alkyl having a carbon number from 1 to 12, an alkoxy having a carbon number from 1 to 12, an alkenyl having a carbon number from 2 to 12, or an alkenyloxy having a carbon number from 2 to 12. A desirable $R^7$ or $R^8$ is an alkyl having a carbon number from 1 to 12 for increasing the stability with respect to heat and ultraviolet rays or alkoxy having a carbon number from 1 to 12 for increasing dielectric anisotropy in the minor axis direction of the liquid crystal molecules.

Desirable alkyls are methyl, ethyl, propyl, butyl, pentyl, hexyl, heptyl or octyl. The more desirable alkyls are methyl, ethyl, propyl, butyl or pentyl for decreasing the viscosity.

Desirable alkoxys are methoxy, ethoxy, propoxy, butoxy, pentyloxy, hexyloxy or heptyloxy. The more desirable alkoxys are methoxy or ethoxy for decreasing the viscosity.

Desirable alkenyls are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. The more desirable alkenyls are vinyl, 1-propenyl, 3-butenyl or 3-pentenyl for decreasing the viscosity. A desirable configuration of —CH═H— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl. In these alkenyls, linear alkenyls are preferred over branching.

Desirable alkenyloxys are vinyloxy, allyloxy, 3-butenyloxy, 3-pentenyloxy or 4-pentenyloxy. The more desirable alkenyloxys are allyloxy or 3-butenyloxy for decreasing the viscosity.

Desirable examples of alkyls in which at least one hydrogen may be substituted by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. The more desirable examples are 2-fluoroethyl, 3-fluoropropyl, 4-fluorobutyl or 5-fluoropentyl for increasing the dielectric anisotropy.

Desirable examples of alkenyl in which at least one hydrogen may be substituted by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. The more desirable examples are 2,2-difluorovinyl or 4,4-difluoro-3-butenyl for decreasing the viscosity.

Ring A is 1,4-cyclohexylene, 1,4-cyclohexenylene, tetrahydropyran-2,5-diyl or 1,3-dioxane-2,5-diyl. A preferred ring A is 1,3-dioxane-2,5-diyl. ring B is an independent 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. A preferred ring B is 1,4-cyclohexylene for increasing the maximum temperature, 1,4-phenylene for increasing the optical anisotropy, 2-fluoro-1,4-phenylene or 2,6-difluoro-1,4-phenylene for increasing the dielectric anisotropy. With regard to Tetrahydropyran-2,5-diyl,

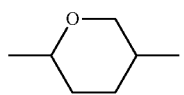

or

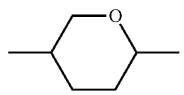

are possible forms and is preferably

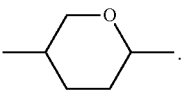

Ring C is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, or tetrahydropyran-2,5-diyl. A preferred ring C is 1,4-cyclohexylene for increasing the maximum temperature, 1,4-phenylene for increasing the optical anisotropy, and 2,6-difluoro-1,4-phenylene for increasing the dielectric anisotropy.

Ring D and ring E are each 1,4-cyclohexylene, 1,4-phenylene, 2-fluoro-1,4-phenylene or 2,5-difluoro-1,4-phenylene. A preferred ring D or ring E is 1,4-cyclohexylene in order to lower the viscosity or to raise the maximum temperature, and 1,4-phenylene in order to lower the minimum temperature.

Ring F and ring I are each 1,4-cyclohexylene, 1,4-cyclohexenylene, 1,4-phenylene, 1,4-phenylene in which at least one hydrogen may be substituted by fluorine or chlorine, or tetrahydropyran-2,5-diyl. A preferred ring F or ring I is 1,4-cyclohexylene for decreasing the viscosity, tetrahydropyran-2,5-diyl for increasing the dielectric anisotropy, and 1,4-phenylene for increasing the optical anisotropy. Ring G is 2,3-difluoro-1,4-phenylene, 2-chloro-3-fluoro-1,4-phenylene, 2,3-difluoro-5-methyl-1,4-phenylene, 3,4,5-trifuloronaphtalene-2,6-diyl or 7,8-difluorochroman-2,6-diyl. A preferred ring G is 2,3-difluoro-1,4-phenylene for decreasing the viscosity, 2-chloro-3-fluoro-1,4-phenylene for lowering the optical anisotropy, and 7,8-difluorochroman-2,6-diyl for increasing the dielectric anisotropy.

$Z^1$ and $Z^2$ are each a single bond, ethylene, methyleneoxy, carbonyloxy, or difluoromethyleneoxy. Preferred $Z^1$ or $Z^2$ is a single bond for decreasing the viscosity and difluoromethyleneoxy for increasing the dielectric anisotropy. $Z^3$ is a single bond, ethylene, carbonyloxy, or difluoromethyleneoxy. The preferred $Z^3$ is a single bond for decreasing the viscosity and difluoromethyleneoxy for increasing the dielectric anisotropy. $Z^4$ is a single bond, ethylene or carbonyloxy. Preferred $Z^1$ is a single bond for lowering the viscosity. $Z^5$ and $Z^6$ are each a single bond, ethylene, carbonyloxy, or methyleneoxy. Preferred $Z^5$ or $Z^6$ is a single bond for decreasing the viscosity, ethylene for lowering the minimum temperature, and methyleneoxy for increasing the dielectric anisotropy.

$X^1$, $X^2$, $X^3$, $X^4$, $X^5$, $X^6$, $X^7$, and $X^8$ are each either hydrogen or fluorine. Preferred examples of $X^1$, $X^2$, $X^3$, $X^4$, $X^5$, $X^6$, $X^7$ and $X^8$ are fluorine for increasing the dielectric anisotropy.

$Y^1$ and $Y^2$ are selected from the group consisting of fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, an alkenyloxy having a carbon number from 2 to 12 in which at least one hydrogen may be substituted by fluorine or chlorine. Preferred $Y^1$ or $Y^2$ is fluorine for decreasing the minimum temperature.

a has a value of 0, 1, 2, or 3. Preferred a has a value of 0 or 1 for decreasing the minimum temperature and 2 or 3 for increasing the maximum temperature. b has a value of 1, 2, 3, or 4. The preferable values for b are 2 for lowering the minimum temperature and 3 in order to raise the maximum temperature. c has a value of 1, 2, or 3. Preferred c has a value of 1 for decreasing the viscosity and 2 or 3 for increasing the maximum temperature. d has a value of 1, 2, or 3, e has a value of 0 or 1, the sum of d and e must have a value of 3 or less. Preferred d has a value of 1 for lowering the viscosity and 2 or 3 to increase the maximum temperature. The preferable e has a value of 0 for decreasing the viscosity and 1 for decreasing the minimum temperature. n has a value of 0, 1, 2, or 3. Preferably n has a value of 2 or 3 for increasing the dielectric anisotropy.

Fifthly, preferable component compounds are shown. A preferred compound (1A) is the compound (1) described in Aspect 2 and the compound (1') described in Aspect 5. The more preferred (1) and (1') are the compounds (1-1) to (1-9) described in Aspect 2 and the compounds (1'-1) to (1'-10)

described in Aspect 6. In these compounds, preferably at least one of the first components is the compounds (1-2), (1-3), (1-5), (1'-3), (1'-5), (1'-6), or (1'-8). Preferably, at least two of the first components are the combination of the compound (1-2) and the compound (1-3), the compound (1-2) and the compound (1-5), or the compound (1-3) and the compound (1-5).

The preferred compound (3) is selected from the group of compound (3-1) to compound (3-35) described in Aspect 9. In these compounds, Preferably at least one of the third component is selected from the group consisting of the compound (3-4), the compound (3-12), the compound (3-14), the compound (3-15), the compound (3-17), the compound (3-18), the compound (3-23), the compound (3-27), the compound (3-29) or the compound (3-30). Preferably, at least two of the third component are the combination of the compound (3-12) and the compound (3-15), the compound (3-14) and the compound (3-27), the compound (3-18) and the compound (3-24), the compound (3-18) and the compound (3-29), the compound (3-24) and the compound (3-29), or compound (3-29) and the compound (3-30).

The preferred compound (4) is selected from the group of compound (4-1) to compound (4-12) described in Aspect 9. In these compounds, preferably, at least one of the fourth components is the compound (4-2), the compound (4-4), the compound (4-5), the compound (4-6), the compound (4-8), or the compound (4-12). Preferably, at least two of the fourth components are the combination of the compound (4-2) and the compound (4-4), the combination of the compound (4-2) and the compound (4-6), or the combination of the compound (4-4) and the compound (4-6).

The preferred compound (5) is selected from the group of compound (5-1) to compound (5-22) described in Aspect 12. In these compounds, preferably, at least one of the fifth components is the compound (5-1), the compound (5-3), the compound (5-4), the compound (5-6), the compound (5-8), or the compound (5-10). Preferably, at least two of the fifth components are the combination of the compound (5-1) and the compound (5-6), the combination of the compound (5-3) and the compound (5-6), the combination of the compound (5-3) and the compound (5-10) the combination of the compound (5-4) and the compound (5-6), the combination of the compound (5-4) and the compound (5-8), or the combination of the compound (5-6) and the compound (5-10).

Sixthly, additives that may be added to the composition will be explained. Such additives include an optically active compound, an antioxidant, an ultraviolet light absorber, a coloring matter, an antifoaming agent, a polymerizable compound, a polymerization initiator, a polymerization inhibitor, and a polar compound. The optically active compound is added to the composition for the purpose of inducing the helical structure of liquid crystal molecules to give a twist angle. Examples of such compounds include compound (6-1) to compound (6-5). A desirable ratio of the optically active compound is approximately 5% by weight or less, and a more desirable ratio is in the range of approximately 0.01% by weight to approximately 2% by weight.

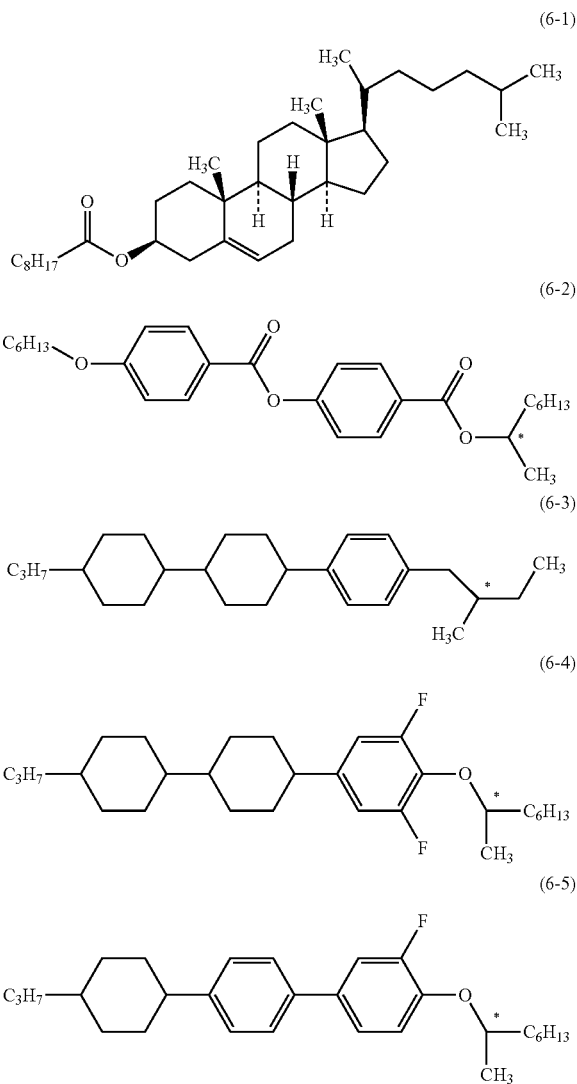

The antioxidant is added to the composition in order to maintain a large voltage holding ratio at a temperature close to the maximum temperature as well as at room temperature, after the device has been used for a long time. A desirable example of the antioxidant is compound (7) wherein t is an integer from 1 to 9, for instance.

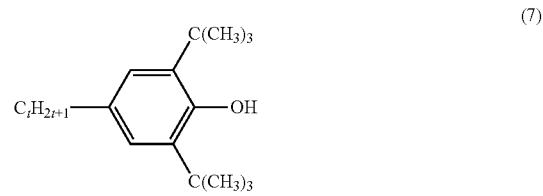

In compound (7), a desirable t is 1, 3, 5, 7 or 9. More desirable t is 7. Compound (7) where t is 7 is effective in maintaining a large voltage holding ratio at a temperature close to the maximum temperature as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

Dichroic dyes such as an azo dyes or anthraquinone dyes are added to the composition in order to adapt devices in the guest host (GH) mode. A desirable ratio of the coloring matter is in the range of approximately 0.01% by weight to approximately 10% by weight. An antifoaming agent such as dimethyl silicone oil or methyl phenyl silicone oil is added to the composition to prevent forming. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is used in order to adapt devices in the PSA (polymer sustained alignment) mode. Desirable examples of a polymerizable compound include compounds such as acrylates, methacrylates, vinyl compounds, vinyloxy compounds, propenyl ethers, epoxy compounds (oxiranes, oxetanes) and vinyl ketones, which have polymerizable groups. The more desirable examples are acrylate derivatives or methacrylate derivatives. A desirable ratio of the polymerizable compound for achieving the effect is approximately 0.05% by weight or more for achieving its effect and approximately 10% by weight or less for preventing display defects. A more desirable ratio is in the range of approximately 0.1% by weight to approximately 2% by weight. The polymerizable compound is polymerized by ultraviolet irradiation. The polymerizable compound may be polymerized in the presence of an initiator such as a photopolymerization initiator. Suitable conditions for polymerization, and a suitable type and amount of the initiator are known to persons skilled in the art and are described in the literature. For example, Irgacure 651 (registered trademark; BASF), Irgacure 184 (registered trademark; BASF) and Darocure 1173 (registered trademark; BASF) are examples of photoinitiators that are suitable for radical polymerization. A desirable ratio of the photopolymerization initiator is in the range of approximately 0.1% by weight to approximately 5% by weight based on the weight of the polymerizable compound. A more desirable ratio is in the range of approximately 1% by weight to approximately 3% by weight.

The polymerization inhibitor may be added in order to prevent polymerization when a polymerizable compound is kept in storage. The polymerizable compound is usually added to the composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

Seventhly, methods for synthesizing the component compounds will be explained. These compounds can be synthesized by known methods. The synthetic methods will be exemplified as follows. Compound (1) is described in the section showing the Examples. Compound (2) is prepared by the method described in JP S59-176221 A (1984). Compound (3-2) and compound (3-8) are prepared by the method described in JP H02-233626 A (1990). The compound of formula (4-6) is prepared by the method described in PCT/JP 2006-503130. The compound of formula (5-1) and compound (5-6) are prepared by the method described in PCT/JP H02-503441. Antioxidants are commercially available. The compound in formula (7) wherein t is 1 is available from Sigma-Aldrich Corporation. The compound in formula (7) wherein t is 7 is synthesized according to the method described in U.S. Pat. No. 3,660,505.

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved together by heating.

Finally, the use of the composition will be explained. This composition mainly has a minimum temperature of approximately −10° C. or lower, a maximum temperature of approximately 70° C. or higher, and an optical anisotropy in the range of approximately 0.07 to approximately 0.20. A device including this composition has a large voltage holding ratio. This composition is suitable for an AM device. This composition is suitable especially for an AM device having a transmission type. A composition having an optical anisotropy in the range of approximately 0.08 to approximately 0.25 may be prepared by adjusting the ratio of the component compounds or by mixing the component compounds with any other liquid crystal compound. A composition having an optical anisotropy in the range of approximately 0.10 to approximately 0.30 may be prepared by this method. These compositions can be used as compositions having a nematic phase and as optically active compositions by adding an optically active compound.

The composition can be used for an AM device. The composition can also be used for a PM device. The composition can also be used for the AM device and the PM device having modes such as PC, TN, STN, ECB, OCB, IPS, FFS, VA and FPA. Especially desirable is using the composition for the AM device having a mode of TN, OCB, IPS or FFS. In the AM device having the IPS or FFS mode, the orientation of the liquid crystal molecules may be parallel or perpendicular to the glass substrate, when no voltage is applied. These devices may be of a reflection type, a transmission type or a semi-transmission type. Using the composition for a device having the transmission type is desirable. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

EMBODIMENTS OF THE INVENTION

The invention will be explained in more detail by way of examples. The invention is not limited to the examples. The invention includes a mixture of the composition in Composition Example 1 and the composition in Composition Example 2. The invention also includes a mixture prepared by mixing at least two compositions in Composition Examples. Compounds prepared herein were identified by methods such as NMR analysis. The characteristics of the compounds, the compositions and the devices were measured by the methods described below.

NMR Analysis: A model DRX-500 apparatus made by Bruker BioSpin Corporation was used for measurement. For the measurement of $^1$H-NMR, a sample was dissolved in a deuterated solvent such as $CDCl_3$, and the measurements were taken at room temperature, at 500 MHz with the cumulative number of scans being 16. Tetramethylsilane (TMS) was used as an internal standard. For the measurement of $^{19}$F-NMR, $CFCl_3$ was used as the internal standard, and 24 cumulative scans were taken. In the explanation of the nuclear magnetic resonance spectra, the symbols s stands for a singlet, d stands for a doublet, t stands for a triplet, q stands for a quartet, quin stands for a quintet, sex stands for a sextet, m stand for a multiplet and br stand for line-broadening.

Gas Chromatographic Analysis: A gas chromatograph Model GC-14B made by Shimadzu Corporation was used for taking measurements. The carrier gas was helium (2 milliliters per minute). The sample injector was set at 280° C. and the detector (FID) was set at 300° C. A capillary column DB-1 (length 30 meters, bore 0.32 millimeters, film thickness 0.25 micrometers, dimethylpolysiloxane as the stationary phase, non-polar) made by Agilent Technologies, Inc. was used for the separation of the component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. The recorder used was a Model C-R5A Chromatopac Integrator made by Shimadzu Corporation or its equivalent. The resulting gas chromatogram showed the retention time of peaks and the peak areas corresponding to the component compounds.

Solvents for diluting the sample may also be solvents such as chloroform and hexane. The following capillary columns may also be used in order to separate the component compounds: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). The capillary column CBP1-M50-025 (length 50 meters, bore 0.25 millimeters, film thickness 0.25 micrometers) made by Shimadzu Corporation may also be used for the purpose of avoiding an overlap of peaks of the compounds.

The ratio of the liquid crystal compounds included in the composition may be calculated according to the following method. The liquid crystal compounds (a mixture) are detected by the use of a gas chromatograph (FID). The ratio of the peak areas in the gas chromatogram corresponds to the ratio (ratio by weight) of the liquid crystal compounds. When the capillary column described above is used, the correction coefficient of the respective liquid crystal compounds may be regarded as 1 (one). Accordingly, the ratio (percentage by weight) of the liquid crystal compounds can be calculated from the ratio of the peak areas.

Samples for Measurement: When measuring the properties of the composition, the composition was used as a sample without making any changes to the sample. When the characteristics of a compound were measured, a sample for measurement was prepared by mixing the compound (15% by weight) with liquid crystal base (85% by weight). The characteristic values of the compound were calculated based on values obtained from measurements and then calculated based on the extrapolation method: (Extrapolated value)=(Measured value of sample)−0.85×(Measured value of liquid crystal base)/0.15. When a smectic phase (or crystals) deposited at 25° C. at this ratio, the ratio of the compound to the liquid crystal base was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The liquid crystal base described below was used. The ratio of the component compounds were expressed as a percentage by weight.

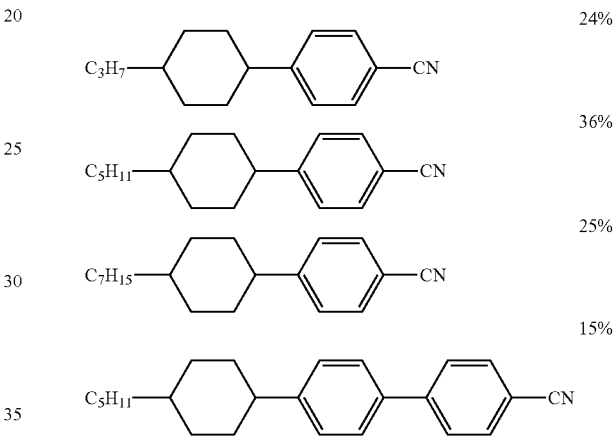

Measurement Methods: The characteristics were measured according to the following methods. Most were methods described in the JEITA standards (JEITA-ED-2521B) which were discussed and established by the Japan Electronics and Information Technology Industries Association (JEITA), or some modified methods thereof. No thin film transistors (TFT) were attached to the TN device used for measurement.

(1) Maximum Temperature of the nematic Phase (NI; ° C.): A sample was placed on a hot plate in a melting point measuring apparatus equipped with a polarizing microscope and was heated at the rate of 1° C. per minute. The temperature was then measured when part of the sample began to transition from the nematic phase to an isotropic liquid.

(2) Minimum Temperature in the nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or transitioned to the smectic phase at −30° C., Tc was expressed as <−20° C.

(3) Viscosity (bulk viscosity; η; measured at 20° C.; mPa·s): An E-type viscometer made by Tokyo Keiki Inc. was used for measurement.

(4) Viscosity (rotational viscosity; γ1; measured at 25° C.; mPa·s): The viscosity measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage was applied to this device and increased stepwise with in increments of 0.5 volts in the range of 16 to 19.5 volts. After a period of 0.2 seconds with no voltage, a voltage was applied repeatedly under the conditions of a single rectangular wave alone (rectangular pulse; 0.2 second) and of no voltage (2 seconds). The peak current and the peak time of the transient current generated by the applied voltage were measured. The value of the rotational viscosity was obtained from these measured values that were input into the equation (8) on page 40 of the paper presented by M. Imai, et al. The value of the dielectric anisotropy necessary for this calculation was obtained by the method described below using the device with which the rotational viscosity was measured.

(5) Optical anisotropy (refractive index anisotropy; $\Delta n$; measured at 25° C.): The optical anisotropy measurement was carried out using an Abbe refractometer with a polarizing plate attached to the ocular, using light at a wavelength of 589 nanometers. The surface of the main prism was rubbed in one direction, and then a sample was placed on the main prism. The refractive index (n//) was measured when the direction of the polarized light was parallel to that of the rubbing. The refractive index (n⊥) was measured when the direction of the polarized light was perpendicular to that of the rubbing. The value of the optical anisotropy ($\Delta n$) was calculated from the equation: $\Delta n = n// - n\perp$.

(6) Dielectric anisotropy ($\Delta \varepsilon$; measured at 25° C.): A sample was poured into a TN device in which the distance between the two glass substrates (cell gap) was 9 micrometers and the twist angle was 80 degrees. Sine waves (10V, 1 kHz) were applied to this device, and the dielectric constant ($\varepsilon//$) in the major axis direction of liquid crystal molecules was measured after 2 seconds. Sine waves (0.5V, 1 kHz) were then applied to this device and the dielectric constant ($\varepsilon\perp$) in the minor axis direction of the liquid crystal molecules was measured after 2 seconds. The value of the dielectric anisotropy was calculated from the equation: $\Delta \varepsilon = \varepsilon// - \varepsilon\perp$.

(7) Threshold voltage (Vth; measured at 25° C.; V): An LCD evaluation system Model LCD5100 made by Otsuka Electronics Co., Ltd. was used for taking the measurements. The light source was a halogen lamp. A sample was poured into a TN device having a normally white mode, in which the distance between the two glass substrates (cell gap) was $0.45/\Delta n$ (micrometers) and the twist angle was 80 degrees. The voltage to be applied to this device (32 Hz, rectangular waves) was stepwise increased in 0.02 V increments from 0 V up to 10 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was expressed as a voltage at 90% transmittance.

(8) Voltage Holding Ratio (VHR-1; measured at 25° C.; %): A TN device used for measurement had a polyimide alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; measured at 80° C.; %): The voltage holding ratio was measured by the method described above, except that it was measured at 80° C. instead of 25° C. The resulting values were represented by the symbol VHR-2.

(10) Voltage Holding Ratio (VHR-3; measured at 25° C.; %): The stability with regard to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. For the measurement of VHR-4, a decreasing voltage was measured for 16.7 milliseconds. A composition having a large VHR-4 has a high stability to heat.

(12) Response Time ($\tau$; measured at 25° C.: ms): An LCD evaluation system Model LCD-5100 made by Otsuka Electronics Co., Ltd. was used for measurement. The light source was a halogen lamp. The low-pass filter was set at 5 kHz. A sample was poured into a TN device having a normally white mode, in which the distance between the two glass substrates (cell gap) was 5.0 micrometers and the twist angle was 80 degrees. Rectangular waves (60 Hz, 5 V, 0.5 seconds) were applied to this device. The device was perpendicularly irradiated with light simultaneously, and the amount of light passing through the device was measured. The transmittance was regarded as 100% when the amount of light reached a maximum. The transmittance was regarded as 0% when the amount of light reached a minimum. Rise time ($\tau r$; millisecond) was the time required for a change from 90% to 10% transmittance. Fall time ($\tau f$; millisecond) was the time required for a change from 10% to 90% transmittance. The response time was expressed as the sum of the rise time and the fall time obtained in this manner.

(13) Elastic constants (K; measured at 25° C.; pN): A LCR meter Model HP 4284-A made by Yokokawa Hewlett-Packard, Ltd. was used for taking measurements. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were input into equation (2.98) and equation (2.101) on page 75 of "Ekisho Debaisu Handobukku" (Liquid Crystal Device Handbook, in English; The Nikkan Kogyo Shimbun, Ltd., Japan) and the values of K11 and K33 were obtained from equation (2.99). Next, the value of K22 was calculated from equation (3.18) on page 171 of the book and the values of K11 and K33 thus obtained. The elastic constant K was expressed as an average value of K11, K22 and K33.

(14) Specific Resistance (p; measured at 25° C.; Q cm): A sample of 1.0 milliliters was poured into a vessel equipped with electrodes. A DC voltage (10V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

(15) Helical pitch (P; measured at room temperature; micrometer): The helical pitch was measured according to the wedge method (see page 196 of "Ekishou Binran" (Liquid Crystal Handbook, in English; Maruzen, Co., LTD., Japan, 2000). After a sample had been injected into a wedge-shaped cell and the cell had been allowed to stand at room temperature for 2 hours, the distance (d2−d1) between disclination lines was observed with a polarizing microscope (Nikon Corporation, Model MM-40/60 series). The helical pitch (P) was calculated from the following equation, wherein θ was defined as the angle of the wedge cell: P=2×(d2−d1)×tan θ.

(16) Dielectric constant in the minor axis direction of the liquid crystal molecules (ε⊥; measured at 25° C.): A sample was poured into a TN device in which the distance between the two glass substrates (cell gap) was 9 micrometers and the twist angle was 80 degrees. Sine waves (0.5 V, 1 kHz) were applied to this device and the dielectric constant (ε⊥) in the minor axis direction of the liquid crystal molecules was measured after 2 seconds.

The compound (1-2-4) is synthesized by the method described below.

Step 1

Compound (S101) (0.90 g, 8.5 mmol), p-toluenesulfonic acid monohydrate (0.05 g, 0.25 mmol) and acetone (27 ml) were put in a reaction vessel under a nitrogen atmosphere, and the mixture was stirred for 12 hours. Triethylamine was then added to the reaction mixture, and the solvent was distilled off with an evaporator. The residue was purified by silica gel chromatography to obtain the compound (S102).

Step 2

In a nitrogen atmosphere, the compound (S102) (1.1 g, 7.8 mmol) obtained in Step 1, sodium hydride (60%; 0.47 g, 11.7 mmol) and THF (11 ml) were placed in a reaction vessel, and the mixture was stirred at room temperature for 30 minutes. 1-Iodoethane (3.6 g, 23.4 mmol) was then added thereto, and the mixture was stirred at room temperature for another 5 hours. The reaction mixture was poured into pure water and the aqueous layer was extracted with ethyl acetate. The combined organic layers were washed with pure water and saturated brine, then dried with magnesium sulfate, and the solvent was distilled off with an evaporator. The residue was purified by silica gel chromatography to obtain the compound (S103).

Step 3

In a nitrogen atmosphere, the compound (S103) (0.95 g, 5.4 mmol) obtained in Step 2, p-toluenesulfonic acid monohydrate (0.1 g, 0.54 mmol), and methanol (4.7 ml) were placed in a reaction vessel and stirred at room temperature for 12 hours. Triethylamine was added to the reaction mixture, and the solvent was distilled off with an evaporator. The residue was purified by silica gel chromatography to obtain the compound (S104).

Step 4

In a nitrogen atmosphere, the compound (S104) (0.62 g, 4.6 mmol) obtained in Step 3, 4-(difluoro((2,3',4',5'-tetrafluoro-[1,1'-biphenyl]-4-yl)oxy)methyl)-3,5-difluorobenzaldehyde (2.0 g, 4·6 mmol), p-toluenesulfonic acid monohydrate (0.06 g, 0.32 mmol), calcium sulfate (0.6 g, 4.5 mmol), toluene (6 ml) and cyclopropane (6 ml) were placed in a reaction vessel and heated under reflux for 3 hours. The reaction mixture was cooled to room temperature, poured into pure water, and the aqueous layer was extracted with toluene. The combined organic layers were washed with pure water and saturated brine, then dried with magnesium sulfate, and the solvent was distilled off with an evaporator.

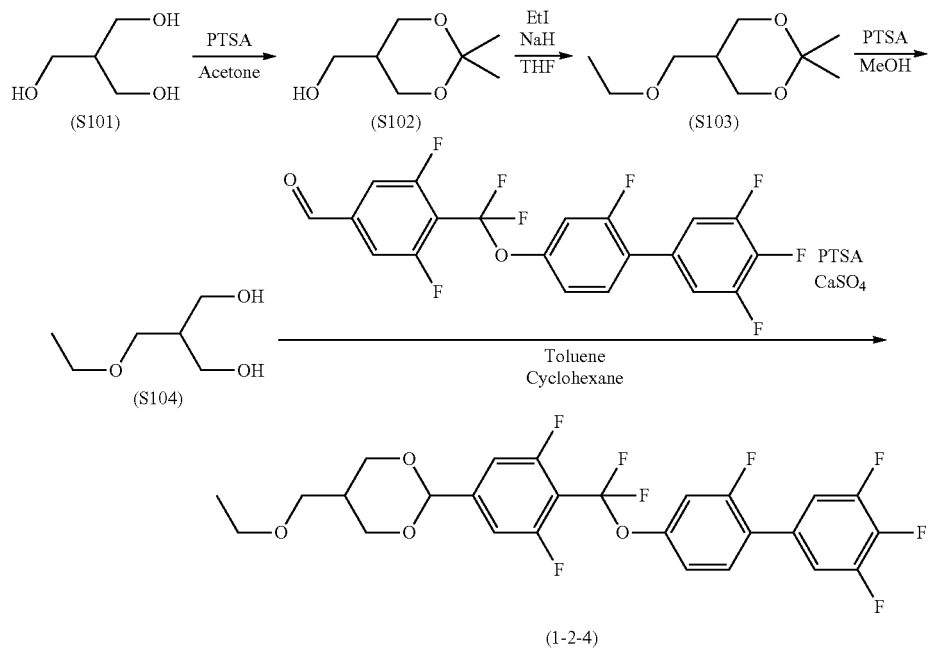

The residue was purified by silica gel chromatography and recrystallized to obtain compound (1-2-4).

$^1$H-NMR (δ ppm; CDCl$_3$): 7.34 (dd, 1H, J=8.4 Hz, 8.4 Hz), 7.19-7.10 (m, 6H), 5.39 (s, 1H), 4.28 (dd, 2H, J=4.6 Hz, 11.8 Hz), 3.74 (dd, 2H, J=11.8 Hz), 3.45 (q, 2H, J=7.0 Hz), 3.28 (d, 2H, J=5.8 Hz), 2.43 (m, 1H), 1.19 (t, 3H, J=7.0 Hz), $^{19}$F-NMR (δ ppm; CFCl$_3$), −61.43 (t, 2F, J=28.5 Hz), −111.47 (dt, 2F, J=11.3 HZ, 28.5 Hz), −114.86 (dd, 1F, J=8.5 Hz, 10.6 HZ), −134.71 (dd, 2F, J=9.4 Hz, 21.4 Hz), −161.72 (tt, 1F, J=6.7 Hz, 21.4 Hz).

Compound (1'-3) was synthesized by the method described below. Solmix A-11 was a mixture of ethanol (85.5%), methanol (13.4%) and isopropyl alcohol (1.1%) and was obtained from Japan Alcohol Trading Co.,

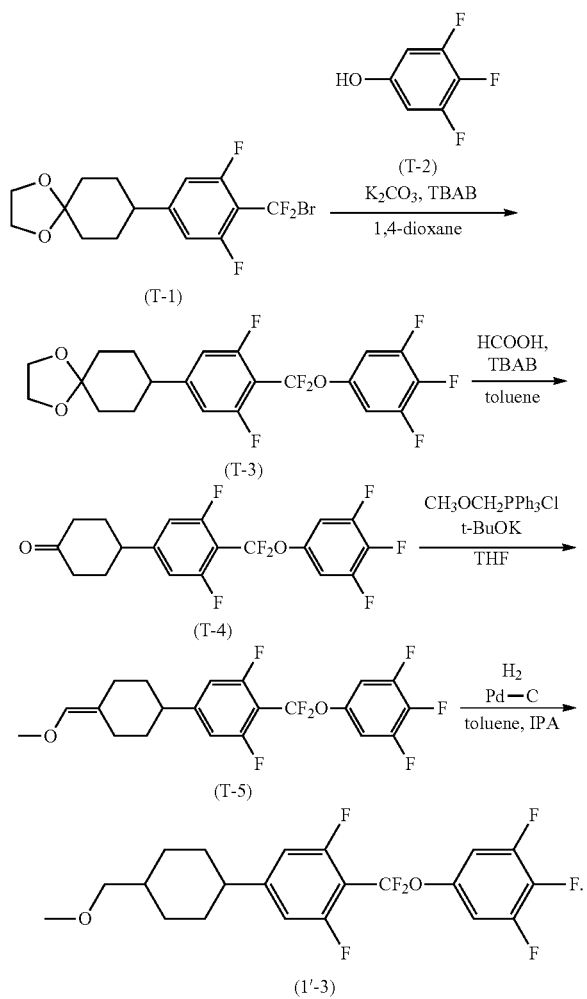

Step 1

Compound (T-1) (25.00 g), compound (T-2) (6.164 g), potassium carbonate (12.08 g), tetrabutylammonium bromide (TBAB) (4.03 g) and 1,4-dioxane (200 ml) were placed in a reactor and heated under reflux for 8 hours in a nitrogen atmosphere. The reaction mixture was poured into water and the aqueous layer was extracted with toluene. The combined organic layers were washed with brine and dried over anhydrous magnesium sulfate. The solution was concentrated under reduced pressure, and the residue was purified by silica gel column chromatography (toluene/ethyl acetate=10/1, volume ratio). Further purification by recrystallization from Solmix A-11 yielded Compound (T-3) (12.82 g, 62%).

Step 2

In a nitrogen atmosphere, the compound (T-3) (12.82 g), formic acid (38.4 ml), TBAB (2.27 g) and toluene (128 ml) were placed in a reactor and stirred at room temperature for 3 hours. The reaction mixture was poured into water and neutralized with sodium bicarbonate. The aqueous layer was extracted with toluene, and the combined organic layers were washed with brine and dried over anhydrous magnesium sulfate. The solution was concentrated under reduced pressure, and the residue was purified by silica gel column chromatography (toluene/ethyl acetate=10/1, volume ratio) to obtain compound (T-4) (11.17 g, yield 99%).

Step 3

In a nitrogen atmosphere, (methoxymethyl) triphenylphosphonium chloride (12.30 g) and THF (100 ml) were placed in a reactor and cooled to −40° C. Potassium t-butoxide (4.03 g) was added thereto, and the mixture was stirred at −40° C. for 1 hour. Next, a THF (40 ml) solution of Compound (T-4) (10.41 g) was slowly added dropwise, and after dropping, the mixture was stirred for 3 hours while returning to room temperature. The reaction mixture was poured into water and the aqueous layer was extracted with toluene. The combined organic layers were washed with brine and dried over anhydrous magnesium sulfate. The solution was concentrated under reduced pressure, and the residue was purified by silica gel column chromatography (toluene/heptane=2/1, volume ratio) to obtain the compound (T-5). The obtained compound (T-5), 5% palladium carbon (0.31 g), toluene (100 ml), and IPA (100 ml) were placed in a reactor and stirred in a hydrogen atmosphere for 12 hours. After removing the catalyst by filtration, the compound was concentrated under reduced pressure, and the residue was purified by silica gel column chromatography (ethyl acetate/heptane=1/10, volume ratio). Further purification by recrystallization from Solmix A-11 yielded compound (1'-3) (3.71 g, yield 33%).

$^1$H-NMR (ppm; CDCl$_3$): δ6.98-6.92 (m, 2H), 6.85-6.82 (m, 2H), 3.35 (s, 3H), 3.24 (d, J=6.3 Hz, 2), 2.50 (tt, j=12.2 Hz, J=3.1 Hz, H), 1.97-1.90 (m, 4H), 1.69-1.60 (m, 1H) 1.46-1.37 (m, 2H), 1.17-1.08 (m, 2H).

Examples of the composition are shown below. Component compounds are represented by symbols based on the definitions in Table 3 below. In Table 3, the configuration relating to 1,4-cyclohexylene is trans. The number in parenthesis after the symbolized compound represents the chemical formula to which the compound belongs. The symbol (−) means other liquid crystalline compounds. The proportion (percentage) of the liquid crystalline compound is the weight percent (wt %) based on the weight of the liquid crystal composition. Lastly, the characteristic values of the composition are summarized.

TABLE 3

| Notation Method of Compounds using Symbols R—(A$_1$)—Z$_1$— . . . —Z$_n$—(A$_n$)—R' | |
|---|---|
| | Symbol |
| 1) Left-terminal Group R— | |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |

TABLE 3-continued

Notation Method of Compounds using Symbols
R—(A₁)—Z₁— ... —Zₙ—(Aₙ)—R'

| | Symbol |
|---|---|
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |

2) Right-terminal Group —R'

| | |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —$C_nH_{2n}$—CH=CH—$C_mCH_{2m+1}$ | -nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |
| —CF=CH—$CF_3$ | —FVCF3 |

3) Bonding Group —$Z_n$—

| | |
|---|---|
| —$C_2H_4$— | 2 |
| —COO— | E |
| —CH=CH— | V |
| —C≡C— | T |
| —$CF_2O$— | X |
| —$OCF_2$— | x |
| —$CH_2O$— | 1O |
| —$OCH_2$— | O1 |
| —$OCH_2$—$CF_2O$— | O1X |

4) Ring —$A_n$—

| | |
|---|---|
|  | H |
| 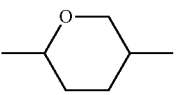 | Dh |
| 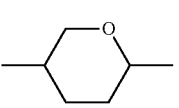 | dh |
| 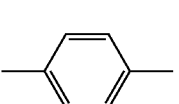 | B |
| 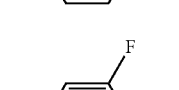 | B(F) |
| 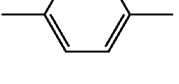 | B(2F) |
| 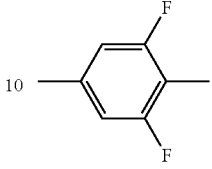 | B(F,F) |
| 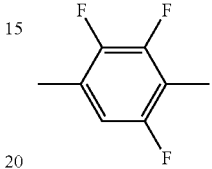 | B(2F,3F,5F) |
| 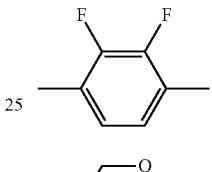 | B(2F,3F) |
| 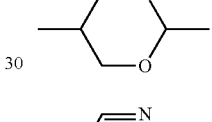 | G |
| 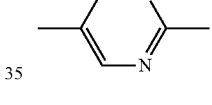 | Py |
| 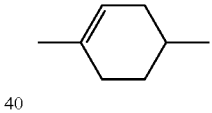 | Ch |
| 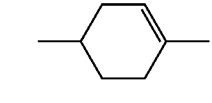 | ch |
| 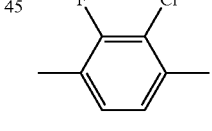 | B(2F,3CL) |

5) Example of notation

Example 1 2O1-GB(F)B(F,F)XB(F,F)-F

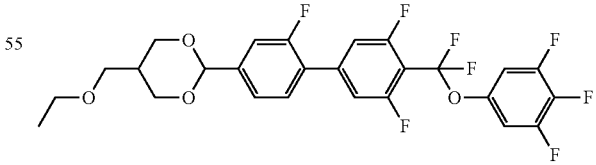

Example 2 3-HH-V

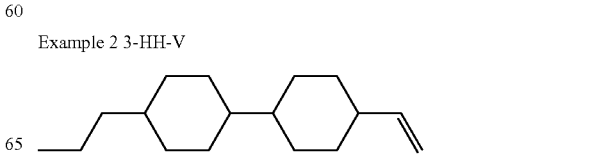

Comparative Example 1

Example 3 was selected from the compositions disclosed in JP-A-2006-70080. The reason is that this composition contains a compound similar to compound (1) and compound (2), and has the lowest viscosity. The components and properties of this composition are as follows.

| | | |
|---|---|---|
| 1O3-GHB(F)-F | (—) | 10% |
| V-HH-5 | (2) | 15% |
| 3-HB-O2 | (4-1) | 5% |
| V-HHB-1 | (4-4) | 10% |
| 3-HHB(F,F)-F | (3-2) | 10% |
| 3-HH2B(F,F)-F | (3) | 5% |
| 3-H2HB(F,F)-F | (3) | 5% |
| 3-HBB(F,F)-F | (3-8) | 10% |
| 2-HHB(F)-F | (3) | 10% |
| 5-HHB(F)-F | (3) | 10% |
| V-HHB(F)-F | (3) | 10% |

NI = 87.8° C.; Tc < −30° C.; η = 20.0 mPa · s; Δn = 0.083; Δε = 6.1.

Comparative Example 2

Example 3 was selected from the compositions disclosed in JP-A-2011-153202. The reason is that this composition contains a compound similar to compound (1) and compound (2) and has the lowest viscosity. The components and properties of this composition are as follows.

| | | |
|---|---|---|
| 4-GB(F)B(F,F)XB(F,F)-F | (3-27) | 4% |
| 5-GB(F)B(F,F)XB(F,F)-F | (3-27) | 5% |
| 5-HH-V | (2) | 8% |
| 3-HH-V1 | (2) | 8% |
| V-HHB-1 | (4-4) | 4% |
| 3-BB(F)B(F,F)XB(F,F)-F | (3-29) | 2% |
| 4-BB(F)B(F,F)XB(F,F)-F | (3-29) | 8% |
| 5-BB(F)B(F,F)XB(F,F)-F | (3-29) | 3% |
| 3-HGB(F,F)XB(F,F)-F | (3) | 3% |
| 4-HGB(F,F)XB(F,F)-F | (3) | 6% |
| 3-BB(F,F)XB(F,F)-F | (3-18) | 10% |
| 1-HHXB(F,F)-F | (3-4) | 6% |
| 3-HHXB(F,F)-F | (3-4) | 13% |
| 3-GHB(F,F)-F | (3-7) | 3% |
| 4-GHB(F,F)-F | (3-7) | 7% |
| 5-GHB(F,F)-F | (3-7) | 10% |

NI = 75.0° C.; Tc < −30° C.; Δn = 0.100; Δε = 19.9; γ1 = 181.0 mPa · s.

Comparative Example 3

Example 35 was chosen from the compositions disclosed in WO 1996/11897. The reason is that this composition contains the compound (2), the compound (3), the compound (4-1), the compound (4-4), and the compound (4-5) and has the smallest bulk viscosity. The components and properties of this composition were as follows.

| | | |
|---|---|---|
| 3-HBXB(F,F)-F | (3) | 10% |
| 5-HBXB(F,F)-F | (3) | 10% |
| 2-HB(F)-C | (—) | 7% |
| 3-HB(F)-C | (—) | 10% |
| 3-HHB-F | (3) | 5% |
| 3-HB-O2 | (4-1) | 10% |
| 5-HH-V | (2) | 5% |
| 3-HH-2V | (2) | 5% |
| 2-BTB-O1 | (—) | 8% |
| V-HHB-1 | (4-4) | 8% |
| V-HBB-2 | (4-5) | 5% |
| 1V2-HBB-2 | (4-5) | 5% |
| 3-HHB-O1 | (4-4) | 4% |
| 3-H2BTB-2 | (—) | 4% |
| 3-H2BTB-3 | (—) | 4% |

NI = 71.6° C.; η = 16.9 mPa · s; Δn = 0.121; Δε = 6.1; Vth = 1.81 V.

Example 1

| | | |
|---|---|---|
| 2O1-GB(F,F)XB(F,F)-F | (1-1-3) | 2% |
| 1O1-GB(F,F)XB(F)B(F,F)-F | (1-2-4) | 2% |
| 2O1-GB(F,F)XB(F)B(F,F)-F | (1-2-4) | 2% |
| 2O1-GB(F)B(F,F)XB(F,F)-F | (1-3-4) | 2% |
| 3-HH-V | (2) | 30% |
| 3-HH-V1 | (2) | 4% |
| 3-HHXB(F,F)-F | (3-4) | 3% |
| 3-BB(F,F)XB(F,F)-F | (3-18) | 3% |
| 3-HHB(F)B(F,F)-F | (3-20) | 3% |
| 3-dhBB(F,F)XB(F,F)-F | (3-25) | 3% |
| 3-BB(F)B(F,F)XB(F,F)-F | (3-29) | 3% |
| 4-BB(F)B(F,F)XB(F,F)-F | (3-29) | 3% |
| 3-HHB-OCF3 | (3) | 4% |
| 3-HB-O2 | (4-1) | 4% |
| V-HHB-1 | (4-4) | 16% |
| V2-HHB-1 | (4-4) | 16% |

NI = 98.5° C.; Tc < −20° C.; Δn = 0.095; Δε = 5.9; Vth = 1.78 V; γ1 = 14.0 mPa · s.

Example 2

| | | |
|---|---|---|
| 2O1-GB(F)XB(F)B(F)-F | (1-2) | 3% |
| 3O1-GB(F,F)XB(F)B(F,F)-F | (1-2-4) | 3% |
| 3-HH-V | (2) | 25% |
| 5-HH-V | (2) | 5% |
| 5-HHB(F,F)-F | (3-2) | 5% |
| 3-HHEB(F,F)-F | (3-3) | 6% |
| 2-HBB(F,F)-F | (3-8) | 3% |
| 3-HB(F)B(F,F)-F | (3-9) | 5% |
| 3-HBEB(F,F)-F | (3-10) | 3% |
| 3-BBXB(F,F)-F | (3-17) | 4% |
| 3-BB(F,F)XB(F,F)-F | (3-18) | 3% |
| 3-BB(F)B(F,F)XB(F,F)-F | (3-29) | 4% |
| 4-BB(F)B(F,F)XB(F,F)-F | (3-29) | 3% |
| 5-BB(F)B(F,F)XB(F,F)-F | (3-29) | 4% |
| V2-B(2F,3F)BXB(F,F)-F | (3-33) | 3% |
| V-HHB-1 | (4-4) | 4% |
| V2-HHB-1 | (4-4) | 6% |
| V-HBB-2 | (4-5) | 5% |
| 5-B(F)BB-3 | (4-7) | 3% |
| 3-HHEBH-4 | (4-10) | 3% |

NI = 84.8° C.; Tc < −20° C.; η = 16.0 mPa · s; Δn = 0.112; Δε = 9.7; Vth = 1.40 V; γ1 = 68.3 mPa · s.

Example 3

| | | |
|---|---|---|
| 3O-GB(F,F)XB(F)B(F,F)-F | (1-2-4) | 2% |
| 4O1-GB(F,F)XB(F)B(F,F)-F | (1-2-4) | 2% |
| 2O1-GB(F,F)XB(F)B(F)-F | (1-2-4) | 2% |
| 2-HH-3 | (2) | 14% |
| 3-HH-V | (2) | 20% |
| 3-HHB(F,F)-F | (3-2) | 3% |
| 4-HHEB(F,F)-F | (3-3) | 3% |
| 5-HB(F)B(F,F)-F | (3-9) | 4% |
| 2-GB(F,F)XB(F,F)-F | (3-14) | 3% |
| 3-BB(F)B(F,F)-CF3 | (3-16) | 3% |
| 3-HHBB(F,F) | (3) | 4% |
| 3-BB(F)B(F,F)XB(F)-F | (3-28) | 3% |
| 4-BB(F)B(F,F)XB(F)-F | (3-28) | 5% |
| 3-BB(F)B(F,F)XB(F,F)-F | (3-29) | 5% |

-continued

| | | |
|---|---|---|
| 3-HB(2F,3F)BXB(F,F)-F | (3-34) | 3% |
| 3-BB(2F,3F)BXB(F,F)-F | (3-35) | 3% |
| 1-BB-3 | (4-2) | 3% |
| V2-HHB-1 | (4-4) | 6% |
| 1V-HBB-2 | (4-5) | 4% |
| 5-B(F)BB-3 | (4-7) | 4% |
| 3-HHEBH-4 | (4-10) | 4% |

NI = 87.6° C.; Tc < −20° C.; η = 15.6 mPa · s; Δn = 0.115; Δε = 9.2; Vth = 1.45 V; γ1 = 66.7 mPa · s.

Example 4

| | | |
|---|---|---|
| 1O2-GB(F,F)XB(F)B(F,F)-F | (1-2-4) | 2% |
| 2O1-GB(F,F)XB(F,F)B(F)-F | (1-2-5) | 2% |
| 4O1-GB(F)B(F,F)XB(F,F)-F | (1-3-4) | 2% |
| 3-HH-V | (2) | 33% |
| 5-HHEB(F,F)-F | (3-3) | 9% |
| 5-GHB(F,F)-F | (3-7) | 3% |
| 2-BB(F)B(F,F)-F | (3-15) | 3% |
| 3-BB(F)B(F,F)-F | (3-15) | 3% |
| 5-HHBB(F,F)-F | (3-19) | 4% |
| 3-BB(F)B(F,F)XB(F)-F | (3-28) | 5% |
| 4-BB(F)B(F,F)XB(F)-F | (3-28) | 4% |
| 3-BB(F)B(F,F)XB(F,F)-F | (3-29) | 3% |
| 5-BB(F)B(F,F)XB(F,F)-F | (3-29) | 6% |
| 3-BB(2F,3F)XB(F,F)-F | (3-32) | 3% |
| 1-BB-5 | (4-2) | 4% |
| V-HHB-1 | (4-4) | 5% |
| 3-BB(F)B-2V | (4-6) | 5% |
| 5-HBB(F)B-2 | (4-12) | 4% |

NI = 83.2° C.; Tc < −20° C.; η = 18.6 mPa · s; Δn = 0.124; Δε = 10.1; Vth = 1.39 V; γ1 = 79.6 mPa · s.

Example 5

| | | |
|---|---|---|
| 1O2O1-GB(F,F)XB(F)B(F,F)-F | (1-2-4) | 2% |
| 1O1-GB(F)B(F,F)XB(F,F)-F | (1-3-4) | 2% |
| 2O1-GB(F)B(F,F)XB(F,F)-CF3 | (1-3-4) | 2% |
| 2-HH-3 | (2) | 22% |
| 3-HH-V | (2) | 15% |
| 3-HHB(F,F)-F | (3-2) | 3% |
| 2-HBB(F,F)-F | (3-8) | 3% |
| 3-HB(F)B(F,F)-F | (3-9) | 5% |
| 3-GB(F,F)XB(F)-F | (3-13) | 3% |
| 3-GB(F,F)XB(F,F)-F | (3-14) | 3% |
| 2-BB(F)XB(F,F)-F | (3-18) | 3% |
| 3-BB(F)B(F,F)XB(F,F)-F | (3-29) | 3% |
| 4-BB(F)B(F,F)XB(F,F)-F | (3-29) | 5% |
| 5-BB(F)B(F,F)XB(F,F)-F | (3-29) | 7% |
| 5-BB(F)B(F,F)XB(F,F)-F | (3-31) | 3% |
| V-HHB-1 | (4-4) | 5% |
| V2-HHB-1 | (4-4) | 6% |
| 3-BB(F)B-2V | (4-6) | 5% |
| 5-HBB(F)B-2 | (4-12) | 3% |

NI = 73.8° C.; Tc < −20° C.; η = 13.5 mPa · s; Δn = 0.110; Δε = 11.6; Vth = 1.29 V; γ1 = 57.8 mPa · s.

Example 6

| | | |
|---|---|---|
| 2O1-GB(F,F)XB(F)B(F)-OCF3 | (1-2-4) | 2% |
| 3O1-GB(F,F)XB(F,F)B(F)-F | (1-2-5) | 2% |
| 3O1-GB(F)B(F,F)XB(F,F)-F | (1-3-4) | 2% |
| 3-HH-V | (2) | 22% |
| 3-HH-V1 | (2) | 16% |
| 1-HHB(F,F)-F | (3-2) | 3% |
| 3-HBB(F,F)-F | (3-8) | 3% |
| 3-BB(F,F)XB(F,F)-F | (3-18) | 3% |
| 4-HHB(F)B(F,F)-F | (3-20) | 3% |
| 5-GB(F)B(F)B(F)-F | (3-21) | 4% |
| 3-GB(F)B(F,F)XB(F,F)-F | (3-27) | 3% |
| 3-BB(F)B(F,F)XB(F,F)-F | (3-29) | 5% |
| 5-BB(F)B(F,F)XB(F,F)-F | (3-29) | 6% |
| 3-BB(F,F)XB(F)B(F,F)-F | (3-30) | 3% |
| 3-HB-O2 | (4-1) | 4% |
| 1-BB-5 | (4-2) | 3% |
| V2-HHB-1 | (4-4) | 3% |
| 3-HBB-2 | (4-5) | 3% |
| V-HBB-2 | (4-5) | 3% |
| 5-B(F)BB-3 | (4-7) | 4% |
| 3-HBB(2F,3F)-O2 | (5-10) | 3% |

NI = 82.0° C.; Tc < −20° C.; η = 14.5 mPa · s; Δn = 0.118; Δε = 9.5; Vth = 1.47 V; γ1 = 62.0 mPa · s.

Example 7

| | | |
|---|---|---|
| 4O1-GB(F,F)XB(F)B(F)-F | (1-2-4) | 2% |
| 2O1-GBB(F,F)XB(F,F)-F | (1-3-3) | 2% |
| 4O1-GB(F)B(F,F)XB(F)-F | (1-3-4) | 4% |
| 2O1-GB(F)B(F,F)XB(F)B(F,F)-F | (1-5-1) | 2% |
| 3-HH-V | (2) | 25% |
| 4-HH-V | (2) | 5% |
| 5-HH-V | (2) | 7% |
| 1-HHXB(F,F)-F | (3-4) | 6% |
| 3-HB(F)B(F,F)-F | (3-9) | 3% |
| V-HB(F)B(F,F)-F | (3-9) | 3% |
| 3-HBEB(F,F)-F | (3-10) | 3% |
| 2-HHBB(F,F)-F | (3-19) | 3% |
| 5-GB(F)B(F,F)XB(F)-F | (3-26) | 3% |
| 4-BB(F)B(F,F)XB(F,F)-F | (3-29) | 5% |
| 5-BB(F)B(F,F)XB(F,F)-F | (3-29) | 4% |
| V2-BB-1 | (4-2) | 9% |
| 3-HHB-3 | (4-4) | 5% |
| V2-HHB-1 | (4-4) | 6% |
| 3-BB(F)B-5 | (4-6) | 3% |

NI = 73.7° C.; Tc < −20° C.; η = 10.6 mPa · s; Δn = 0.105; Δε = 9.0; Vth = 1.50 V; γ1 = 45.3 mPa · s.

Example 8

| | | |
|---|---|---|
| 2O1-GB(F,F)XB(F,F)-F | (1-1-3) | 2% |
| 1O1-GB(F,F)XB(F)B(F,F)-F | (1-2-4) | 2% |
| 2O1-dhB(F,F)XB(F,F)B(F,F)-F | (1-7-4) | 2% |
| 3-HH-V | (2) | 26% |
| 3-HH-V1 | (2) | 4% |
| 3-HH-VFF | (2) | 7% |
| 5-HHB(F,F)-F | (3-2) | 5% |
| 2-HBEB(F,F)-F | (3-10) | 3% |
| 3-GB(F,F)XB(F,F)-F | (3-14) | 3% |
| 3-BB(F)B(F,F)-F | (3-15) | 3% |
| 3-BB(F)B(F,F)-CF3 | (3-16) | 3% |
| 2-HHB(F)B(F,F)-F | (3-20) | 3% |
| 3-HHB(F)B(F,F)-F | (3-20) | 2% |
| 3-HBBXB(F,F)-F | (3-23) | 6% |
| 3-dhBB(F,F)XB(F,F)-F | (3-25) | 3% |
| 4-GB(F)B(F,F)XB(F)-F | (3-26) | 3% |
| 3-BB(F)B(F,F)XB(F)-F | (3-28) | 4% |
| 3-HB-O2 | (4-1) | 3% |
| V2-HHB-1 | (4-4) | 5% |
| 1-BB(F)B-2V | (4-6) | 3% |
| 5-B(F)BB-2 | (4-7) | 5% |
| 3-HB(F)HH-5 | (4-9) | 3% |

NI = 83.7° C.; Tc < −20° C.; η = 13.7 mPa · s; Δn = 0.113; Δε = 9.7; Vth = 1.39 V; γ1 = 58.7 mPa · s.

Example 9

| | | |
|---|---|---|
| 2O1-GB(F,F)XB(F,F)B(F,F)-F | (1-2-4) | 2% |
| 3O1-GB(F,F)XB(F,F)B(F,F)-F | (1-2-4) | 2% |
| 2O1-GB(F,F)XB(F,F)B(F)-F | (1-2-5) | 2% |
| 3O1-GB(F,F)XB(F,F)B(F)-F | (1-2-5) | 2% |
| 3-HH-V | (2) | 10% |
| 3-HH-V1 | (2) | 5% |
| 4-HH-V | (2) | 15% |
| 3-HHXB(F,F)-CF3 | (3-5) | 3% |
| 3-HB(F)B(F,F)-F | (3-9) | 3% |
| 3-HBEB(F,F)-F | (3-10) | 3% |
| 3-GB(F,F)XB(F)-F | (3-13) | 3% |
| 3-BB(F)B(F,F)-F | (3-15) | 3% |
| 3-HBB(F,F)XB(F,F)-F | (3-24) | 3% |
| 3-BB(F)B(F,F)XB(F)-F | (3-28) | 5% |
| 4-BB(F)B(F,F)XB(F)-F | (3-28) | 4% |
| 5-BB(F)B(F,F)XB(F,F)-F | (3-29) | 3% |
| 3-HB-O2 | (4-1) | 6% |
| 7-HB-1 | (4-1) | 4% |
| V2-BB-1 | (4-2) | 7% |
| V-HHB-1 | (4-4) | 3% |
| V2-HHB-1 | (4-4) | 6% |
| 2-BB(F)B-2V | (4-6) | 3% |
| 5-HB(F)BH-3 | (4-11) | 3% |

NI = 71.2° C.; Tc < −20° C.; η = 10.1 mPa · s; Δn = 0.111; Δε = 9.4; Vth = 1.47 V; γ1 = 43.3 mPa · s.

Example 10

| | | |
|---|---|---|
| 1O2-GB(F)XB(F,F)B(F,F)-F | (1-2-4) | 2% |
| 1O1-GB(F)B(F,F)XB(F,F)-F | (1-3-4) | 2% |
| 4O1-GB(F)B(F,F)XB(F,F)-F | (1-3-4) | 3% |
| 2-HH-5 | (2) | 3% |
| 3-HH-V | (2) | 24% |
| 3-HH-V1 | (2) | 7% |
| 5-GHB(F,F)-F | (3-7) | 5% |
| 2-BB(F)B(F,F)-F | (3-15) | 3% |
| 3-BB(F)B(F,F)-F | (3-15) | 3% |
| 3-BB(F)B(F,F)-CF3 | (3-16) | 3% |
| 4-GB(F)B(F,F)XB(F,F)-F | (3-27) | 3% |
| 3-BB(F)B(F,F)XB(F)-F | (3-28) | 3% |
| 4-BB(F)B(F,F)XB(F,F)-F | (3-29) | 3% |
| 5-BB(F)B(F,F)XB(F,F)-F | (3-29) | 3% |
| 3-BB(F,F)XB(F)B(F,F)-F | (3-30) | 3% |
| 1V2-BB-1 | (4-2) | 6% |
| V-HHB-1 | (4-4) | 7% |
| V2-HHB-1 | (4-4) | 5% |
| V-HBB-2 | (4-5) | 4% |
| 5-B(F)BB-2 | (4-7) | 3% |
| V2-BB2B-1 | (4-8) | 3% |
| 1-BB2B-2V | (4-8) | 2% |

NI = 80.4° C.; Tc < −20° C.; η = 12.9 mPa · s; Δn = 0.126; Δε = 10.7; Vth = 1.32 V; γ1 = 55.0 mPa · s.

Example 11

| | | |
|---|---|---|
| 3O-GB(F,F)XB(F)B(F,F)-F | (1-2-4) | 2% |
| 2O1-GB(F,F)XB(F)B(F)-F | (1-2-4) | 3% |
| 2O1-GB(F)B(F,F)XB(F)B(F,F)-F | (1-5-1) | 3% |
| 3-HH-V | (2) | 30% |
| 3-HH-V1 | (2) | 5% |
| 3-HHB(F,F)-F | (3-2) | 10% |
| 2-HGB(F,F)-F | (3-6) | 3% |
| 3-HGB(F,F)-F | (3-6) | 2% |
| 3-GHB(F,F)-F | (3-7) | 3% |
| 5-GHB(F,F)-F | (3-7) | 3% |
| 5-HBEB(F,F)-F | (3-10) | 3% |
| 3-BB(F)B(F,F)-F | (3-15) | 5% |
| 3-HHBB(F,F)-F | (3-19) | 3% |
| 5-HBBXB(F,F)-F | (3-23) | 3% |
| 4-BB(F)B(F,F)XB(F)-F | (3-28) | 3% |
| 5-BB(F)B(F,F)XB(F,F)-F | (3-29) | 5% |
| 7-HB-1 | (4-1) | 5% |
| 3-HHB-3 | (4-4) | 3% |
| 1-BB(F)B-2V | (4-6) | 3% |
| 3-BB(F)B-2V | (4-6) | 3% |

NI = 75.0° C.; Tc < −20° C.; η = 15.2 mPa · s; Δn = 0.104; Δε = 9.5; Vth = 1.46 V; γ1 = 65.0 mPa · s.

Example 12

| | | |
|---|---|---|
| 2O1-GB(F)XB(F)B(F)-F | (1-2) | 3% |
| 2O1-GB(F)B(F,F)XB(F,F)-F | (1-3-4) | 3% |
| 2O1-GB(F)B(F,F)XB(F,F)-CF3 | (1-3-4) | 1% |
| 2-HH-3 | (2) | 19% |
| 2-HH-5 | (2) | 8% |
| 1V2-HH-1 | (2) | 3% |
| 2-HGB(F,F)-F | (3-6) | 3% |
| 3-HGB(F,F)-F | (3-6) | 3% |
| 5-HGB(F,F)-F | (3-6) | 3% |
| 3-HB(F)B(F,F)-F | (3-9) | 3% |
| 5-HB(F)B(F,F)-F | (3-9) | 3% |
| 2-BB(F)B(F,F)-F | (3-15) | 3% |
| 3-BB(F)B(F,F)-F | (3-15) | 3% |
| 2-BB(F,F)XB(F,F)-F | (3-18) | 3% |
| 3-BB(F)XB(F,F)-F | (3-18) | 3% |
| 3-HHB(F)B(F,F)-F | (3-20) | 3% |
| 3-BB(F)B(F,F)XB(F,F)-F | (3-29) | 4% |
| 4-BB(F)B(F,F)XB(F,F)-F | (3-29) | 4% |
| 5-BB(F)B(F,F)XB(F,F)-F | (3-29) | 4% |
| 2-HHB-1 | (4-4) | 3% |
| V-HHB-1 | (4-4) | 3% |
| V2-HHB-1 | (4-4) | 4% |
| 3-HBB-2 | (4-5) | 5% |
| 5-B(F)BB-2 | (4-7) | 3% |
| 1O1-HBBH-5 | (—) | 3% |

NI = 77.9° C.; Tc < −20° C.; η = 18.5 mPa · s; Δn = 0.111; Δε = 11.5; Vth = 1.31 V; γ1 = 79.1 mPa · s.

Example 13

| | | |
|---|---|---|
| 4O1-GB(F,F)XB(F)B(F,F)-F | (1-2-4) | 3% |
| 2O1-GB(F,F)XB(F)B(F)-OCF3 | (1-2-4) | 2% |
| 3-HH-V | (2) | 27% |
| 3-HH-V1 | (2) | 7% |
| 2-HGB(F,F)-F | (3-6) | 3% |
| 3-HGB(F,F)-F | (3-6) | 3% |
| 3-HB(F)B(F,F)-F | (3-9) | 4% |
| 5-HBEB(F,F)-F | (3-10) | 3% |
| 3-BB(F)B(F,F)-F | (3-15) | 5% |
| 4-HHB(F,F)-F | (3-19) | 3% |
| 5-BB(F)B(F,F)XB(F,F)-F | (3-29) | 5% |
| 3-B(2F,3F)BXB(F,F)-F | (3-33) | 3% |
| 1V2-BB-1 | (4-2) | 5% |
| V-HHB-1 | (4-4) | 7% |
| V2-HHB-1 | (4-4) | 6% |
| V-HBB-2 | (4-5) | 6% |
| 3-BB(F)B-5 | (4-6) | 5% |
| 5-HBB(F)B-3 | (4-12) | 3% |

NI = 85.4° C.; Tc < −20° C.; η = 9.4 mPa · s; Δn = 0.117; Δε = 6.5; Vth = 1.72 V; γ1 = 40.1 mPa · s.

Example 14

| | | |
|---|---|---|
| 2O1-GBB(F,F)XB(F,F)-F | (1-3-3) | 2% |
| 4O1-GB(F)B(F,F)XB(F)-F | (1-3-4) | 2% |
| 3-HH-V | (2) | 22% |

-continued

| | | |
|---|---|---|
| 3-HH-V1 | (2) | 17% |
| 3-HHXB(F,F)-CF3 | (3-5) | 5% |
| 4-GHB(F,F)-F | (3-7) | 3% |
| 3-GB(F)B(F)-F | (3-11) | 8% |
| 2-HHBB(F,F)-F | (3-19) | 4% |
| 3-HHBB(F,F)-F | (3-19) | 4% |
| 5-HHBB(F,F)-F | (3-19) | 3% |
| 5-GB(F)B(F,F)XB(F,F)-F | (3-27) | 3% |
| 3-BB(F)B(F,F)XB(F)-F | (3-28) | 7% |
| 3-HB-O2 | (4-1) | 10% |
| V2-HHB-1 | (4-4) | 4% |
| 2-BB(F)B-5 | (4-6) | 3% |
| 3-BB(F)B-5 | (4-6) | 3% |

NI = 86.4° C.; Tc < −20° C.; η = 13.3 mPa · s; Δn = 0.106; Δε = 7.1; Vth = 1.67 V; γ1 = 56.9 mPa · s.

Example 15

| | | |
|---|---|---|
| 2O1-GB(F)XB(F)B(F)-F | (1-2) | 5% |
| 4O1-GB(F,F)XB(F)B(F)-F | (1-2-4) | 3% |
| 3-HH-V | (2) | 32% |
| 3-HHXB(F,F)-F | (3-4) | 5% |
| 5-HB(F)B(F,F)-F | (3-9) | 4% |
| 3-GB(F,F)XB(F,F)-F | (3-14) | 4% |
| 3-HHB(F)B(F,F)-F | (3-20) | 3% |
| 3-BB(F)B(F,F)XB(F,F)-F | (3-29) | 4% |
| 4-BB(F)B(F,F)XB(F,F)-F | (3-29) | 6% |
| 5-BB(F)B(F,F)XB(F,F)-F | (3-29) | 5% |
| 5-HB-O2 | (4-1) | 5% |
| V-HHB-1 | (4-4) | 8% |
| V2-HHB-1 | (4-4) | 5% |
| 1V-HBB-2 | (4-5) | 5% |
| 5-B(F)BB-2 | (4-7) | 3% |
| 5-B(F)BB-3 | (4-7) | 3% |

NI = 86.4° C.; Tc < −20° C.; η = 13.2 mPa · s; Δn = 0.116; Δε = 9.5; Vth = 1.46 V; γ1 = 56.4 mPa · s.

Example 16

| | | |
|---|---|---|
| 4O1-GB(F,F)XB(F)B(F,F)-F | (1-2-4) | 3% |
| 4O1-GB(F)B(F,F)XB(F)B(F,F)-F | (1-3-4) | 3% |
| 3-HH-4 | (2) | 7% |
| 3-HH-V | (2) | 29% |
| 3-HH-V1 | (2) | 6% |
| 4-HHEB(F,F)-F | (3-3) | 3% |
| 1-HHXB(F,F)-F | (3-4) | 3% |
| 3-GB(F,F)XB(F,F)-F | (3-14) | 3% |
| 3-BBXB(F,F)-F | (3-17) | 3% |
| 3-BB(F)XB(F,F)-F | (3-18) | 3% |
| 2-HHBB(F,F)-F | (3-19) | 2% |
| 4-HHB(F)B(F,F)-F | (3-20) | 3% |
| 3-BB(F)B(F,F)XB(F,F)-F | (3-29) | 4% |
| 5-BB(F)B(F,F)XB(F,F)-F | (3-29) | 3% |
| 3-HHEH-3 | (4-3) | 6% |
| V-HHB-1 | (4-4) | 5% |
| V2-HHB-1 | (4-4) | 7% |
| 2-BB(F)B-3 | (4-6) | 3% |
| 5-B(F)BB-2 | (4-7) | 4% |

NI = 85.2° C.; Tc < −20° C.; η = 9.4 mPa · s; Δn = 0.098; Δε = 7.0; Vth = 1.68 V; γ1 = 40.3 mPa · s.

Example 17

| | | |
|---|---|---|
| 3O1-GB(F,F)XB(F)B(F,F)-F | (1-2-4) | 3% |
| 2O1-GB(F)B(F,F)XB(F)B(F,F)-F | (1-5-1) | 4% |
| 3-HH-V | (2) | 29% |
| 3-HH-V1 | (2) | 6% |
| 1V2-HH-3 | (2) | 6% |
| 3-HHEB(F,F)-F | (3-3) | 3% |
| 5-HHEB(F,F)-F | (3-3) | 4% |
| 3-HHXB(F,F)-F | (3-4) | 6% |
| 3-GB(F)B(F,F)-F | (3-12) | 3% |
| 5-GB(F)B(F,F)-F | (3-12) | 3% |
| 3-GB(F)B(F)B(F)-F | (3-21) | 3% |
| 3-BB(F)B(F,F)XB(F)-F | (3-28) | 4% |
| 4-BB(F)B(F,F)XB(F)-F | (3-28) | 8% |
| 1-BB-3 | (4-2) | 3% |
| V-HHB-1 | (4-4) | 4% |
| 3-HBB-2 | (4-5) | 7% |
| V2-BB2B-1 | (4-8) | 4% |

NI = 86.0° C.; Tc < −20° C.; η = 11.6 mPa · s; Δn = 0.111; Δε = 9.1; Vth = 1.45 V; γ1 = 49.6 mPa · s.

Example 18

| | | |
|---|---|---|
| 3O1-GB(F)B(F,F)XB(F,F)-F | (1-3-4) | 5% |
| 4O1-GB(F)B(F,F)XB(F)-F | (1-3-4) | 3% |
| 3-HH-V | (2) | 17% |
| 3-HH-V1 | (2) | 8% |
| 5-HH-V | (2) | 5% |
| 4-HHB(F,F)-F | (3-2) | 3% |
| 5-HHB(F,F)-F | (3-2) | 3% |
| 2-HBEB(F,F)-F | (3-10) | 5% |
| 2-BB(F)B(F,F)-F | (3-15) | 3% |
| 3-BB(F)B(F,F)-F | (3-15) | 5% |
| 3-BB(F)B(F,F)-CF3 | (3-16) | 5% |
| 2-dhBB(F,F)XB(F,F)-F | (3-25) | 3% |
| 3-BB(F)B(F,F)XB(F,F)-F | (3-29) | 3% |
| 4-BB(F)B(F,F)XB(F,F)-F | (3-29) | 4% |
| 5-BB(F)B(F,F)XB(F,F)-F | (3-29) | 5% |
| 3-HB-O2 | (4-1) | 6% |
| 3-HHB-1 | (4-4) | 3% |
| VFF-HHB-1 | (4-4) | 3% |
| V-HBB-2 | (4-5) | 4% |
| 3-BB(F)B-5 | (4-6) | 4% |
| 3-HHEBH-3 | (4-10) | 3% |

NI = 80.9° C.; Tc < −20° C.; η = 18.0 mPa · s; Δn = 0.116; Δε = 10.8; Vth = 1.33 V; γ1 = 76.9 mPa · s.

Example 19

| | | |
|---|---|---|
| 2O1-GB(F,F)XB(F,F)-F | (1-1-3) | 2% |
| 2O1-GB(F)B(F,F)XB(F,F)-F | (1-3-4) | 3% |
| 3-HH-V | (2) | 23% |
| 3-HH-V1 | (2) | 7% |
| 1V2-HH-3 | (2) | 3% |
| 1-HHB(F,F)-F | (3-2) | 3% |
| 2-HHB(F,F)-F | (3-2) | 3% |
| 3-HHB(F,F)-F | (3-2) | 3% |
| 3-HBB(F,F)-F | (3-8) | 3% |
| 5-HBB(F,F)-F | (3-8) | 3% |
| V-HB(F)B(F,F)-F | (3-9) | 3% |
| 3-GB(F,F)XB(F)-F | (3-13) | 3% |
| 3-GBB(F)B(F,F)-F | (3-22) | 3% |
| 4-BB(F)B(F,F)XB(F)-F | (3-28) | 5% |
| 4-BB(F)B(F,F)XB(F,F)-F | (3-29) | 8% |
| 5-BB(F)B(F,F)XB(F)B(F,F)-F | (3-31) | 3% |
| 3-HHB-O1 | (4-4) | 3% |
| V-HHB-1 | (4-4) | 6% |
| V2-HHB-1 | (4-4) | 6% |
| 2-BB(F)B-2V | (4-6) | 3% |
| 3-HHEBH-5 | (4-10) | 4% |

NI = 94.1° C.; Tc < −20° C.; η = 18.1 mPa · s; Δn = 0.112; Δε = 9.3; Vth = 1.48 V; γ1 = 77.5 mPa · s.

Example 20

| | | |
|---|---|---|
| 3O1-GB(F)B(F,F)XB(F,F)-F | (1-3-4) | 2% |
| 4O1-GB(F)B(F,F)X8 (F,F)-F | (1-3-4) | 4% |
| 2-HH-3 | (2) | 10% |
| 3-HH-4 | (2) | 7% |
| 3-HH-5 | (2) | 7% |
| 3-HH-V1 | (2) | 8% |
| 5-HXB(F,F)-F | (3-1) | 3% |
| 3-HB(F)B(F,F)-F | (3-9) | 3% |
| 3-GB(F,F)XB(F,F)-F | (3-14) | 4% |
| 3-BB(F)B(F,F)-F | (3-15) | 3% |
| 3-BB(F)B(F,F)XB(F,F)-F | (3-18) | 8% |
| 3-HHBB(F,F)-F | (3-19) | 5% |
| 2-HHB(F)B(F,F)-F | (3-20) | 4% |
| 3-HHB(F)B(F,F)-F | (3-20) | 5% |
| 5-GB(F)B(F,F)XB(F,F)-F | (3-27) | 3% |
| 3-HB-O2 | (4-1) | 3% |
| V-HHB-1 | (4-4) | 3% |
| V2-HHB-1 | (4-4) | 3% |
| 3-HBB-2 | (4-5) | 6% |
| 2-BB(F)B-5 | (4-6) | 5% |
| 1-BB2B-2V | (4-8) | 4% |

NI = 82.6° C.; Tc < −20° C.; η = 15.5 mPa · s; Δn = 0.109; Δε = 9.5; Vth = 1.45 V; γ1 = 66.3 mPa · s.

Example 21

| | | |
|---|---|---|
| 1O1-HB(F,F)XB(F,F)-F | (1'-3) | 5% |
| 1O1-HHB(F,F)XB(F,F)-F | (1-5) | 5% |
| 3-HH-V | (2) | 40% |
| 3-HH-V1 | (2) | 6% |
| 5-HH-V | (2) | 4% |
| 3-BB(F,F)XB(F,F)-F | (3-18) | 9% |
| 3-HBBXB(F,F)-F | (3-23) | 9% |
| 3-HBB(F)XB(F,F)-F | (3-24) | 4% |
| 4-BB(F)B(F,F)XB(F,F)-F | (3-29) | 6% |
| 5-BB(F)B(F,F)XB(F,F)-F | (3-29) | 2% |
| V-HHB-1 | (4-4) | 5% |
| V2-HHB-1 | (4-4) | 5% |

NI = 74.2° C.; Tc < −20° C.; η = 10.2 mPa · s; Δn = 0.093; Δε = 7.6; Vth = 1.55 V; γ1 = 50.0 mPa · s.

Example 22

| | | |
|---|---|---|
| 2O1-HBBXB(F,F)-F | (1'-6) | 3% |
| 1O1-HB(F,F)XB(F)B(F,F)-F | (1'-8) | 3% |
| 3-HH-V | (2) | 39% |
| 5-HHB(F,F)-F | (3-2) | 5% |
| 3-HHEB(F,F)-F | (3-3) | 6% |
| 2-HBB(F,F)-F | (3-8) | 3% |
| 3-HB(F)B(F,F)-F | (3-9) | 5% |
| 3-HBEB(F,F)-F | (3-10) | 3% |
| 3-GB(F,F)XB(F,F)-F | (3-14) | 4% |
| 3-BBXB(F,F)-F | (3-17) | 4% |
| 3-BB(F)B(F,F)XB(F,F)-F | (3-29) | 4% |
| V2-B(2F,3F)BXB(F,F)-F | (3-33) | 3% |
| V-HHB-1 | (4-4) | 4% |
| V2-HHB-1 | (4-4) | 6% |
| 1V-HBB-2 | (4-5) | 5% |
| 5-B(F)BB-3 | (4-7) | 3% |

NI = 74.1° C.; Tc < −20° C.; η = 10.5 mPa · s; Δn = 0.100; Δε = 6.4; Vth = 1.69 V; γ1 = 51.6 mPa · s.

Example 23

| | | |
|---|---|---|
| 1O1-HB(2F,3F)XB(F,F)-F | (1'-4) | 2% |
| 1O1-HBB(F,F)XB(F,F)-F | (1'-6) | 2% |
| 2O2-HB(F,F)XB(F)B(F,F)-F | (1'-8) | 2% |
| 2-HH-3 | (2) | 14% |
| 3-HH-V | (2) | 30% |
| 3-HHB(F,F)-F | (3-2) | 3% |
| 4-HHEB(F,F)-F | (3-3) | 3% |
| 3-HHXB(F,F)-F | (3-4) | 2% |
| 5-HB(F)B(F,F)-F | (3-9) | 4% |
| 2-GB(F,F)XB(F,F)-F | (3-14) | 3% |
| 3-BB(F)B(F,F)-CF3 | (3-16) | 3% |
| 3-HHBB(F,F)-F | (3-19) | 4% |
| 3-BB(F)B(F,F)XB(F)-F | (3-28) | 5% |
| 4-BB(F)B(F,F)XB(F)-F | (3-28) | 5% |
| 3-HB(2F,3F)BXB(F,F)-F | (3-34) | 3% |
| 3-BB(2F,3F)BXB(F,F)-F | (3-35) | 3% |
| 1-BB-3 | (4-2) | 3% |
| V2-HHB-1 | (4-4) | 3% |
| 1V-HBB-2 | (4-5) | 4% |
| 3-HHEBH-4 | (4-10) | 2% |

NI = 74.7° C.; Tc < −20° C.; η = 11.7 mPa · s; Δn = 0.099; Δε = 6.8; Vth = 1.62 V; γ1 = 57.5 mPa · s.

Example 24

| | | |
|---|---|---|
| 1O1-HHB(F,F)-F | (1'-1) | 2% |
| 2O1-HBBXB(F,F)-F | (1'-6) | 2% |
| 1O1-HB(F,F)XB(F)B(F,F)-OCF3 | (1'-8) | 2% |
| 3-HH-V | (2) | 37% |
| 3-HH-V1 | (2) | 5% |
| 4-HH-V | (2) | 4% |
| 5-HHEB(F,F)-F | (3-3) | 5% |
| 5-GHB(F,F)-F | (3-7) | 3% |
| 2-BB(F)B(F,F)-F | (3-15) | 3% |
| 3-BB(F)B(F,F)-F | (3-15) | 3% |
| 3-HHBB(F,F)-F | (3-19) | 2% |
| 3-BB(F)B(F,F)XB(F)-F | (3-28) | 5% |
| 4-BB(F)B(F,F)XB(F)-F | (3-28) | 4% |
| 3-BB(F)B(F,F)XB(F,F)-F | (3-29) | 5% |
| 5-BB(F)B(F,F)XB(F,F)-F | (3-29) | 2% |
| 3-BB(2F,3F)XB(F,F)-F | (3-32) | 3% |
| 1-BB-5 | (4-2) | 2% |
| V2-BB-1 | (4-2) | 2% |
| 3-HHB-1 | (4-4) | 5% |
| 3-BB(F)B-2V | (4-6) | 2% |
| 5-HBB(F)B-2 | (4-12) | 2% |

NI = 75.4° C.; Tc < −20° C.; η = 12.6 mPa · s; Δn = 0.108; Δε = 6.8; Vth = 1.63 V; γ1 = 61.6 mPa · s.

Example 25

| | | |
|---|---|---|
| 1O1-HBB(F,F)-F | (1'-2) | 2% |
| 1O1-HB(F,F)XB(F)B(F,F)-F | (1'-8) | 4% |
| 1O1-chBB(F,F)XB(F,F)-F | (1'-10) | 2% |
| 2-HH-3 | (2) | 25% |
| 3-HH-V | (2) | 15% |
| 3-HHB(F,F)-F | (3-2) | 3% |
| 2-HBB(F,F)-F | (3-8) | 3% |
| 3-HB(F)B(F,F)-F | (3-9) | 5% |
| 3-GB(F,F)XB(F,F)-F | (3-14) | 3% |
| 2-BB(F,F)XB(F,F)-F | (3-18) | 3% |
| 3-BB(F)B(F,F)XB(F,F)-F | (3-29) | 3% |
| 5-BB(F)B(F,F)XB(F,F)-F | (3-29) | 2% |
| 5-BB(F)B(F,F)XB(F)B(F,F)-F | (3-31) | 3% |
| 3-HB-O2 | (4-1) | 3% |
| V-HHB-1 | (4-4) | 5% |
| V2-HHB-1 | (4-4) | 6% |
| 3-HBB-2 | (4-5) | 5% |

-continued

| | | |
|---|---|---|
| 3-BB(F)B-2V | (4-6) | 5% |
| 5-HBB(F)B-2 | (4-12) | 3% |

NI = 74.4° C.; Tc < −20° C.; η = 10.0 mPa · s; Δn = 0.105; Δε = 6.4; Vth = 1.68 V; γ1 = 49.0 mPa · s.

Example 26

| | | |
|---|---|---|
| 1O1-HB(F,F)XB(F,F)-F | (1'-3) | 2% |
| 1O1-HHB(F,F)XB(F,F)-F | (1'-5) | 3% |
| 1O1-chBB(F,F)-F | (1'-9) | 5% |
| 3-HH-V | (2) | 33% |
| 3-HH-V1 | (2) | 10% |
| 1-HHB(F,F)-F | (3-2) | 3% |
| 3-HBB(F,F)-F | (3-8) | 3% |
| 3-BB(F,F)XB(F,F)-F | (3-18) | 3% |
| 4-HHB(F)B(F,F)-F | (3-20) | 3% |
| 5-GB(F)B(F)B(F)-F | (3-21) | 4% |
| 3-GB(F)B(F,F)XB(F,F)-F | (3-27) | 3% |
| 3-BB(F)B(F,F)XB(F,F)-F | (3-29) | 3% |
| 5-BB(F)B(F,F)XB(F,F)-F | (3-29) | 2% |
| 3-BB(F,F)XB(F)B(F,F)-F | (3-30) | 3% |
| 3-HB-O2 | (4-1) | 2% |
| 1-BB-5 | (4-2) | 3% |
| 1V2-BB-1 | (4-2) | 2% |
| V2-HHB-1 | (4-4) | 3% |
| 3-HBB-2 | (4-5) | 3% |
| V-HBB-2 | (4-5) | 3% |
| 5-B(F)BB-3 | (4-7) | 2% |
| 3-HBB(2F,3F)-O2 | (5-10) | 2% |

NI = 74.6° C.; Tc < −20° C.; η = 12.7 mPa · s; Δn = 0.109; Δε = 6.6; Vth = 1.65 V; γ1 = 62.3 mPa · s.

Example 27

| | | |
|---|---|---|
| 1O1-HB(F,F)XB(F,F)-F | (1'-3) | 5% |
| 1O1-HBBXB(F,F)-F | (1'-6) | 2% |
| 2O1-HBBXB(F,F)-F | (1'-6) | 2% |
| 3-HH-V | (2) | 25% |
| 4-HH-V | (2) | 5% |
| 5-HH-V | (2) | 7% |
| 1-HHXB(F,F)-F | (3-4) | 6% |
| 3-HB(F)B(F,F)-F | (3-9) | 3% |
| V-HB(F)B(F,F)-F | (3-9) | 3% |
| 3-HBEB(F,F)-F | (3-10) | 3% |
| 2-HHBB(F,F)-F | (3-19) | 3% |
| 5-GB(F)B(F,F)XB(F,F)-F | (3-26) | 3% |
| 4-BB(F)B(F,F)XB(F,F)-F | (3-29) | 5% |
| 5-BB(F)B(F,F)XB(F,F)-F | (3-29) | 4% |
| V2-BB-1 | (4-2) | 9% |
| 3-HHB-3 | (4-4) | 5% |
| V2-HHB-1 | (4-4) | 6% |
| 3-BB(F)B-5 | (4-6) | 2% |
| V2-BB2B-1 | (4-8) | 2% |

NI = 71.1° C.; Tc < −20° C.; η = 11.4 mPa · s; Δn = 0.105; Δε = 6.8; Vth = 1.62 V; γ1 = 56.1 mPa · s.

Example 28

| | | |
|---|---|---|
| 1O1-HB(F,F)XB(F,F)-F | (1'-3) | 3% |
| 1O1-HBBXB(F,F)-F | (1'-6) | 3% |
| 3-HH-V | (2) | 33% |
| 3-HH-V1 | (2) | 5% |
| 3-HH-VFF | (2) | 7% |
| 5-HHB(F,F)-F | (3-2) | 5% |
| 2-HBEB(F,F)-F | (3-10) | 3% |
| 3-GB(F,F)XB(F,F)-F | (3-14) | 2% |
| 3-BB(F)B(F,F)-F | (3-15) | 2% |
| 3-BB(F)B(F,F)-CF3 | (3-16) | 2% |
| 2-HHB(F)B(F,F)-F | (3-20) | 3% |
| 3-HHB(F)B(F,F)-F | (3-20) | 2% |
| 3-HBBXB(F,F)-F | (3-23) | 6% |
| 3-dhBB(F,F)XB(F,F)-F | (3-25) | 3% |
| 4-GB(F)B(F,F)XB(F)-F | (3-26) | 3% |
| 3-BB(F)B(F,F)XB(F)-F | (3-28) | 4% |
| 3-HB-O2 | (4-1) | 3% |
| V2-HHB-1 | (4-4) | 4% |
| 1-BB(F)B-2V | (4-6) | 3% |
| 5-B(F)BB-2 | (4-7) | 2% |
| 3-HB(F)HH-5 | (4-9) | 2% |

NI = 81.8° C.; Tc < −20° C.; η = 12.4 mPa · s; Δn = 0.105; Δε = 6.8; Vth = 1.61 V; γ1 = 60.9 mPa · s.

Example 29

| | | |
|---|---|---|
| 1O1-HHB(F,F)XB(F,F)-F | (1'-5) | 3% |
| 1O1-HBBXB(F,F)-F | (1'-6) | 2% |
| 1O1-HB(F,F)XB(F)B(F,F)-F | (1'-8) | 3% |
| 3-HH-V | (2) | 23% |
| 3-HH-V1 | (2) | 5% |
| 4-HH-V | (2) | 5% |
| 3-HHXB(F,F)-CF3 | (3-5) | 3% |
| 3-HB(F)B(F,F)-F | (3-9) | 2% |
| 3-HBEB(F,F)-F | (3-10) | 3% |
| 3-GB(F,F)XB(F)-F | (3-13) | 2% |
| 3-BB(F)B(F,F)-F | (3-15) | 2% |
| 3-HBB(F,F)XB(F,F)-F | (3-24) | 3% |
| 3-BB(F)B(F,F)XB(F)-F | (3-28) | 5% |
| 4-BB(F)B(F,F)XB(F)-F | (3-28) | 4% |
| 5-BB(F)B(F,F)XB(F,F)-F | (3-29) | 3% |
| 3-HB-O2 | (4-1) | 6% |
| 7-HB-1 | (4-1) | 4% |
| V2-BB-1 | (4-2) | 7% |
| V-HHB-1 | (4-4) | 3% |
| V2-HHB-1 | (4-4) | 6% |
| 2-BB(F)B-2V | (4-6) | 3% |
| 5-HB(F)BH-3 | (4-11) | 3% |

NI = 75.8° C.; Tc < −20° C.; η = 12.2 mPa · s; Δn = 0.112; Δε = 6.8; Vth = 1.63 V; γ1 = 60.0 mPa · s.

Example 30

| | | |
|---|---|---|
| 1O1-HB(F,F)XB(F,F)-F | (1'-3) | 3% |
| 1O1-HBB(F,F)XB(F,F)-F | (1'-6) | 3% |
| 2-HH-5 | (2) | 3% |
| 3-HH-V | (2) | 31% |
| 3-HH-V1 | (2) | 7% |
| 5-GHB(F,F)-F | (3-7) | 3% |
| 2-BB(F)B(F,F)-F | (3-15) | 3% |
| 3-BB(F)B(F,F)-F | (3-15) | 3% |
| 3-BB(F)B(F,F)-CF3 | (3-16) | 3% |
| 4-GB(F)B(F,F)XB(F,F)-F | (3-27) | 3% |
| 3-BB(F)B(F,F)XB(F)-F | (3-28) | 3% |
| 4-BB(F)B(F,F)XB(F,F)-F | (3-29) | 3% |
| 5-BB(F)B(F,F)XB(F,F)-F | (3-29) | 3% |
| 3-BB(F,F)XB(F)B(F,F)-F | (3-30) | 3% |
| 1V2-BB-1 | (4-2) | 6% |
| V-HHB-1 | (4-4) | 7% |
| V2-HHB-1 | (4-4) | 5% |
| V-HBB-2 | (4-5) | 2% |
| 5-B(F)BB-2 | (4-7) | 2% |
| V2-BB2B-1 | (4-8) | 2% |
| 1-BB2B-2V | (4-8) | 2% |

NI = 75.5° C.; Tc < −20° C.; η = 11.5 mPa · s; Δn = 0.117; Δε = 7.7; Vth = 1.53 V; γ1 = 56.3 mPa · s.

Example 31

| | | |
|---|---|---|
| 1O1-HBBXB(F,F)-F | (1'-6) | 2% |
| 2O1-HBBXB(F,F)-F | (1'-6) | 2% |
| 1O1-HB(F,F)XB(F)B(F,F)-F | (1'-8) | 3% |
| 2-HH-3 | (2) | 10% |
| 3-HH-V | (2) | 28% |
| 3-HH-V1 | (2) | 6% |
| 1V2-HH-3 | (2) | 2% |
| 3-HHB(F,F)-F | (3-2) | 5% |
| 3-HHXB(F,F)-F | (3-4) | 5% |
| 2-HGB(F,F)-F | (3-6) | 3% |
| 3-HGB(F,F)-F | (3-6) | 2% |
| 3-GHB(F,F)-F | (3-7) | 3% |
| 5-GHB(F,F)-F | (3-7) | 3% |
| 5-HBEB(F,F)-F | (3-10) | 3% |
| 3-BB(F)B(F,F)-F | (3-15) | 2% |
| 3-HHBB(F,F)-F | (3-19) | 2% |
| 3-HBBXB(F,F)-F | (3-23) | 2% |
| 5-HBBXB(F,F)-F | (3-23) | 3% |
| 4-BB(F)B(F,F)XB(F)-F | (3-28) | 3% |
| 5-BB(F)B(F,F)XB(F,F)-F | (3-29) | 3% |
| 7-HB-1 | (4-1) | 2% |
| 3-HHB-3 | (4-4) | 2% |
| 1-BB(F)B-2V | (4-6) | 2% |
| 3-BB(F)B-2V | (4-6) | 2% |

NI = 74.8° C.; Tc < −20° C.; η = 12.3 mPa · s; Δn = 0.092; Δε = 6.4; Vth = 1.67 V; γ1 = 60.4 mPa · s.

Example 32

| | | |
|---|---|---|
| 1O1-HHB(F,F)-F | (1'-1) | 3% |
| 1O1-HHB(F,F)XB(F,F)-F | (1'-5) | 3% |
| 2-HH-3 | (2) | 26% |
| 2-HH-5 | (2) | 4% |
| 3-HH-V | (2) | 6% |
| 1V2-HH-1 | (2) | 3% |
| 2-HGB(F,F)-F | (3-6) | 3% |
| 3-HGB(F,F)-F | (3-6) | 3% |
| 5-HGB(F,F)-F | (3-6) | 4% |
| 3-HB(F)B(F,F)-F | (3-9) | 3% |
| 5-HB(F)B(F,F)-F | (3-9) | 3% |
| 2-BB(F)B(F,F)-F | (3-15) | 3% |
| 3-BB(F)B(F,F)-F | (3-15) | 3% |
| 3-BB(F,F)XB(F,F)-F | (3-18) | 4% |
| 3-HHB(F)B(F,F)-F | (3-20) | 2% |
| 3-BB(F)B(F,F)XB(F,F)-F | (3-29) | 4% |
| 4-BB(F)B(F,F)XB(F,F)-F | (3-29) | 3% |
| 2-HHB-1 | (4-4) | 2% |
| V-HHB-1 | (4-4) | 3% |
| V2-HHB-1 | (4-4) | 5% |
| 3-HBB-2 | (4-5) | 5% |
| 5-B(F)BB-2 | (4-7) | 3% |
| 1O1-HBBH-5 | (—) | 2% |

NI = 72.1° C.; Tc < −20° C.; η = 12.3 mPa · s; Δn = 0.096; Δε = 6.4; Vth = 1.69 V; γ1 = 60.3 mPa · s.

Example 33

| | | |
|---|---|---|
| 1O1-HB(2F,3F)XB(F,F)-F | (1'-4) | 3% |
| 1O1-HBBXB(F,F)-F | (1'-6) | 3% |
| 3-HH-V | (2) | 27% |
| 3-HH-V1 | (2) | 7% |
| 2-HGB(F,F)-F | (3-6) | 3% |
| 3-HGB(F,F)-F | (3-6) | 3% |
| 3-HB(F)B(F,F)-F | (3-9) | 4% |
| 5-HBEB(F,F)-F | (3-10) | 3% |
| 3-BB(F)B(F,F)-F | (3-15) | 5% |
| 3-BBXB(F,F)-F | (3-17) | 3% |
| 4-HHBB(F,F)-F | (3-19) | 3% |
| 3-HBBXB(F,F)-F | (3-23) | 3% |
| 5-BB(F)B(F,F)XB(F,F)-F | (3-29) | 5% |
| 3-B(2F,3F)BXB(F,F)-F | (3-33) | 3% |
| 1V2-BB-1 | (4-2) | 5% |
| V-HHB-1 | (4-4) | 5% |
| V2-HHB-1 | (4-4) | 5% |
| V-HBB-2 | (4-5) | 6% |
| 3-BB(F)B-5 | (4-6) | 4% |

NI = 79.3° C.; Tc < −20° C.; η = 12.2 mPa · s; Δn = 0.116; Δε = 6.3; Vth = 1.72 V; γ1 = 60.0 mPa · s.

Example 34

| | | |
|---|---|---|
| 1O1-HHB(F,F)-F | (1'-1) | 2% |
| 1O1-HBB(F,F)-F | (1'-2) | 2% |
| 1O1-HHB(F,F)XB(F,F)-F | (1'-5) | 2% |
| 3-HH-V | (2) | 37% |
| 3-HH-V1 | (2) | 10% |
| 3-HHXB(F,F)-CF3 | (3-5) | 5% |
| 4-GHB(F,F)-F | (3-7) | 3% |
| 3-GB(F)B(F)-F | (3-11) | 8% |
| 2-BB(F,F)XB(F,F)-F | (3-18) | 3% |
| 2-HHBB(F,F)-F | (3-19) | 3% |
| 3-HHBB(F,F)-F | (3-19) | 3% |
| 5-GB(F)B(F,F)XB(F,F)-F | (3-27) | 3% |
| 3-BB(F)B(F,F)XB(F)-F | (3-28) | 7% |
| 3-HB-O2 | (4-1) | 5% |
| V2-HHB-1 | (4-4) | 4% |
| 2-BB(F)B-5 | (4-6) | 3% |

NI = 74.2° C.; Tc < −20° C.; η = 11.7 mPa · s; Δn = 0.094; Δε = 6.3; Vth = 1.71 V; γ1 = 57.2 mPa · s.

Example 35

| | | |
|---|---|---|
| 1O1-HB(F,F)XB(F,F)-F | (1'-3) | 3% |
| 1O1-HBBXB(F,F)-F | (1'-6) | 3% |
| 2-HH-3 | (2) | 8% |
| 3-HH-V | (2) | 33% |
| 3-HHXB(F,F)-F | (3-4) | 5% |
| 5-HB(F)B(F,F)-F | (3-9) | 4% |
| 3-GB(F,F)XB(F,F)-F | (3-14) | 4% |
| 3-HHB(F)B(F,F)-F | (3-20) | 3% |
| 3-BB(F)B(F,F)XB(F,F)-F | (3-29) | 4% |
| 4-BB(F)B(F,F)XB(F,F)-F | (3-29) | 6% |
| 5-BB(F)B(F,F)XB(F,F)-F | (3-29) | 5% |
| 5-HB-O2 | (4-1) | 5% |
| V-HHB-1 | (4-4) | 5% |
| V2-HHB-1 | (4-4) | 5% |
| 1V-HBB-2 | (4-5) | 3% |
| 5-B(F)BB-2 | (4-7) | 2% |
| 5-B(F)BB-3 | (4-7) | 2% |

NI = 76.7° C.; Tc < −20° C.; η = 10.7 mPa · s; Δn = 0.103; Δε = 7.4; Vth = 1.56 V; γ1 = 52.7 mPa · s.

Example 36

| | | |
|---|---|---|
| 1O1-HBB(F,F)XB(F,F)-F | (1'-6) | 3% |
| 1O1-HB(F,F)XB(F)B(F,F)-F | (1'-8) | 3% |
| 3-HH-4 | (2) | 7% |
| 3-HH-V | (2) | 29% |
| 3-HH-V1 | (2) | 8% |
| 4-HHEB(F,F)-F | (3-3) | 3% |
| 1-HHXB(F,F)-F | (3-4) | 3% |
| 3-GB(F,F)XB(F,F)-F | (3-14) | 4% |
| 3-BBXB(F,F)-F | (3-17) | 3% |
| 2-BB(F,F)XB(F,F)-F | (3-18) | 3% |
| 3-BB(F,F)XB(F,F)-F | (3-18) | 3% |
| 2-HHBB(F,F)-F | (3-19) | 2% |

-continued

| 4-HHB(F)B(F,F)-F | (3-20) | 3% |
|---|---|---|
| 3-BB(F)B(F,F)XB(F,F)-F | (3-29) | 4% |
| 5-BB(F)B(F,F)XB(F,F)-F | (3-29) | 3% |
| 3-HHEH-3 | (4-3) | 2% |
| V-HHB-1 | (4-4) | 5% |
| V2-HHB-1 | (4-4) | 7% |
| 2-BB(F)B-3 | (4-6) | 3% |
| 5-B(F)BB-2 | (4-7) | 2% |

NI = 79.6° C.; Tc < −20° C.; η = 11.9 mPa · s; Δn = 0.099; Δε = 7.0; Vth = 1.58 V; γ1 = 58.4 mPa · s.

Example 37

| 1O1-HB(F,F)XB(F,F)-F | (1'-3) | 3% |
|---|---|---|
| 1O1-HB(F,F)XB(F)B(F,F)-F | (1'-8) | 2% |
| 1O1-HB(F,F)XB(F)B(F,F)-OCF3 | (1'-8) | 2% |
| 3-HH-V | (2) | 35% |
| 3-HH-V1 | (2) | 8% |
| 1V2-HH-3 | (2) | 3% |
| 3-HHEB(F,F)-F | (3-3) | 3% |
| 5-HHEB(F,F)-F | (3-3) | 4% |
| 3-HHXB(F,F)-F | (3-4) | 6% |
| 3-GB(F)B(F,F)-F | (3-12) | 3% |
| 5-GB(F)B(F,F)-F | (3-12) | 3% |
| 3-GB(F)B(F)B(F)-F | (3-21) | 3% |
| 3-BB(F)B(F,F)XB(F)-F | (3-28) | 4% |
| 4-BB(F)B(F,F)XB(F)-F | (3-28) | 6% |
| 1-BB-3 | (4-2) | 3% |
| V-HHB-1 | (4-4) | 4% |
| 3-HBB-2 | (4-5) | 5% |
| V2-BB2B-1 | (4-8) | 3% |

NI = 76.8° C.; Tc < −20° C.; η = 11.3 mPa · s; Δn = 0.100; Δε = 6.3; Vth = 1.72 V; γ1 = 55.7 mPa · s.

Example 38

| 1O1-HBBXB(F,F)-F | (1'-6) | 2% |
|---|---|---|
| 2O1-HBBXB(F,F)-F | (1'-6) | 2% |
| 1O1-HBB(2F,3F)XB(F,F)-F | (1'-7) | 3% |
| 2-HH-3 | (2) | 14% |
| 3-HH-V | (2) | 26% |
| 5-HH-V | (2) | 4% |
| 4-HHB(F,F)-F | (3-2) | 3% |
| 5-HHB(F,F)-F | (3-2) | 3% |
| 2-HBEB(F,F)-F | (3-10) | 4% |
| 2-BB(F)B(F,F)-F | (3-15) | 3% |
| 3-BB(F)B(F,F)-F | (3-15) | 3% |
| 3-BB(F)B(F,F)-CF3 | (3-16) | 3% |
| 2-dhBB(F,F)XB(F,F)-F | (3-25) | 3% |
| 3-BB(F)B(F,F)XB(F,F)-F | (3-29) | 3% |
| 4-BB(F)B(F,F)XB(F,F)-F | (3-29) | 3% |
| 5-BB(F)B(F,F)XB(F,F)-F | (3-29) | 3% |
| 3-HB-O2 | (4-1) | 6% |
| 3-HHB-1 | (4-4) | 3% |
| VFF-HHB-1 | (4-4) | 2% |
| V-HBB-2 | (4-5) | 3% |
| 3-BB(F)B-5 | (4-6) | 2% |
| 3-HHEBH-3 | (4-10) | 2% |

NI = 72.8° C.; Tc < −20° C.; η = 11.7 mPa · s; Δn = 0.100; Δε = 6.7; Vth = 1.64 V; γ1 = 57.2 mPa · s.

Example 39

| 1O1-HB(F,F)XB(F,F)-F | (1'-3) | 3% |
|---|---|---|
| 1O1-HB(F,F)XB(F)B(F,F)-F | (1'-8) | 3% |
| 2-HH-3 | (2) | 9% |
| 3-HH-V | (2) | 32% |

| 3-HH-V1 | (2) | 5% |
|---|---|---|
| 1V2-HH-3 | (2) | 3% |
| 1-HHB(F,F)-F | (3-2) | 2% |
| 2-HHB(F,F)-F | (3-2) | 3% |
| 3-HHB(F,F)-F | (3-2) | 3% |
| 3-HBB(F,F)-F | (3-8) | 3% |
| 5-HBB(F,F)-F | (3-8) | 3% |
| V-HB(F)B(F,F)-F | (3-9) | 3% |
| 3-GB(F,F)XB(F)-F | (3-13) | 3% |
| 3-GBB(F)B(F,F)-F | (3-22) | 2% |
| 4-BB(F)B(F,F)XB(F)-F | (3-28) | 5% |
| 4-BB(F)B(F,F)XB(F,F)-F | (3-29) | 5% |
| 5-BB(F)B(F,F)XB(F)B(F,F)-F | (3-31) | 3% |
| 3-HHB-O1 | (4-4) | 2% |
| V-HHB-1 | (4-4) | 2% |
| V2-HHB-1 | (4-4) | 2% |
| 2-BB(F)B-2V | (4-6) | 2% |
| 3-HHEBH-5 | (4-10) | 2% |
| V2-HHB-1 | (4-4) | 2% |
| 2-BB(F)B-2V | (4-6) | 2% |
| 3-HHEBH-5 | (4-10) | 2% |

NI = 72.5° C.; Tc < −20° C.; η = 11.8 mPa · s; Δn = 0.093; Δε = 6.3; Vth = 1.73 V; γ1 = 57.8 mPa · s.

Example 40

| 1O1-HBBXB(F,F)-F | (1'-6) | 3% |
|---|---|---|
| 1O1-HBB(F,F)XB(F,F)-F | (1'-6) | 3% |
| 2-HH-3 | (2) | 27% |
| 3-HH-4 | (2) | 3% |
| 3-HH-5 | (2) | 3% |
| 3-HH-V1 | (2) | 8% |
| 5-HXB(F,F)-F | (3-1) | 3% |
| 3-HB(F)B(F,F)-F | (3-9) | 3% |
| 3-GB(F,F)XB(F,F)-F | (3-14) | 4% |
| 3-BB(F)B(F,F)-F | (3-15) | 3% |
| 3-BB(F,F)XB(F,F)-F | (3-18) | 8% |
| 3-HHBB(F,F)-F | (3-19) | 4% |
| 5-HHBB(F,F)-F | (3-19) | 2% |
| 2-HHB(F)B(F,F)-F | (3-20) | 3% |
| 3-HHB(F)B(F,F)-F | (3-20) | 3% |
| 5-GB(F)B(F,F)XB(F,F)-F | (3-27) | 2% |
| 3-HB-O2 | (4-1) | 3% |
| V-HHB-1 | (4-4) | 3% |
| V2-HHB-1 | (4-4) | 3% |
| 3-HBB-2 | (4-5) | 5% |
| 2-BB(F)B-5 | (4-6) | 2% |
| 1-BB2B-2V | (4-8) | 2% |

NI = 74.0° C.; Tc < −20° C.; η = 11.4 mPa · s; Δn = 0.095; Δε = 6.6; Vth = 1.64 V; γ1 = 56.1 mPa · s.

The compositions of Examples 1 to 20 had lower viscosities than those of Comparative Example 1 and Comparative Example 2. The compositions of Examples 21 to 40 had a lower viscosity than that of Comparative Example 3. Therefore, the liquid crystal composition of the present invention has excellent properties.

INDUSTRIAL APPLICABILITY

The liquid crystal composition can be used for liquid crystal projectors, liquid crystal televisions and the like.

What is claimed is:
1. A liquid crystal composition comprising:
at least one compound selected from compounds represented by formula (1) as a first component; and
at least one compound selected from compounds represented by formula (2) as a second component, and the liquid crystal composition has a nematic phase,

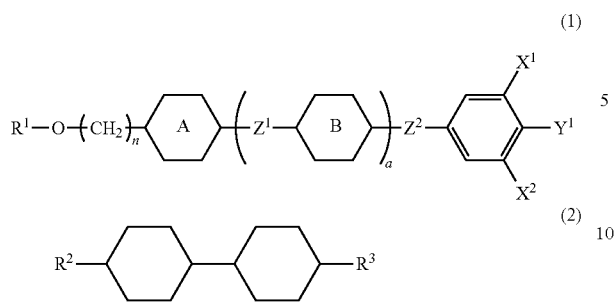

wherein $R^1$ is an alkyl having a carbon number from 1 to 12 or an alkenyl having a carbon number from 2 to 12, and in these groups at least one —$CH_2$— may be substituted by —O—; $R^2$ and $R^3$ are each an alkyl having a carbon number from 1 to 12, an alkoxy having a carbon number from 1 to 12, an alkenyl having a carbon number from 2 to 12, an alkyl having a carbon number from 1 to 12 in which at least one hydrogen is substituted by fluorine or chlorine, or an alkenyl having a carbon number from 2 to 12 in which at least one hydrogen is substituted by fluorine or chlorine; ring A is tetrahydropyran-2,5-diyl or 1,3-dioxane-2,5-diyl; ring B is an independent 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ and $Z^2$ are each a single bond, ethylene, methyleneoxy, carbonyloxy, or difluoromethyleneoxy, wherein at least one of $Z^1$ and $Z^2$ is difluoromethyleneoxy; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, or an alkoxy having a carbon number from 1 to 12 in which at least one hydrogen may be substituted by fluorine or chlorine; a has a value of 0, 1, 2, or 3; n has a value of 0, 1, 2, or 3.

2. The liquid crystal composition according to claim 1, wherein the first component is at least one compound selected from the group of compounds represented by formulas (1-1) to (1-9):

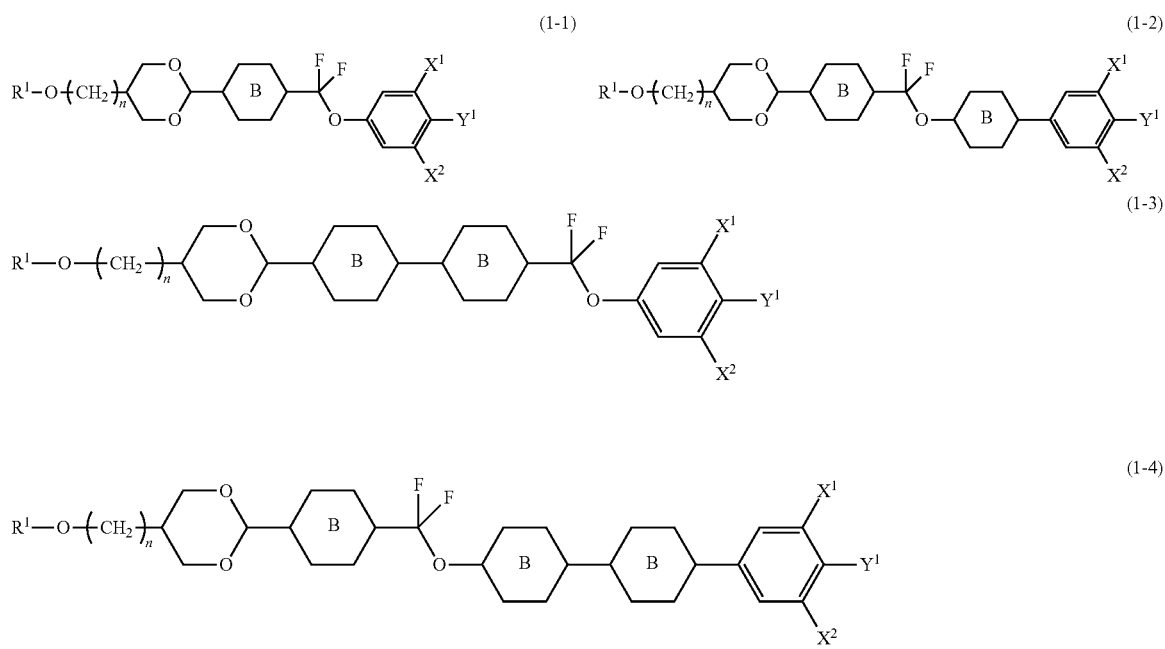

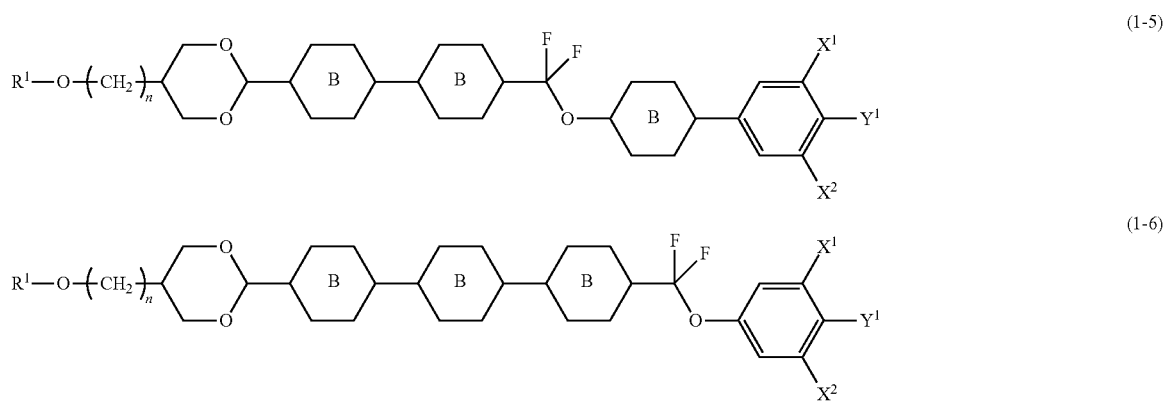

-continued

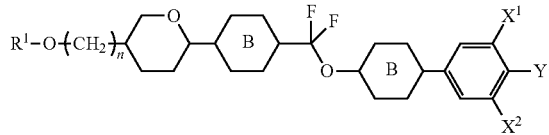
(1-7)

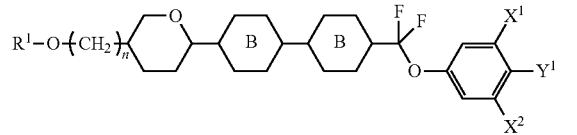
(1-8)

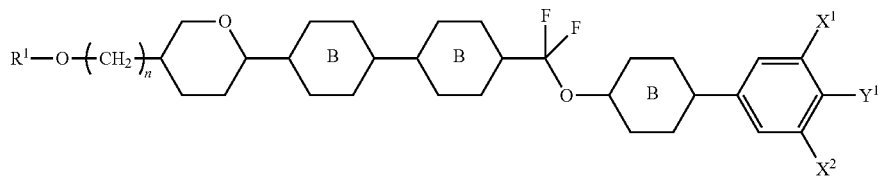
(1-9)

wherein $R^1$ is an alkyl having a carbon number from 1 to 12 or an alkenyl having a carbon number from 2 to 12, in these groups at least one —CH$_2$— may be substituted by —O—; ring B is an independent 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, or an alkoxy having a carbon number from 1 to 12 in which at least one hydrogen may be substituted by fluorine or chlorine; n has a value of 0, 1, 2, or 3.

3. The liquid crystal composition according to claim 1, wherein the first component is at least one compound selected from the group of compounds represented by formulas (1-1-1) to (1-1-4), formulas (1-2-1) to (1-2-5), formulas (1-3-1) to (1-3-5), formula (1-5-1), formula (1-6-1), formulas (1-7-1) to (1-7-5), formulas (1-8-1) to (1-8-5), and formula (1-9-1):

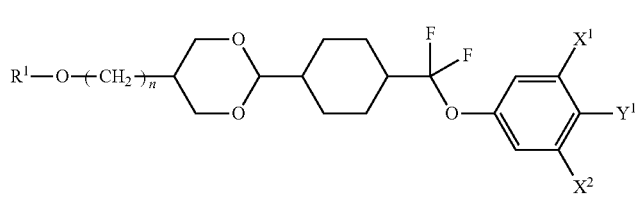
(1-1-1)

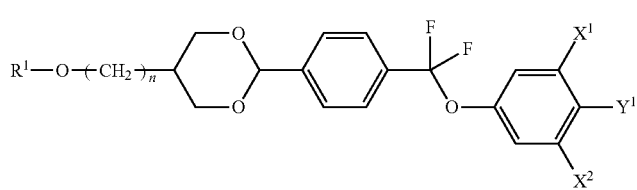
(1-1-2)

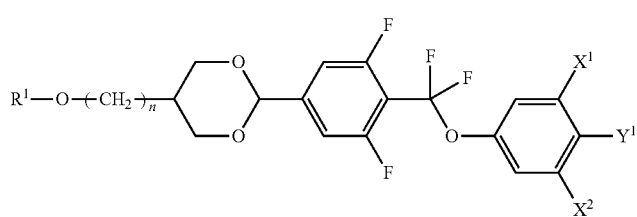
(1-1-3)

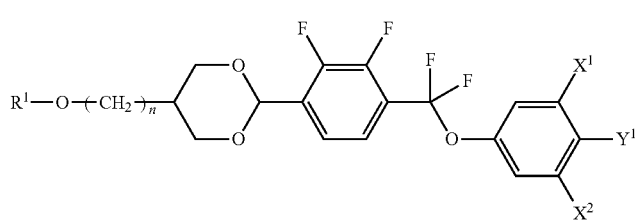
(1-1-4)

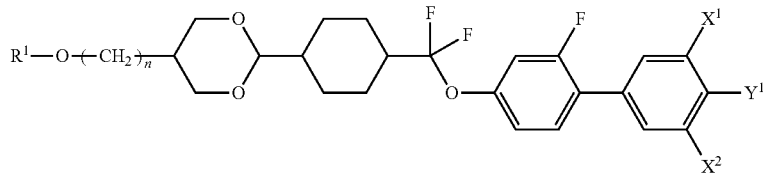
(1-2-1)
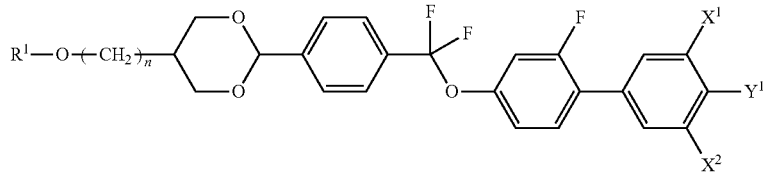
(1-2-2)
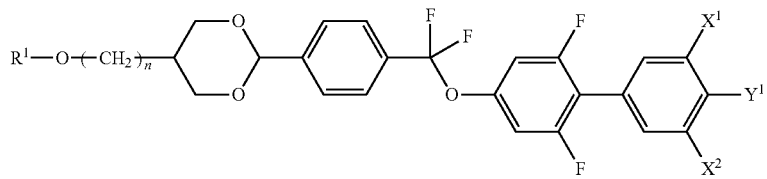
(1-2-3)
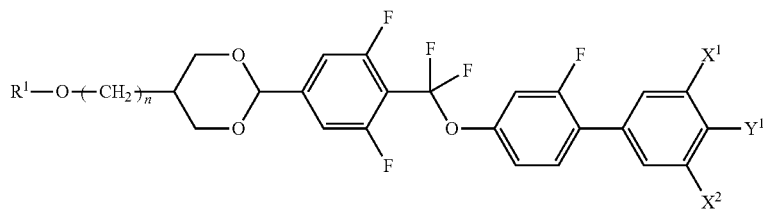
(1-2-4)
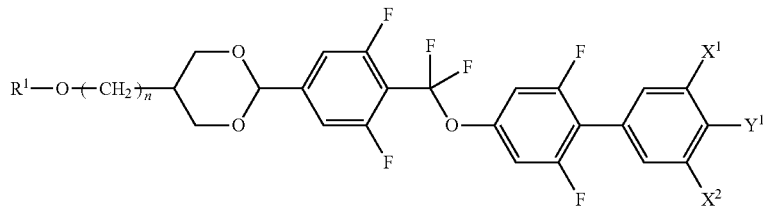
(1-2-5)
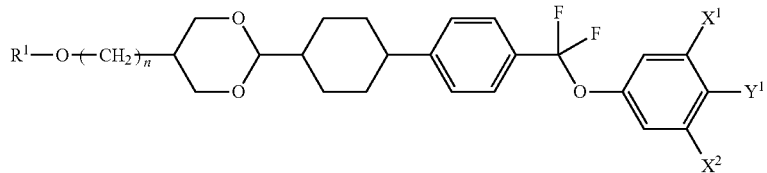
(1-3-1)
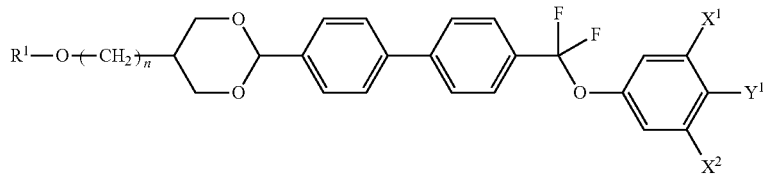
(1-3-2)
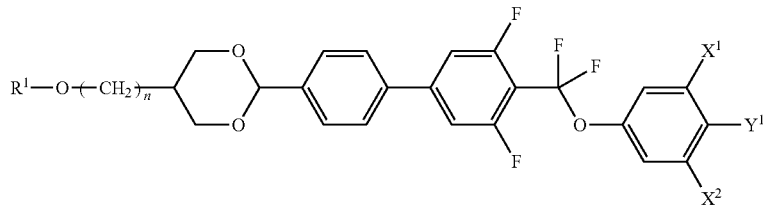
(1-3-3)

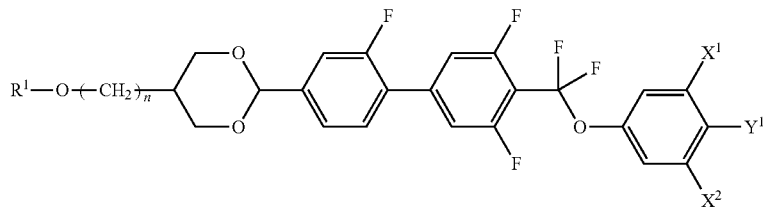
(1-3-4)
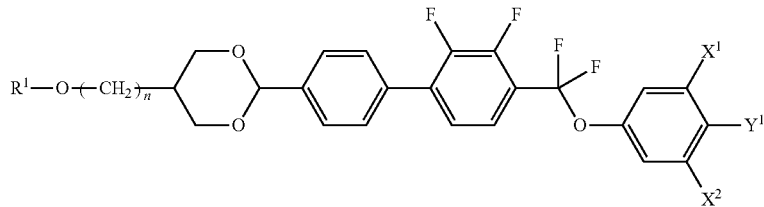
(1-3-5)
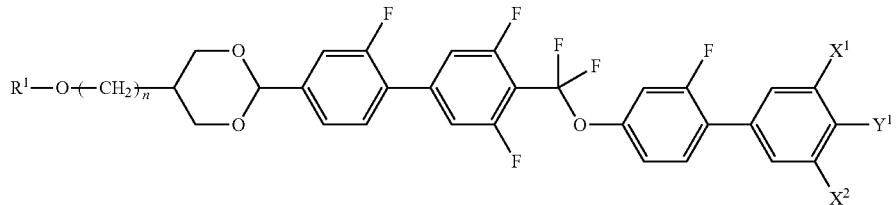
(1-5-1)
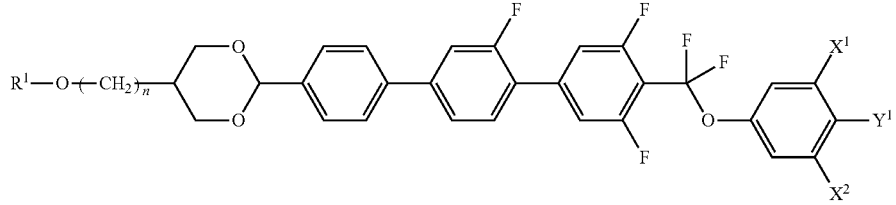
(1-6-1)
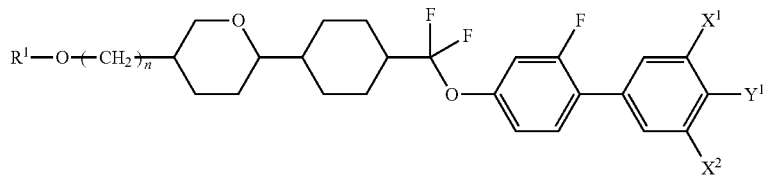
(1-7-1)
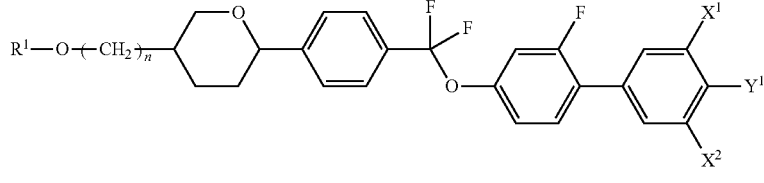
(1-7-2)
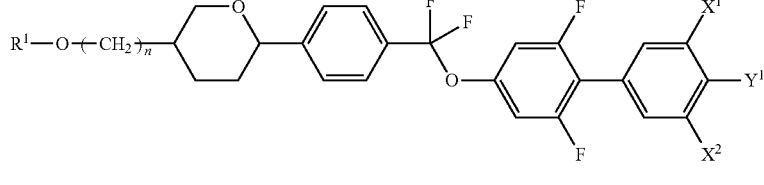
(1-7-3)
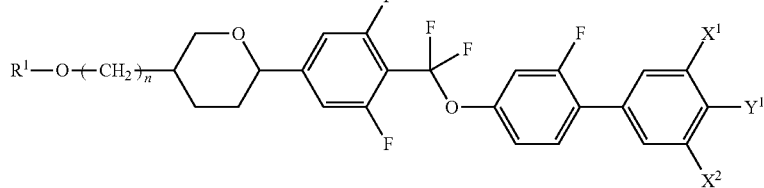
(1-7-4)

-continued

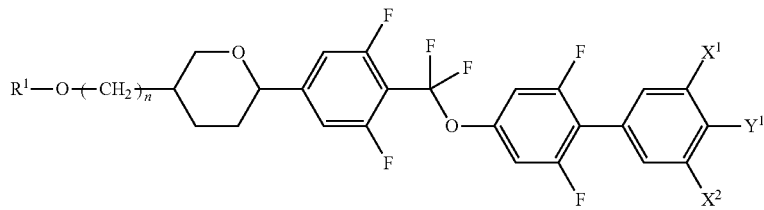
(1-7-5)

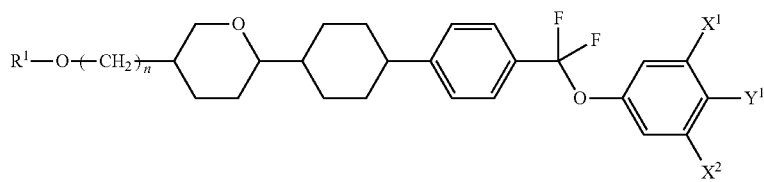
(1-8-1)

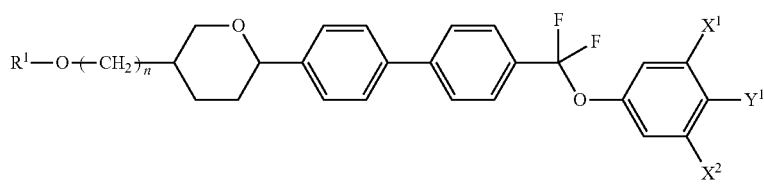
(1-8-2)

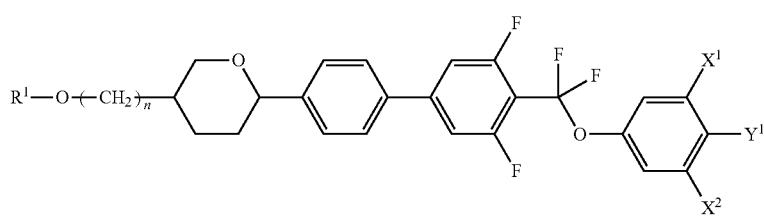
(1-8-3)

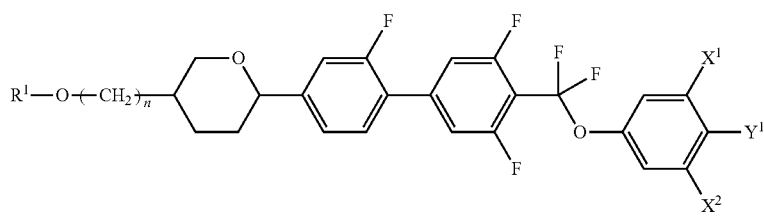
(1-8-4)

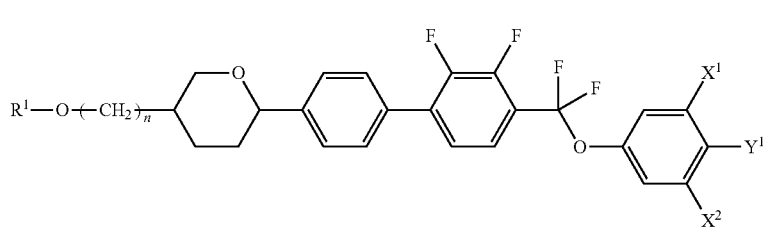
(1-8-5)

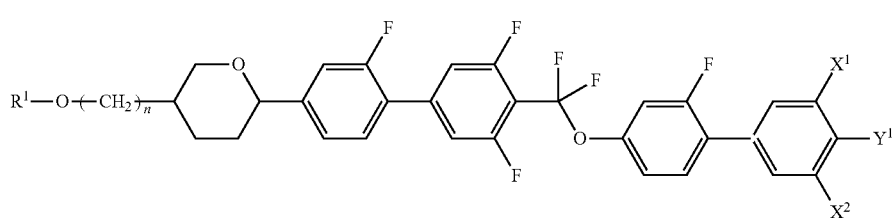
(1-9-1)

wherein $R^1$ is an alkyl having a carbon number from 1 to 12 or an alkenyl having a carbon number from 2 to 12, in these groups at least one —$CH_2$— may be substituted by —O—; $X^1$ and $X^2$ are each either hydrogen or fluorine; $Y^1$ is fluorine, chlorine, an alkyl having a carbon number from 1 to 12 in which at least one hydrogen may be substituted by fluorine or chlorine, or an alkoxy having a carbon number from 1 to 12 in which at least one hydrogen may be substituted by fluorine or chlorine; n has a value of 0, 1, 2, or 3.

4. The liquid crystal composition according to claim 1, wherein the first component is within the range of 1 wt % to 30 wt %, and the second component is within the range of 5 wt % to 70 wt %.

5. The liquid crystal composition according to claim 1, which contains at least one compound selected from compounds represented by formula (3) as a third component:

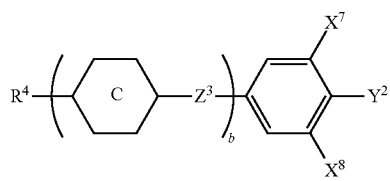
(3)

wherein $R^4$ is an alkyl having a carbon number from 1 to 12, an alkoxy having a carbon number from 1 to 12, or an alkenyl having a carbon number from 2 to 12; ring C is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, or tetrahydropyran-2,5-diyl; $Z^3$ is a single bond, ethylene, carbonyloxy, or difluoromethyleneoxy; $X^7$ and $X^8$ are each either hydrogen or fluorine; $Y^2$ is fluorine, chlorine, an alkyl having a carbon number from 1 to 12 in which at least one hydrogen may be substituted by fluorine or chlorine, an alkoxy having a carbon number from 1 to 12 in which at least one hydrogen may be substituted by fluorine or chlorine, or an alkenyloxy having a carbon number from 2 to 12 in which at least one hydrogen may be substituted by fluorine or chlorine; b has a value of 1, 2, 3, or 4.

6. The liquid crystal composition according to claim 1, which contains at least one compound selected from the group of compounds represented by formulas (3-1) to (3-35) as a third component:

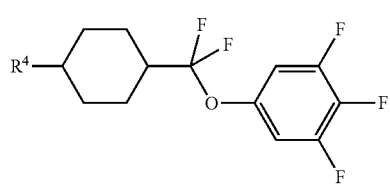
(3-1)

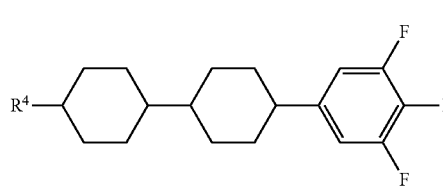
(3-2)

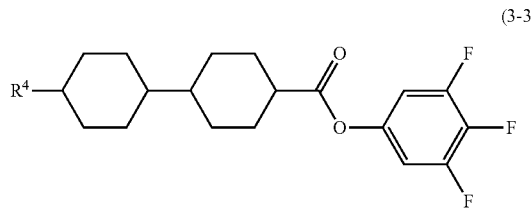
(3-3)

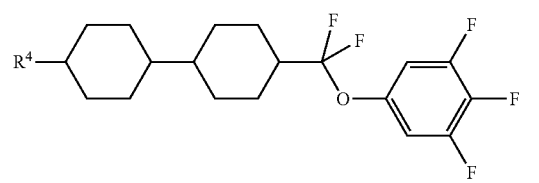
(3-4)

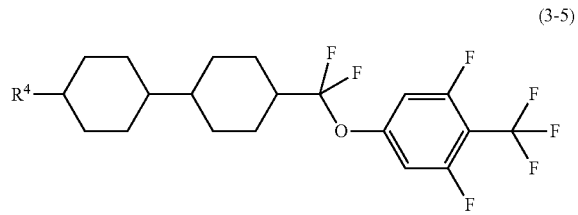
(3-5)

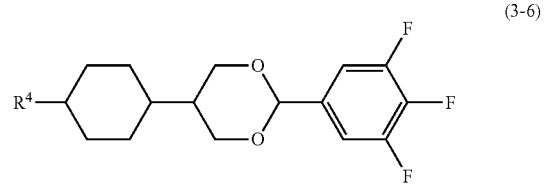
(3-6)

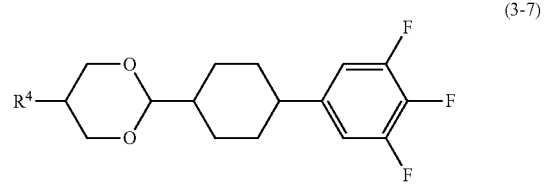
(3-7)

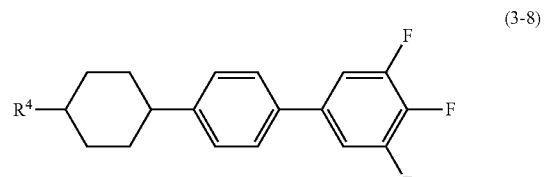
(3-8)

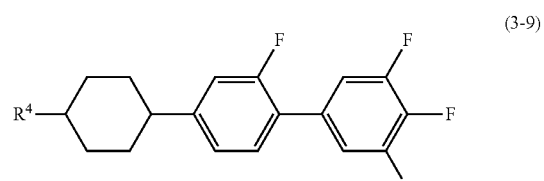
(3-9)

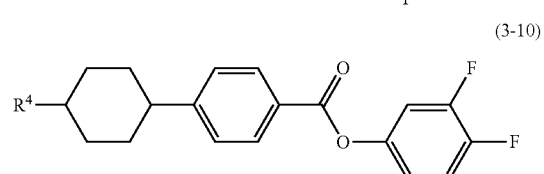
(3-10)

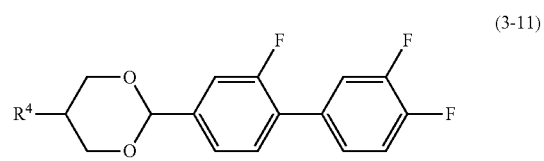
(3-11)

(3-12) 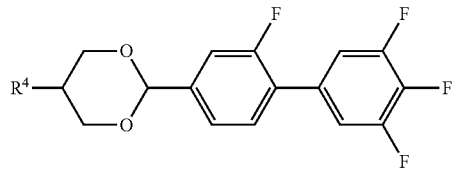
(3-13) 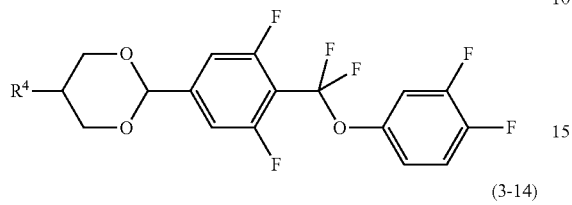
(3-14) 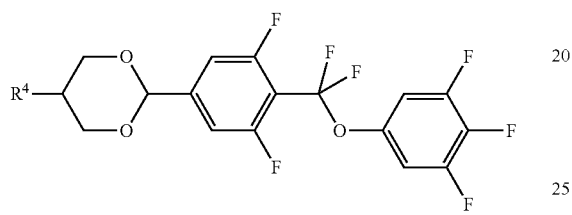
(3-15) 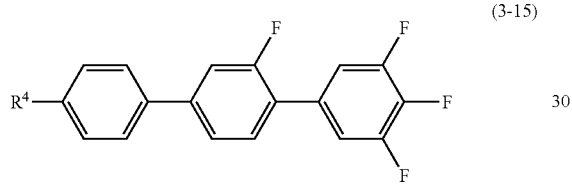
(3-16) 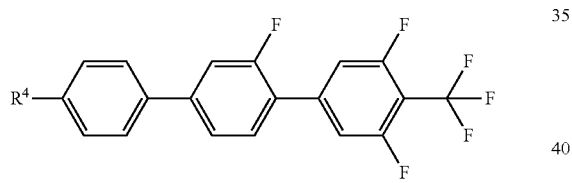
(3-17) 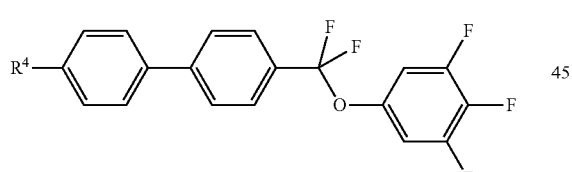
(3-18) 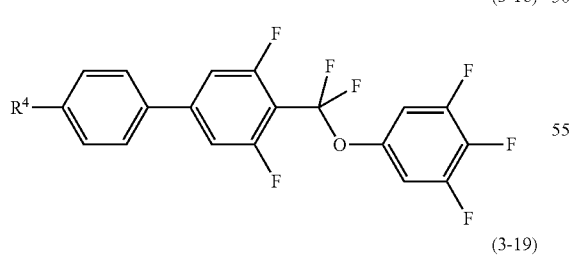
(3-19) 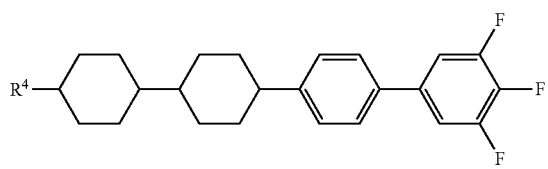
(3-20) 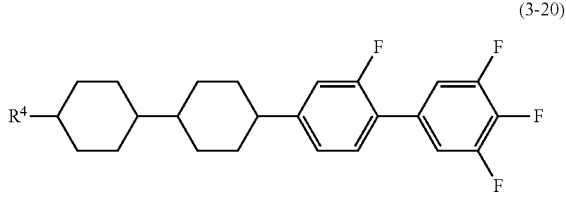
(3-21) 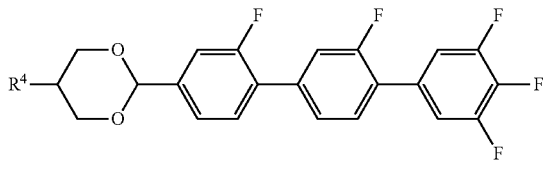
(3-22) 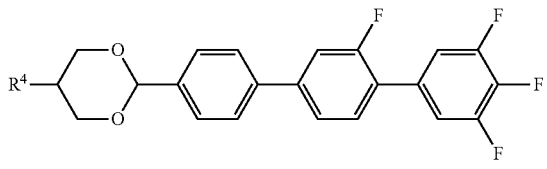
(3-23) 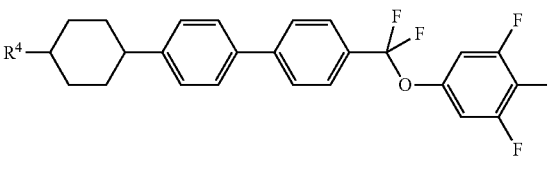
(3-24) 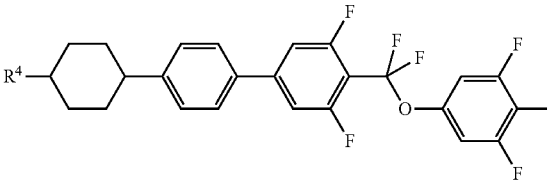
(3-25) 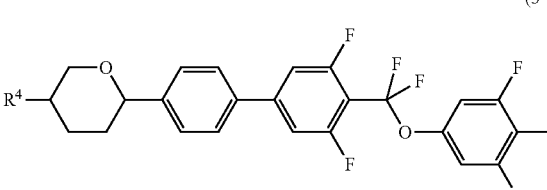
(3-26) 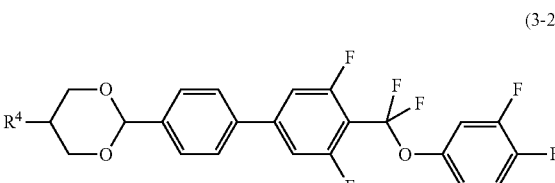
(3-27) 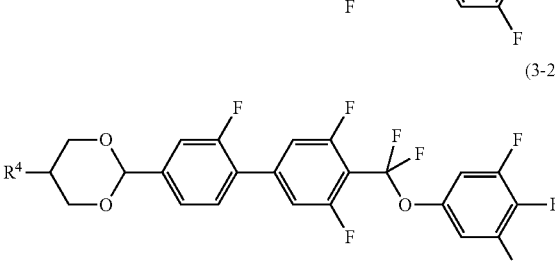

-continued (3-28)
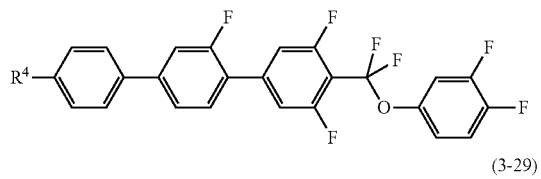

(3-29)
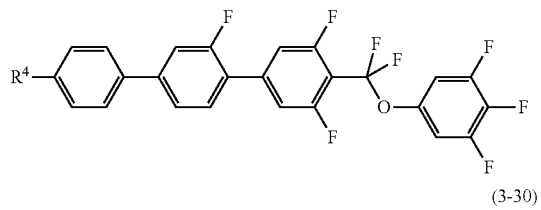

(3-30)
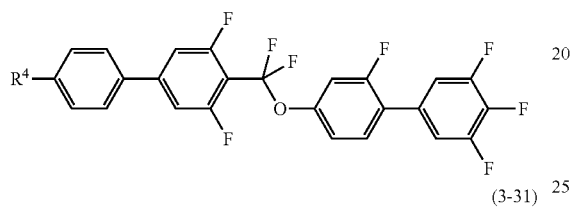

(3-31)
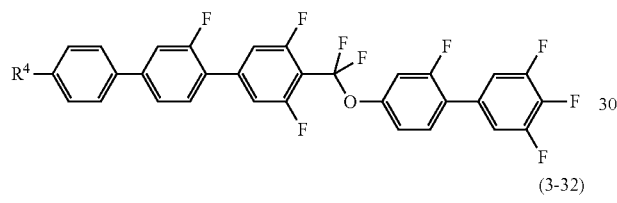

(3-32)
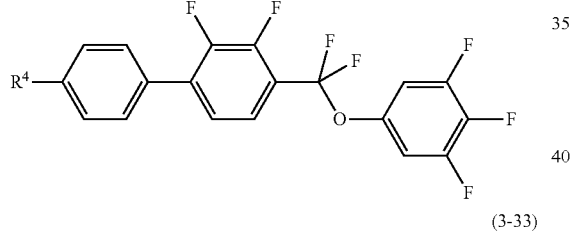

(3-33)
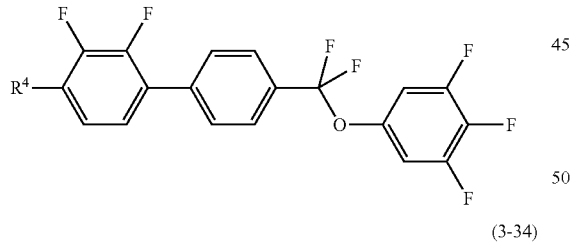

(3-34)
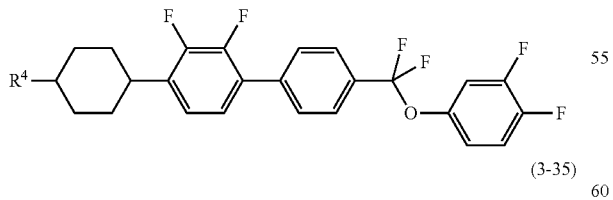

(3-35)
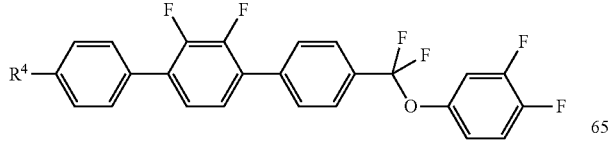

wherein $R^4$ is an alkyl having a carbon number from 1 to 12, an alkoxy having a carbon number from 1 to 12, or an alkenyl having a carbon number from 2 to 12.

7. The liquid crystal composition according to claim 5, wherein the third component is within the range of 10 wt % to 80 wt %.

8. The liquid crystal composition according to claim 1, further comprising at least one compound selected from compounds represented by formula (4) as a fourth component:

(4)
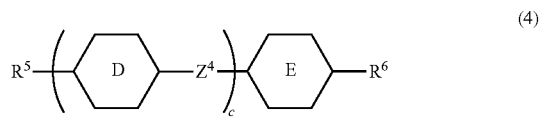

wherein $R^5$ and $R^6$ are each an alkyl having a carbon number from 1 to 12, an alkoxy having a carbon number from 1 to 12, an alkenyl having a carbon number from 2 to 12, or an alkenyl having a carbon number from 2 to 12 in which at least one hydrogen is substituted by fluorine or chlorine; ring D and ring E are each 1,4-cyclohexylene, 1,4-phenylene, 2-fluoro-1,4-phenylene, or 2,5-difluoro-1,4-phenylene; $Z^4$ is a single bond, ethylene, or carbonyloxy; c has a value of 1, 2, or 3; when c has a value of 1, ring E is 1,4-phenylene, 2-fluoro-1,4-phenylene, or 2,5-difluoro-1,4-phenylene.

9. The liquid crystal composition according to claim 1, further comprising at least one compound selected from the group of compounds represented by formulas (4-1) to (4-12) as a fourth component:

(4-1)
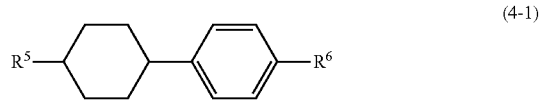

(4-2)
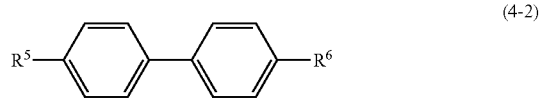

(4-3)

(4-4)
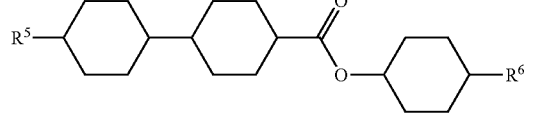

(4-5)
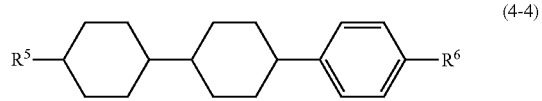

(4-6)
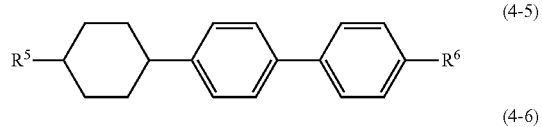

-continued (4-7)
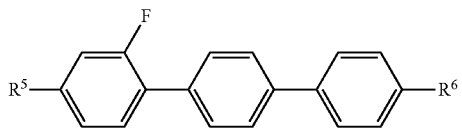

(4-8)
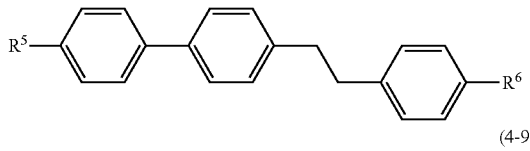

(4-9)
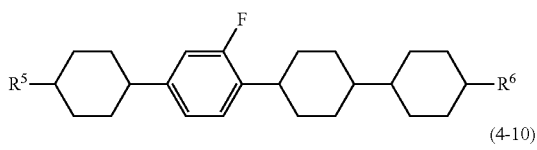

(4-10)
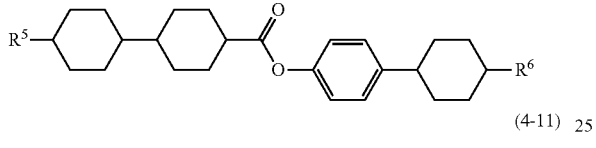

(4-11)
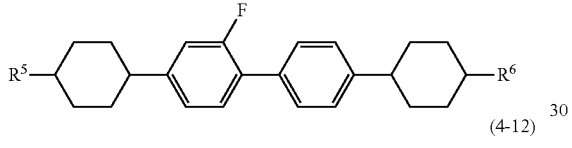

(4-12)
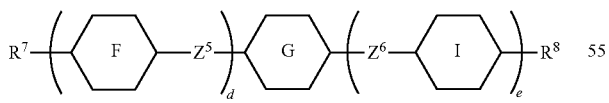

wherein $R^5$ and $R^6$ are each an alkyl having a carbon number from 1 to 12, an alkoxy having a carbon number from 1 to 12, an alkenyl having a carbon number from 2 to 12, or an alkenyl having a carbon number from 2 to 12 in which at least one hydrogen is substituted by fluorine or chlorine.

10. The liquid crystal composition according to claim 8, wherein the proportion of the fourth component is within the range of 5 wt % to 60 wt %.

11. The liquid crystal composition according to claim 1, further comprising at least one compound selected from compounds represented by formula (5) as a fifth component:

(5)
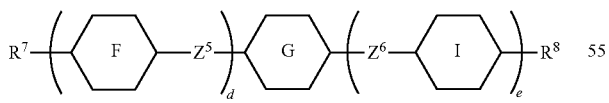

wherein $R^7$ and $R^8$ are each an alkyl having a carbon number from 1 to 12, an alkoxy having a carbon number from 1 to 12, an alkenyl having a carbon number from 2 to 12, or an alkenyloxy having a carbon number from 2 to 12; ring F and ring I are each 1,4-cyclohexylene, 1,4-cyclohexenylene, 1,4-phenylene, 1,4-phenylene in which at least one hydrogen is substituted by fluorine or chlorine, or tetrahydropyran-2,5-diyl; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl, or 7,8-difluorochroman-2,6-diyl; $Z^5$ and $Z^6$ are each a single bond, ethylene, carbonyloxy, or methyleneoxy; d has a value of 1, 2, or 3, e has a value of 0 or 1, and the sum of d and e must have a value of 3 or less.

12. The liquid crystal composition according to claim 1, further comprising at least one compound selected from the group of compounds represented by formulas (5-1) to (5-22) as a fifth component:

(5-1)
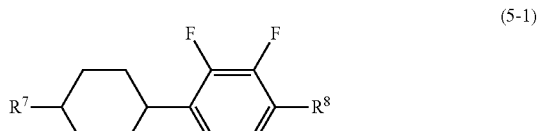

(5-2)
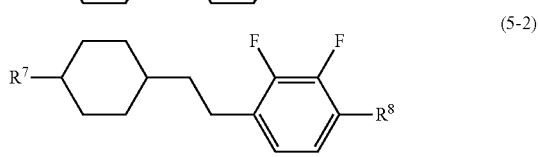

(5-3)
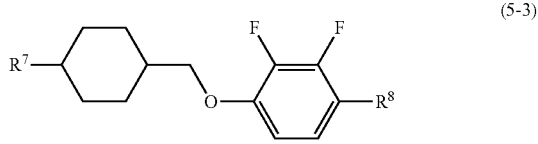

(5-4)
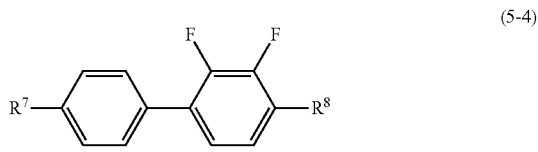

(5-5)
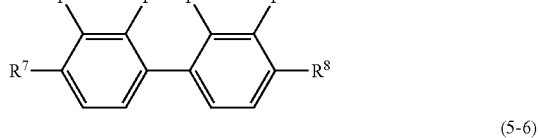

(5-6)
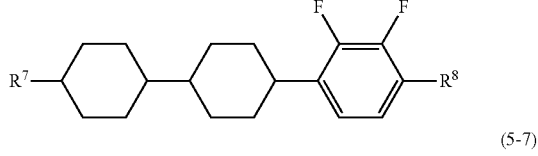

(5-7)
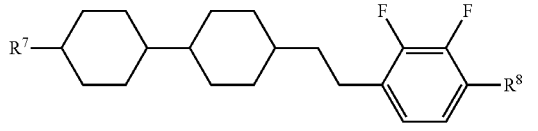

(5-8)
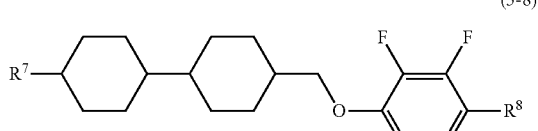

(5-9)
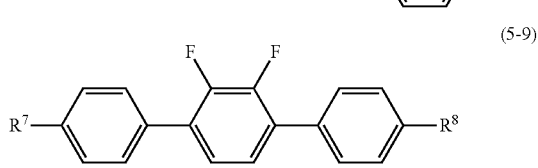

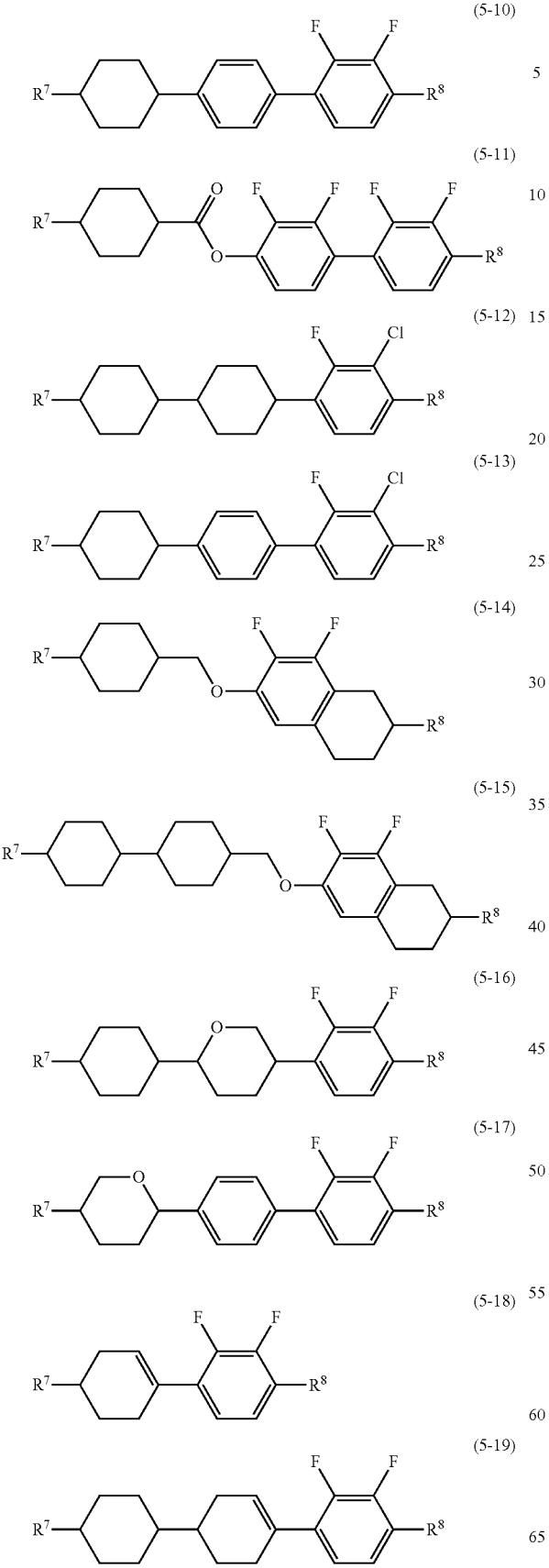
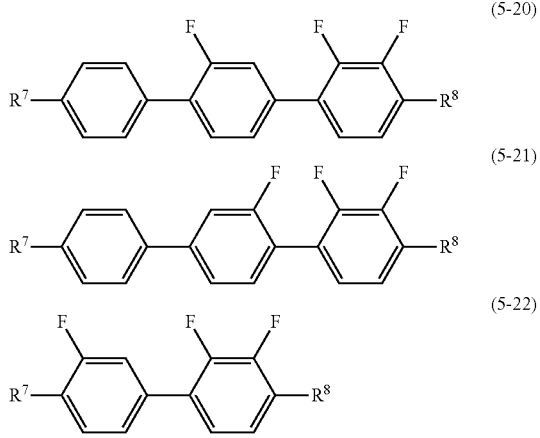

wherein $R^7$ and $R^8$ are each an alkyl having a carbon number from 1 to 12, an alkoxy having a carbon number from 1 to 12, an alkenyl having a carbon number from 2 to 12, or an alkenyloxy having a carbon number from 2 to 12.

13. The liquid crystal composition according to claim 11, wherein the proportion of the fifth component is within the range of 3 wt % to 30 wt %.

14. The liquid crystal composition according to claim 1, wherein the maximum temperature in the nematic phase is 70° C. or higher, the optical anisotropy (measured at 25° C.) at a wavelength of 589 nm is 0.07 or greater, and the dielectric anisotropy (measured at 25° C.) at a frequency of 1 kHz is 2 or greater.

15. A liquid crystal display device containing the liquid crystal composition according to claim 1.

16. The liquid crystal display device according to claim 15, wherein the operation mode of the liquid crystal display device is a TN mode, an ECB mode, an OCB mode, an IPS mode, a FFS mode, or a FPA mode, and the driving method of the liquid crystal display device is the active matrix method.

17. A liquid crystal composition comprising:
   at least one compound selected from compounds represented by formula (1') as a first component; and
   at least one compound selected from compounds represented by formula (2) as a second component, and the liquid crystal composition has a nematic phase,

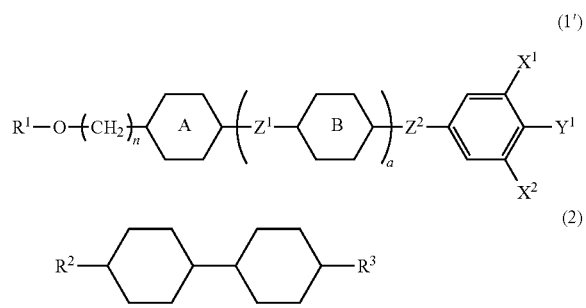

wherein $R^1$ is an alkyl having a carbon number from 1 to 12 or an alkenyl having a carbon number from 2 to 12, in these groups at least one —$CH_2$— may be substituted by —O—; $R^2$ and $R^3$ are each an alkyl having a carbon number from 1 to 12, an alkoxy having a carbon number from 1 to 12, an alkenyl having a carbon number from 2 to 12, an alkyl having a carbon number from 1 to 12 in which at least one hydrogen is substituted by fluorine or chlorine, or an alkenyl having a carbon number from 2 to 12 in which at least one hydrogen is substituted by fluorine or chlorine; ring A is 1,4-cyclohexylene or 1,4-cyclohexenylene; ring B is 1,4-cyclohexylene, 1,4-cyclohexenylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, or tetrahydropyran-2,5-diyl; $Z^1$ and $Z^2$ are each a single bond, ethylene, methyleneoxy, or carbonyloxy; $X^1$ and $X^2$ are each either hydrogen or fluorine; $Y^1$ is fluorine, chlorine, an alkyl having a carbon number from 1 to 12 in which at least one hydrogen is substituted by fluorine or chlorine, an alkoxy having a carbon number from 1 to 12 in which at least one hydrogen is substituted by fluorine or chlorine, or an alkenyloxy having a carbon number from 2 to 12 in which at least one hydrogen is substituted by fluorine or chlorine; a has a value of 0, 1, 2 or 3; n has a value of 1, 2, or 3.

18. The liquid crystal composition according to claim 17, wherein the first component is at least one compound selected from the group of compounds represented by formulas (1'-1), (1'-2) and (1'-9):

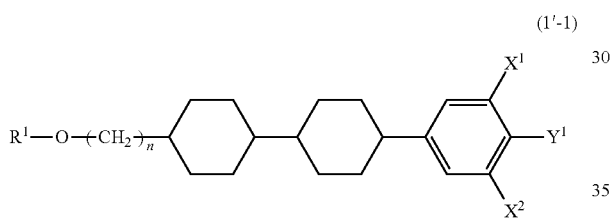

(1'-1)

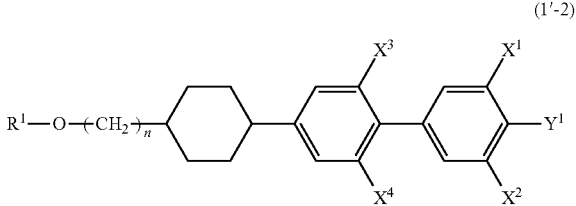

(1'-2)

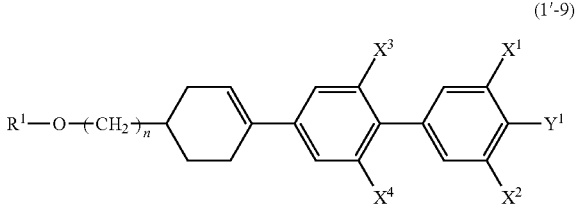

(1'-9)

wherein $R^1$ is an alkyl having a carbon number from 1 to 12 or an alkenyl having a carbon number from 2 to 12, and in these groups at least one —$CH_2$— may be substituted by —O—; $X^1$, $X^2$, $X^3$, and $X^4$ are each either hydrogen or fluorine; $Y^1$ is fluorine, chlorine, an alkyl having a carbon number from 1 to 12 in which at least one hydrogen is substituted by fluorine or chlorine, an alkoxy having a carbon number from 1 to 12 in which at least one hydrogen is substituted by fluorine or chlorine, or an alkenyloxy having a carbon number from 2 to 12 in which at least one hydrogen is substituted by fluorine or chlorine; n has a value of 1, 2, or 3.

* * * * *